(12) United States Patent
Khan et al.

(10) Patent No.: US 10,934,486 B2
(45) Date of Patent: Mar. 2, 2021

(54) LIQUID CRYSTAL COMPOSITION, LIQUID CRYSTAL MIXTURE, REVERSE-MODE POLYMER DISPERSED LIQUID CRYSTAL ELEMENT, AND ASSOCIATED SELECTIVELY DIMMABLE DEVICE

(71) Applicant: NITTO DENKO CORPORATION, Osaka (JP)

(72) Inventors: Sazzadur Rahman Khan, San Diego, CA (US); Hiep Luu, San Marcos, CA (US); Ekambaram Sambandan, Carlsbad, CA (US)

(73) Assignee: NITTO DENKO CORPORATION, Osaka (JP)

(*) Notice: Subject to any disclaimer, the term of this patent is extended or adjusted under 35 U.S.C. 154(b) by 66 days.

(21) Appl. No.: 16/373,431

(22) Filed: Apr. 2, 2019

(65) Prior Publication Data

US 2019/0233728 A1    Aug. 1, 2019

Related U.S. Application Data

(63) Continuation-in-part of application No. PCT/US2017/055662, filed on Oct. 6, 2017.

(60) Provisional application No. 62/405,711, filed on Oct. 7, 2016, provisional application No. 62/483,176, filed on Apr. 7, 2017.

(51) Int. Cl.
| | |
|---|---|
| *G02F 1/1333* | (2006.01) |
| *C09K 19/18* | (2006.01) |
| *C09K 19/30* | (2006.01) |
| *C09K 19/54* | (2006.01) |
| *C09K 19/12* | (2006.01) |
| *C09K 19/58* | (2006.01) |
| *C09K 19/04* | (2006.01) |
| *G02F 1/13357* | (2006.01) |

(52) U.S. Cl.
CPC .............. *C09K 19/18* (2013.01); *C09K 19/12* (2013.01); *C09K 19/3003* (2013.01); *C09K 19/3059* (2013.01); *C09K 19/544* (2013.01); *C09K 19/586* (2013.01); *C09K 2019/0448* (2013.01); *C09K 2019/122* (2013.01); *C09K 2019/123* (2013.01); *C09K 2019/183* (2013.01); *C09K 2019/3009* (2013.01); *C09K 2019/3016* (2013.01); *C09K 2019/3063* (2013.01); *C09K 2219/13* (2013.01); *G02F 1/1336* (2013.01); *G02F 1/133305* (2013.01); *G02F 1/133308* (2013.01); *G02F 2001/133311* (2013.01); *G02F 2001/133601* (2013.01)

(58) Field of Classification Search
CPC .... C09K 19/18; C09K 19/12; C09K 19/3003; C09K 19/3059; C09K 19/544; C09K 19/586; C09K 2219/13; G02F 1/1333; G02F 1/1336; G02F 1/133308; G02F 1/133305; G02F 2001/133311; G02F 2001/133601
USPC ..................................................... 252/299.66
See application file for complete search history.

(56) References Cited

U.S. PATENT DOCUMENTS

| | | | |
|---|---|---|---|
| 5,958,290 | A | 9/1999 | Coates et al. |
| 6,623,810 | B2 | 9/2003 | Sekine et al. |
| 6,849,202 | B2 | 2/2005 | Sekine et al. |
| 7,135,579 | B2 | 11/2006 | Sekine et al. |
| 7,981,486 | B2 | 7/2011 | Sasada |
| 8,323,805 | B2 | 12/2012 | Zheng et al. |
| 8,405,799 | B2 | 3/2013 | Fujisawa et al. |
| 8,420,235 | B2 | 4/2013 | Zheng |
| 9,296,948 | B2 | 3/2016 | Manabe et al. |
| 2010/0149446 | A1 | 6/2010 | Fukisawa et al. |
| 2012/0287354 | A1 | 11/2012 | Heckmeier et al. |
| 2015/0259600 | A1 | 9/2015 | Fukisawa et al. |
| 2019/0233728 | A1* | 8/2019 | Khan ................. C09K 19/3059 |

FOREIGN PATENT DOCUMENTS

| | | |
|---|---|---|
| CN | 1911880 A | 2/2007 |
| CN | 104087309 B | 3/2016 |
| EP | 3034583 A1 | 6/2016 |
| JP | 10-007606 A | 1/1998 |
| JP | 2001033748 A | 2/2001 |
| JP | 2006276649 A | 10/2006 |
| JP | 2007045963 A | 2/2007 |
| WO | 2008110316 A1 | 9/2008 |

OTHER PUBLICATIONS

Weglowska et al., High birefringence bistolane liquid crystals: synthesis and properties, RSC Advances, 6(1):403-408, Mar. 2016.
Chen et al., Improving UV stability of tolane-liquid crystals in photonic applications by the ortho fluorine substitution, Optical Materials Express, 6(1):97-105, Jan. 2016.
Li et al., The effect of lateral fluorination on the properties of phenyl-tolane liquid crystals, Liquid Crystals, 42(3):397-403, Mar. 2015.
Delpozo, et al. In Situ Generation of ArCu from CuF2 Makes Coupling of Bulky Aryl Silanes Feasible and Highly Efficient, Chemistry—A European Journal, 22(12):4274-4284, Mar. 2016.
Hu et al., Tolane liquid crystals bearing fluorinated terminal group and their mid-wave infrared properties, Liquid Crystals, 41(12):1696-1702, Dec. 2014.

(Continued)

*Primary Examiner* — Geraldina Visconti
(74) *Attorney, Agent, or Firm* — Maschoff Brennan; Brent A. Johnson; David W. Old

(57) ABSTRACT

Described herein are liquid crystal compositions and derivative mixtures thereof that can allow for the adjustment of their refractive indices by the application of an electric field. In addition, selectively dimmable reverse-mode polymer dispersed liquid crystal (PDLC) elements and devices using the aforementioned compositions are also described, which are transparent when no voltage is applied and opaque when a voltage is applied.

16 Claims, 12 Drawing Sheets

(56) References Cited

OTHER PUBLICATIONS

Xianyu, et al., High birefringence and large negative dielectric anisotropy phenyl-tolane liquid crystals, Liquid Crystals, 34(12):1473-1478, Dec. 2007.
Gauza et al., Super high birefringence isothiocyanato biphenyl-bistolane liquid crystals, Japanese Journal of Applied Physics, 43(11A):7634-7638, Nov. 2004.
Goto et al., Liquid crystals of some new tolane derivatives containing a 1, 2-ethylene linkage, Liquid Crystals, 5(1):225-232, Jan. 1989.
International Search Report and Written Opinion, PCT/US2017/050777, dated Nov. 23, 2017.
Rudolph et al., Technologies for Smart Windows, ASHRAE Journal, 51(7):104-107, Jul. 2009.
Cupelli et al., Reverse Mode Operation Polymer Dispersed Liquid Crystal with a Positive Dielectric Anisotropy Liquid Crystal, Journal of Polymer Science Part B: Polymer Physics, 49(4):257-262, Feb. 2011.
Sbar et al., Electrochromic dynamic windows for office buildings, International Journal of Sustainable Built Environment, 1(1):125-139, Jun. 2012.
Macchione et al., Photochromic Reverse mode polymer dispersed liquid crystals, Liquid Crystals, 32(3):315-318, Mar. 2005.
Di Profio et al., Reverse-Mode Operation Switchable Nematic Emulsions, Langmuir, 18(8):3034-3038, Apr. 2002.
Yamaguchi et al., Electro-optical Properties and Morphology of Reverse Scatterning Mode TN LCD, Journal of Photopolymer Science and Technology, 25(3), 313-316, Jun. 2012.
Chen et al., Electro-optical properties of reverse-mode films of planar aligned polymer-dispersed liquid crystal, Journal of Polymer Research, 13(2):85-89, Apr. 2006.

* cited by examiner

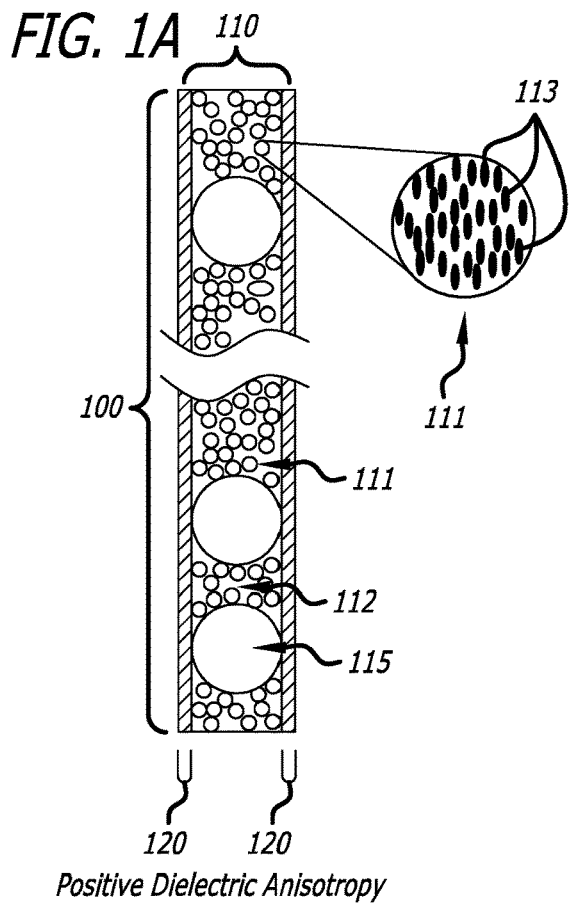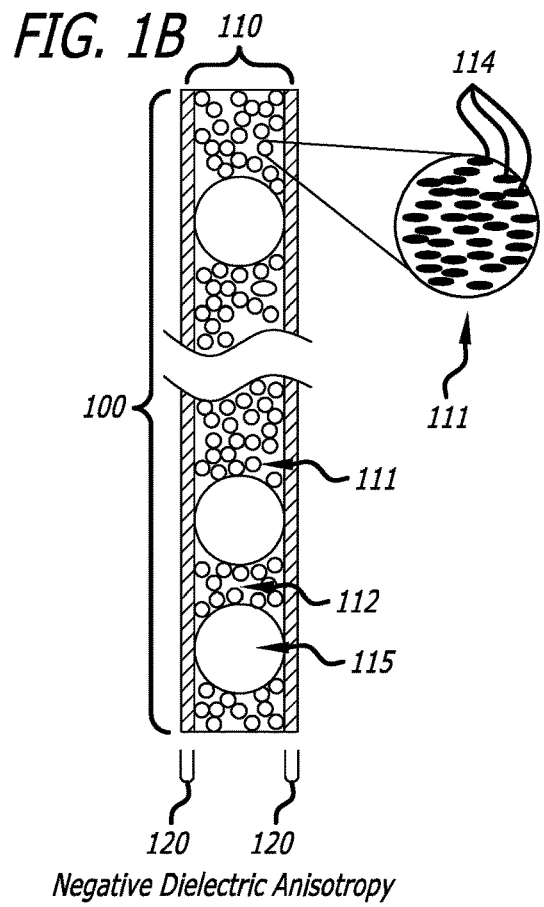
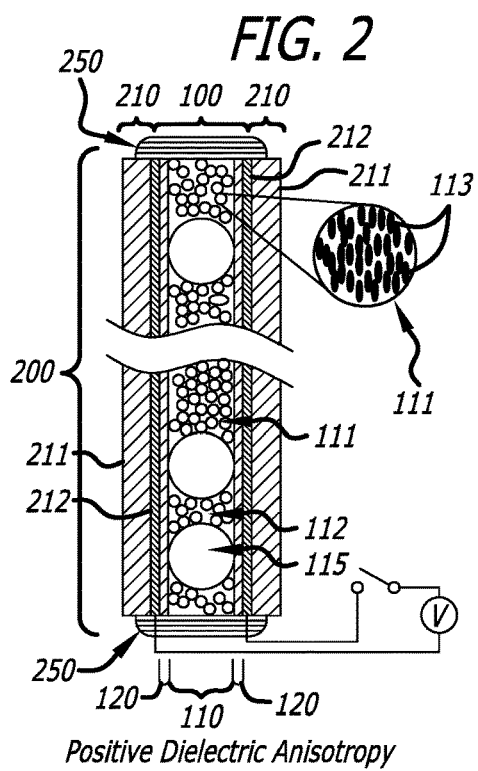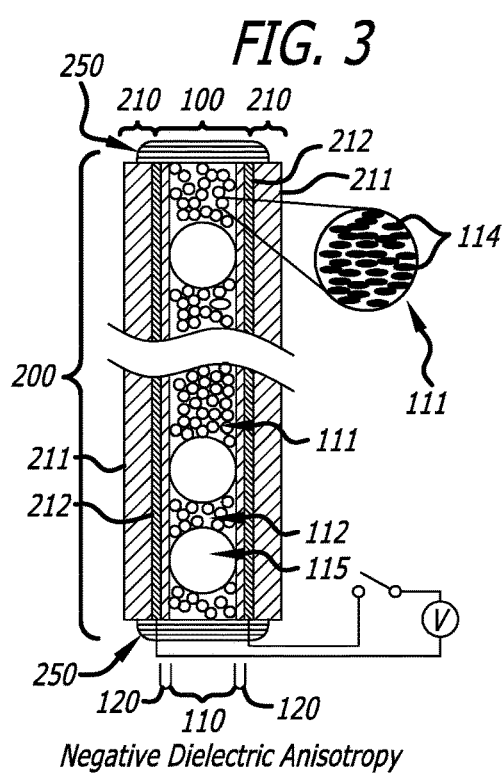

LIQUID CRYSTAL COMPOSITION, LIQUID CRYSTAL MIXTURE, REVERSE-MODE POLYMER DISPERSED LIQUID CRYSTAL ELEMENT, AND ASSOCIATED SELECTIVELY DIMMABLE DEVICE

CROSS REFERENCE TO RELATED APPLICATIONS

This application is a continuation-in-part of International Patent Application No. PCT/US2017/055662, filed on Oct. 6, 2017, which claims priority to U.S. Provisional Application No. 62/405,711, filed Oct. 7, 2016, and U.S. Provisional Application No. 62/483,176, filed Apr. 7, 2017, which are incorporated by reference herein in their entirety.

BACKGROUND

Field

These embodiments relate to compounds or compositions having both liquid and crystalline properties, as well as mixtures, elements, or devices using these compounds or compositions.

Description of the Related Art

In the field of windows, smart windows are attractive alternatives to conventional mechanical shutters, blinds, or hydraulic methods of shading. Currently, there are three main technologies for smart window applications: suspended particle displays (SPD), Polymer Dispersed Liquid Crystals (PDLCs), and metal oxide electrochromics (ECs).

One drawback of conventional PDLCs or conventional mode devices is that the window becomes transparent only when a voltage is applied, thus it fails passively opaque. Windows that fail opaque are not desirable in applications where visibility through the window would enhance safety when there is loss of power in an emergency situation such as in vehicle or aircraft crash or in a building fire. For electrochromic windows, the application of a voltage is usually needed to trigger a change in the window characteristics, even though one may not be required to maintain dimming. As a result of the desire to have windows fail transparently, advances have been made to create reverse mode devices such as Reverse Mode PDLCs, or PDLCs that are transparent when off.

One way of creating reverse mode PDLCs has been found to be by using liquid crystal nematic compounds, having either negative dielectric anisotropy or positive dielectric anisotropy, and aligning them such that they are transparent in the off state. To meet demands for low driving voltage, there is a need for new liquid crystal materials to enable enhanced operation of reverse mode smart windows with low driving voltages.

SUMMARY

As a result of the need for new reverse-mode PDLC materials, new materials have been successfully synthesized. The material can be used in reverse mode PDLC dimmable devices. The materials can be integral to a window or applied as a coating to provide a dimming capability for privacy and other purposes.

Some embodiments include a liquid-crystalline composition comprising:

(1) a polymer created by polymerization of a monomer of a formula:

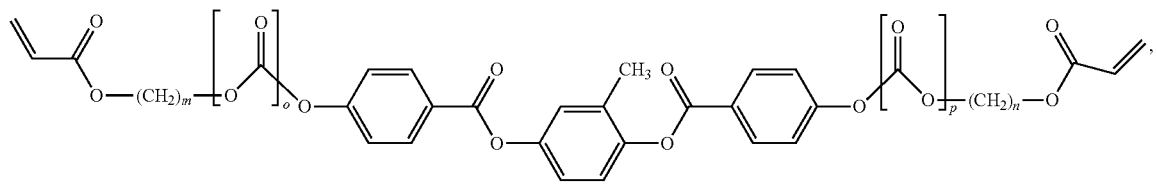

wherein m and n are independently 1, 2, 3, 4, 5, or 6, and o and p are independently 0 or 1; and (2) a liquid crystalline mixture comprising a first liquid crystalline compound of a formula:

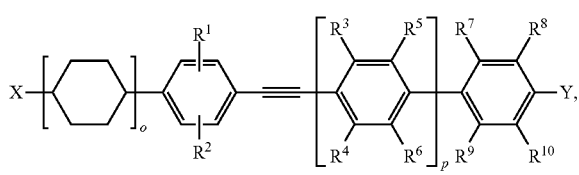

wherein $R^1$ is H or $CH_3$; $R^2$, $R^3$, $R^4$, $R^5$, $R^6$, $R^7$, $R^8$, $R^9$, and $R^{10}$ are independently H, $CH_3$, or F, wherein at least one of $R^1$ and $R^3$ is $CH_3$; X is $C_{2-8}$ alkyl; Y is F or CN; and o and p are independently 0 or 1; wherein the liquid crystalline mixture is dispersed within the polymer.

Some embodiments include a liquid crystal element comprising: a transparency changing layer comprising the liquid-crystalline composition described herein and having a first opposing surface and a second opposing surface, and a first alignment layer bounding the first opposing surface; and a second alignment layer bounding the second opposing surface.

Some embodiments include a selectively dimmable device comprising: the liquid crystal element described herein disposed between a first conductive substrate and a second conductive substrate; and a voltage source; wherein the element, the first conductive substrate, the second conductive substrate, and the voltage source are all in electrical communication such that when a voltage is applied by the voltage source an electric field is applied across the element.

BRIEF DESCRIPTION OF THE DRAWINGS

FIG. 1A is a depiction of a liquid crystal element having a liquid crystal with positive dielectric anisotropy.

FIG. 1B is a depiction of a liquid crystal element having a liquid crystal with negative dielectric anisotropy.

FIG. 2 is a depiction of an embodiment of a selectively dimmable device with a positive dielectric anisotropic polymer dispersed liquid crystal.

FIG. 3 is a depiction of an embodiment of a selectively dimmable device with a negative dielectric anisotropic polymer dispersed liquid crystal.

DETAILED DESCRIPTION

Liquid Crystal Composition

Figure 4:
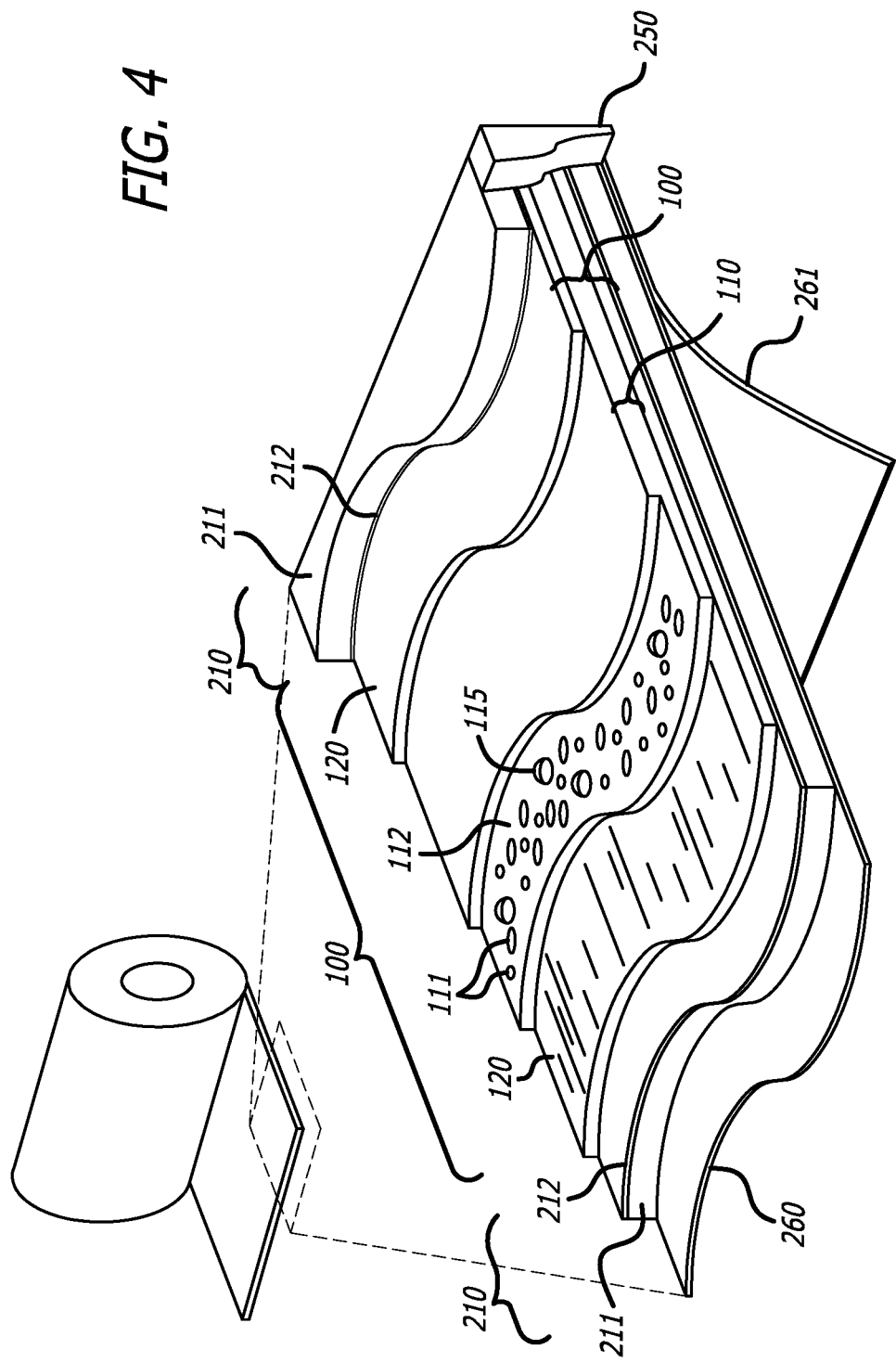
FIG. 4 is yet another embodiment of a selectively dimmable device where the device comprises of a flexible film. Such a film may be used alone or may be applied on existing windows.

Generally, the liquid crystal compositions described herein include a liquid-crystalline mixture dispersed within polymer. For example, droplets or particles of the liquid-crystalline mixture can be suspended (e.g. by precipitation) within the polymer. Normally, it is helpful for the droplets or particles to be of a size that allows them to scatter visible light, e.g. the diameter, or the cube root of the volume of the droplet or particle, is at least about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 1000 nm, about 10 μm, or about 100 μm. In some embodiments, the droplets or particles have a size, e.g. the diameter or the cube root of the volume of the droplet or particle, that is about 200-250 nm, about 250-300 nm, about 300-350 nm, 350-400 nm, about 400-450 nm, about 450-500 nm, about 500-550 nm, about 550-600 nm, about 600-650 nm, about 650-700 nm, about 700-750 nm, about 750-800 nm, about 800-850 nm, about 850-900 nm, about 900-950 nm, about 950-1,000 nm, about 1,000-1,200 nm, about 1,200-1,400 nm, about 1,400-1,600 nm, about 1,600-1,800 nm, about 1,800-2,000 nm, about 2,000-3,000 nm, about 3,000-4,000 nm, about 4,000-5,000 nm, about 5,000-6,000 nm, about 6,000-7,000 nm, about 7,000-8,000 nm, about 8,000-9,000 nm 9,000-10,000 nm, 10,000-20,000 nm, about 20,000-30,000 nm, about 30,000-40,000 nm, about 40,000-50,000 nm, about 50,000-60,000 nm, about 60,000-70,000 nm, about 70,000-80,000 nm, about 80,000-90,000 nm, or about 90,000-100,000 nm.

Polymer

Any suitable polymer may be used in a liquid-crystal composition, and the polymer may be prepared by any suitable process, such as by polymerization of one or more polymer precursors. For example, a polymer precursor, such as a monomer, an oligomer, or a combination thereof, may be polymerized in situ. In some embodiments, the polymer may be formed by reacting a liquid-crystalline monomer.

Some polymers are formed by reacting a monomer of Formula 1.

Formula 1

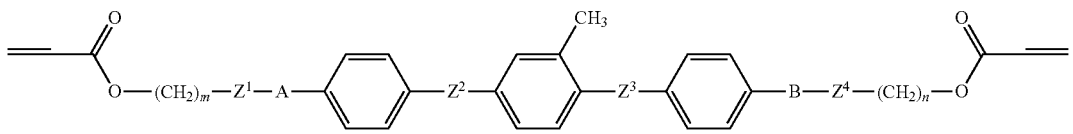

With respect to Formula 1, $Z^1$ may be a linking group, such as a carbonyl containing linking group, e.g. C=O or —OCO— with the carbonyl carbon attaching to A, or a single covalent bond.

With respect to Formula 1, $Z^2$ may be a linking group, such as a carbonyl containing linking group, e.g. C=O or —OCO—, or a single covalent bond.

With respect to Formula 1, $Z^3$ may be a linking group, such as a carbonyl containing linking group, e.g. C=O or —OCO—, or a single covalent bond.

With respect to Formula 1, $Z^4$ may be a linking group, such as a carbonyl containing linking group, e.g. C=O or —OCO— with the carbonyl carbon attaching to B, or a single covalent bond.

With respect to Formula 1, A may be a single covalent bond or —O—.

With respect to Formula 1, B may be a single covalent bond or —O—.

In some embodiments, the polymer in the liquid crystal composition is a product of polymerizing a monomer represented by Formula 2.

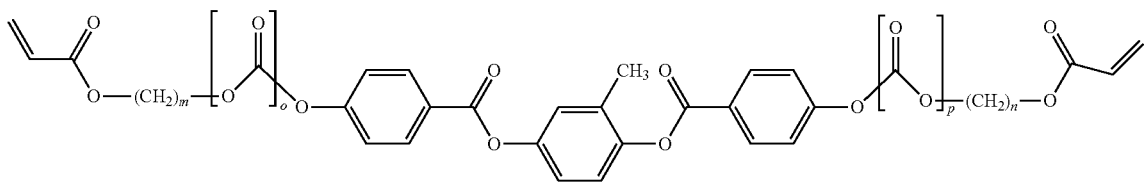

Formula 2

With respect to Formula 1 or 2, n is 1, 2, 3, 4, 5, or 6.
With respect to Formula 1 or 2, m is 1, 2, 3, 4, 5, or 6.
With respect to Formula 1 or 2, in some embodiments, m and n are 3. With respect to Formula 1 or 2, in some embodiments, m and n are 4.

With respect to Formula 2, o is 0 or 1.
With respect to Formula 2, p is 0 or 1.
With respect to Formula 2, in some embodiments, o and p are both 0; in some embodiments, o and p are both 1; in some embodiments, o is 0 and p is 1; and in some embodiments, o is 1 and p is 0.

In some embodiments, the monomer can include BASF Paliocolor® LC-242. In some embodiments, the monomer can include Merck RM 257. In some embodiments, the monomer can comprise both BASF Paliocolor® LC-242 and Merck RM 257. In some embodiments, the monomer can be:

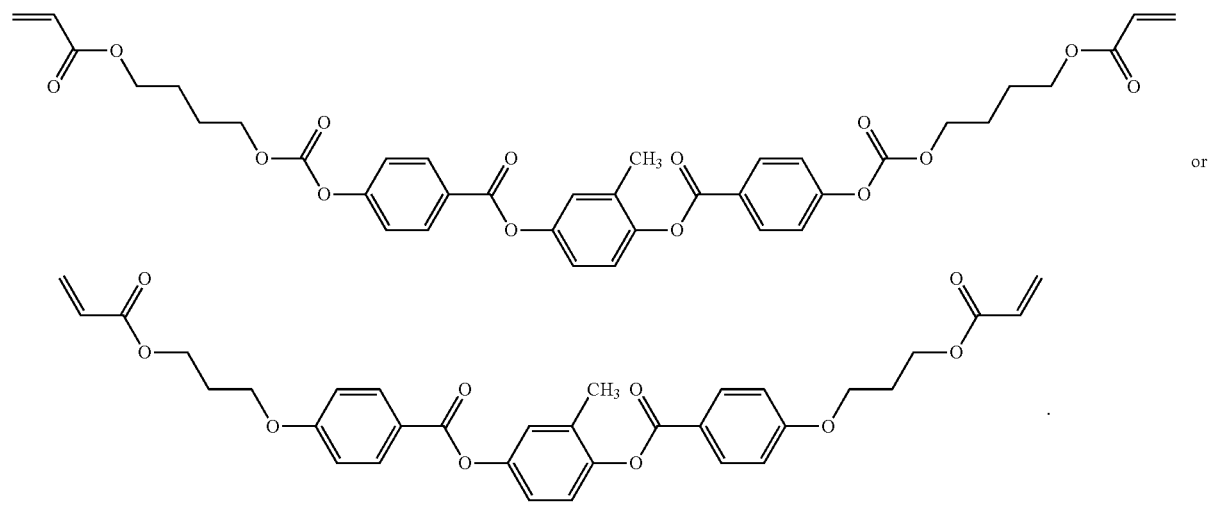

For some polymers in a liquid-crystalline composition, an initiator can be used in the polymerization of a polymer precursor. In some embodiments, the polymer can be a photopolymer. In some embodiments, the photopolymer can be formed by reacting a polymer precursor in the presence of a photoinitiator. In some embodiments, the polymer can be a thermoplastic polymer. In some embodiments, the thermoplastic polymer can by reacting a polymer precursor in the presence of a thermal initiator. In some embodiments, the photopolymer can comprise a UV-curable polymer or a visual light based photopolymer. In some embodiments, the polymer can comprise a combination of a thermoplastic polymer and a photo/UV-curable polymer.

Any suitable weight ratio of liquid crystal compound to polymer may be used, such as about 25:1 (e.g 25 mg of liquid crystal to 1 mg of polymer) to about 1:1, about 15:1 to about 3:1, about 4:1 to about 5:1, about 5:1 to about 6:1, about 6:1 to about 7:1, about 7:1 to about 8:1, about 8:1 to about 9:1, about 9:1 to about 10:1, about 10:1 to about 11:1, about 11:1 to about 12:1, about 12:1 to about 14:1, about 14:1 to about 20:1, about 10:1 to about 8:1, or about 9:1.

A polymerization reaction may be carried out in the presence of an initiator, such as a photoinitiator or a thermal initiator. In some embodiments, the photoinitiator can comprise a UV irradiation photoinitiator. In some embodiments, the photoinitiator can also comprise a co-initiator, such as an α-alkoxydeoxybenzoin, α,α-dialkyloxydeoxybenzoin, α,α-dialkoxyacetophenone, α,α-hydroxyalkylphenone, O-acyl α-oximinoketone, dibenzoyl disulphide, S-phenyl thiobenzoate, acylphosphine oxide, dibenzoylmethane, phenylazo-4-diphenylsulphone, 4-morpholino-α-dialkylaminoacetophenone and combinations thereof. In some embodiments, the photoinitiator can comprise Irgacure® 184, Irgacure® 369, Irgacure® 500, Irgacure® 651, Irgacure® 907, Irgacure® 1117, Irgacure® 1700, Irgacure® TPO (2,4,6-trimethylbenzoyldiphenylphosphine oxide), Irgacure® TPO-L (2,4,6-trimethylbenzoylphenylphosphinate), 4,4'-bis(N,N-dimethylamino)benzophenone (Michlers ketone), (1-hydroxycyclohexyl) phenyl ketone, 2,2-diethoxyacetophenone (DEAP), benzoin, benzyl, benzophenone, or combinations thereof. In some embodiments, the photoinitiator can comprise a blue-green and/or red sensitive photoinitiator. In some embodiments, the blue-green and/or red photoinitiator can comprise Irgacure® 784, dye rose bengal ester, rose bengal sodium salt, campharphinone, methylene blue and the like. In some embodiments, co-initiators can comprise N-phenylglicine, triethylamine, thiethanolamine and combinations thereof. In some embodiments, co-initiators may be employed to control the curing rate of the original pre-polymer such that material properties may be manipulated. In some embodiments, the photoinitiator can comprise an ionic photoinitiator. In some embodiments, the ionic photoinitiator can comprise a benzophenone, camphorquinone, fluorenone, xanthone, thioxanthone, benzyls, α-ketocoumarin, anthraquinone, terephthalophenone, and combinations thereof. In some embodiments, the photoinitiator can comprise Irgacure® 907. In some embodiments, the photoinitiator can comprise Irgacure® TPO. In some embodiments, the photoinitiator can comprise Irgacure® 907. In some embodiments, the photoinitiator can comprise Irgacure® 651.

In some embodiments, the thermal initiator can comprise: 4,4'-Azobis(4-cyanovaleric acid) (ACVA); α,α-azobisisobutyronitrile; 1,1'-azobis(cyclohexanecarbonitrile) (ACHN); ammonium persulfate; hydroxymethanesulfinic acid monosodium salt dihydrate (sodium formaldehydesulfoxylate); potassium persulfate; sodium persulfate; tert-butyl hydroperoxide; tert-butyl peracetate; cumene hydroperoxide; 2,5-di(tert-butylperoxy)-2,5-dimethyl-3-hexyne; dicumyl peroxide; 2,5-bis(tert-butylperoxy)-2,5-dimethylhexane (Luperox® 101, Luperox® 101XL45); 2,4-pentanedione peroxide (Luperox® 224); 1,1-bis(tert-butylperoxy)-3,3,5-trimethylcyclohexane (Luperox® 231); 1,1-bis (tert-butylperoxy)cyclohexane (Luperox® 331M80, Luperox® 531M80); benzoyl peroxide (Luprox® A98, Luprox® AFR40, Luprox® ATC50); butanone peroxide (Luprox® DDM-9, Luprox® DHD-9); tert-butyl peroxide (Luprox® DI); lauroyl peroxide (Luprox® LP); tert-butyl peroxybenzoate (Luprox® P); tert-butylperoxy 2-ethylhexyl carbonate (Luprox® TBEC); tert-butyl hydroperoxide (Luprox® TBH70X), or combinations thereof.

Liquid-Crystalline Mixture

A liquid-crystalline mixture may contain a single liquid crystalline compound, or may contain a first liquid-crystalline compound, and may additionally contain one or more additional liquid-crystalline compounds, e.g. a second liquid-crystalline compound, a third liquid-crystalline compound, etc. In some embodiments, the liquid crystal mixture can exhibit a mesogenic liquid crystal phase.

First Liquid-Crystalline Compound

Any suitable liquid-crystalline compound may be used as the first liquid-crystalline compound.

In some embodiments, the first liquid-crystalline compound is a disubstituted ethylene such as:

wherein A can be an optionally substituted alkylphenyl, or an optionally substituted alkylcyclohexylphenyl, where there is at least one methyl substitution; and B can be an optionally substituted phenyl or an optionally substituted biphenyl, such as 1,1'-biphenyl-4-yl.

For example, a first liquid-crystalline compound may be represented by Formula 3:

Formula 3

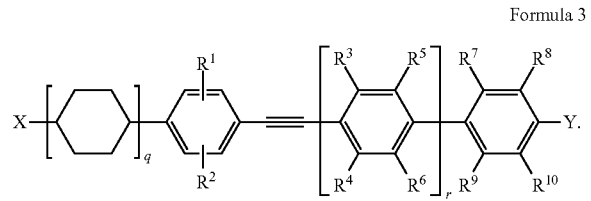

Unless otherwise indicated, when a compound or chemical structural feature, such as alkylphenyl, alkyl, alkylcyclohexylphenyl, phenyl, etc., is referred to as being "optionally substituted," it includes a feature that has no substituents (i.e. unsubstituted), or a feature that is "substituted," meaning that the feature has one or more substituents. The term "substituent" includes a moiety that occupies a position normally occupied by one or more hydrogen atoms attached to a parent compound or structural feature. In some embodiments, a substituent may be an ordinary organic moiety known in the art, which may have a molecular weight (e.g. the sum of the atomic masses of the atoms of the substituent) of 15 g/mol to 50 g/mol, 15 g/mol to 100 g/mol, or 15 g/mol to 150 g/mol. In some embodiments, a substituent comprises, or consists of: 0-30, 0-20, 0-10, or 0-5 carbon atoms; and 0-30, 0-20, 0-10, or 0-5 heteroatoms, wherein each heteroatom may independently be: N, O, F, Cl, Br, or I; provided that the substituent includes one C, N, O, F, Cl, Br, or I atom. In some embodiments, the substituent is alkyl, F, Cl, Br, or I.

With respect to Formula 3, $R^1$ can be H, $CH_3$, or F. In some embodiments, $R^1$ is H. In some embodiments, $R^1$ is $CH_3$. In some embodiments, $R^1$ is F.

With respect to Formula 3, $R^4$ can be H, $CH_3$, or F. In some embodiments, $R^4$ is H. In some embodiments, $R^4$ is $CH_3$. In some embodiments, $R^4$ is F.

With respect to Formula 3, $R^6$ can be H, $CH_3$, or F. In some embodiments, $R^6$ is H. In some embodiments, $R^6$ is $CH_3$. In some embodiments, $R^6$ is F.

With respect to Formula 3, in some embodiments, at least one of $R^1$, $R^2$, $R^3$, and $R^4$ is $CH_3$. In some embodiments, at least two of $R^1$, $R^2$, $R^3$, and $R^4$ are $CH_3$.

With respect to Formula 3, $R^9$ can be H, $CH_3$, or F. In some embodiments, $R^9$ is H. In some embodiments, $R^9$ is $CH_3$. In some embodiments, $R^9$ is F.

In some embodiments, a first liquid-crystalline compound may be represented by Formula 4:

Formula 4

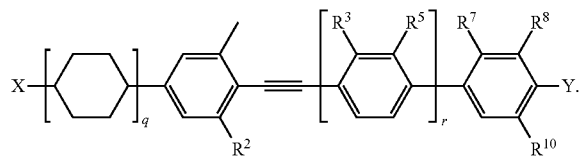

With respect to Formula 3 or Formula 4, $R^2$ is H, $CH_3$, or F. In some embodiments, $R^2$ is H. In some embodiments, $R^2$ is $CH_3$. In some embodiments, $R^2$ is F.

With respect to Formula 3 or Formula 4, $R^3$ is H, $CH_3$, or F. In some embodiments, $R^3$ is H or F. In some embodiments, $R^3$ is H. In some embodiments, $R^3$ is $CH_3$. In some embodiments, $R^3$ is F.

With respect to Formula 3 or Formula 4, $R^5$ is H, $CH_3$, or F. In some embodiments, $R^5$ is H or F. In some embodiments, $R^5$ is H. In some embodiments, $R^5$ is $CH_3$. In some embodiments, $R^5$ is F.

With respect to Formula 3 or Formula 4, $R^7$ is H, $CH_3$, or F. In some embodiments $R^7$ is H or F. In some embodiments, $R^7$ is H. In some embodiments, $R^7$ is $CH_3$. In some embodiments, $R^7$ is F.

With respect to Formula 3 or Formula 4, $R^8$ is H, $CH_3$, or F. In some embodiments, $R^8$ is H or F. In some embodiments, $R^8$ is H. In some embodiments, $R^8$ is $CH_3$. In some embodiments, $R^8$ is F.

With respect to Formula 3 or Formula 4, $R^{10}$ is H, $CH_3$, or F. In some embodiments, $R^{10}$ is H or F. In some embodiments, $R^{10}$ is H. In some embodiments, $R^{10}$ is $CH_3$. In some embodiments, $R^{10}$ is F.

With respect to Formula 3 or Formula 4, in some embodiments, $R^7$ and $R^{10}$ are H.

With respect to Formula 3, in some embodiments at least one of $R^1$ and $R^3$ is $CH_3$.

With respect to Formula 3, in some embodiments, $R^3$-$R^{10}$ are H or F.

With respect to Formula 3 or 4, X is an optionally substituted carbon-based chain, such as $C_{2-8}$ alkyl or $C_{3-7}$ alkyl, including $C_2$ alkyl or $C_3$ alkyl; $C_4$ alkyl or $C_5$ alkyl; or $C_6$ alkyl, $C_7$ alkyl, $C_8$ alkyl; $C_{3-7}$ —O-alkyl, including $C_3$ —O-alkyl, $C_4$ —O-alkyl, $C_5$ —O-alkyl, $C_6$ —O-alkyl, or $C_7$ —O-alkyl. In some embodiments, X is

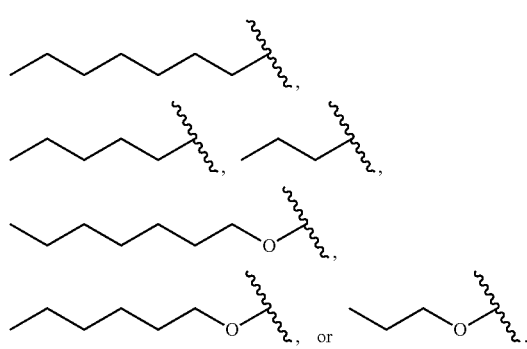

With respect to Formula 3 or 4, Y is a negative polarizable moiety, such as F, Cl, Br, I, CN, or the like. In some embodiments, Y is F or CN. In some embodiments, Y is F. In some embodiments, Y is CN.

With respect to Formula 3 or 4, q is 0 or 1. In some embodiments, q is 0. In some embodiments, q is 1.

With respect to Formula 3 or 4, r is 0 or 1. In some embodiments, r is 0. In some embodiments, r is 1.

With respect to Formula 3 or 4: in some embodiments, q and r are both 0; in some embodiments, q and r are both 1; in some embodiments, q is 0 and r is 1; and in some embodiments, q is 1 and r is 0.

In some embodiments, the first liquid-crystalline compound is:

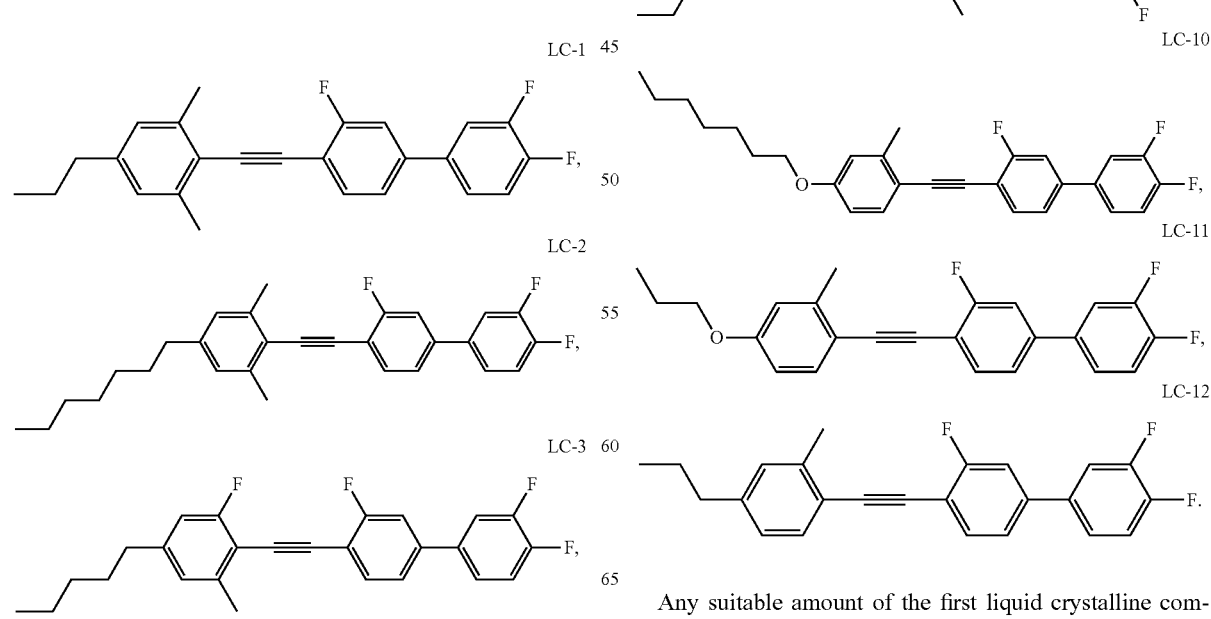

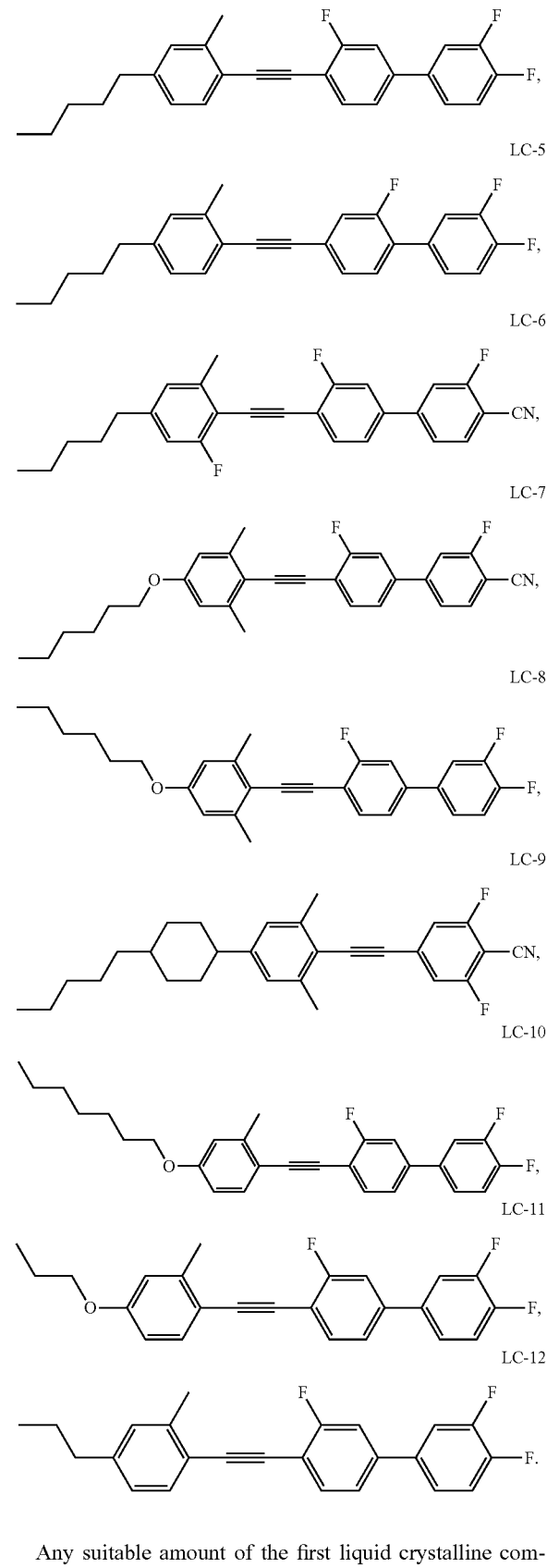

Any suitable amount of the first liquid crystalline compound may be used in the liquid crystalline mixture. In some embodiments, the first liquid crystalline compound is 0.001-0.5 wt %, about 0.5-1 wt %, about 1-1.5 wt %, or about 1.5-2 wt %; about 2-2.5 wt %, about 2.5-3 wt %, about 3-3.5 wt %, or about 3.5-4 wt %; about 4-4.5 wt %, about 4.5-5 wt %, about 5-5.5 wt %, or about 5.5-6 wt %; about 6-6.5 wt %, about 6.5-7 wt %, about 7-7.5 wt %, or about 7.5-8 wt %; about 8-8.5 wt %, about 8.5-9 wt %, about 9-9.5 wt %, or about 9.5-10 wt %, based upon the total weight of the liquid crystalline mixture.

Second Liquid-Crystalline Compound

Additional liquid crystalline compounds in a liquid crystalline mixture may be designated as a second liquid-crystalline compound, a third liquid crystalline compound, a fourth liquid crystalline compound, a fifth liquid crystalline compound, etc.

In some embodiments, an additional liquid crystal compound can be a nematic compound exhibiting positive dielectric anisotropy. In some embodiments, an additional liquid crystal compound can be a nematic compound exhibiting negative dielectric anisotropy. In some embodiments, a suitable additional liquid crystal compound can comprise Merck MLC-2142 (EMD Performance Materials, Philadelphia, Pa.), or Merck MLC-2132 (EMD Performance Materials).

Some additional liquid crystalline compounds may be represented by Formula 5:

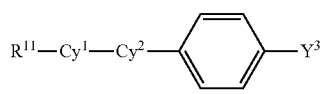

Formula 5

With respect to Formula 5, $R^{11}$ is $C_{3-9}$ alkyl, such as $C_3$ alkyl or $C_4$ alkyl, $C_5$ alkyl or $C_6$ alkyl, $C_7$ alkyl or $C_8$ alkyl, or $C_9$ alkyl; or $C_{3-9}$ —O-alkyl, such as $C_3$ —O-alkyl or $C_4$ —O-alkyl, $C_5$ —O-alkyl or $C_6$ —O-alkyl, $C_7$ —O-alkyl or $C_8$ —O-alkyl, or $C_9$ —O-alkyl; or another substituent. In some embodiments, $R^{11}$ is $C_5$ alkyl, such as pentyl, e.g. —(CH$_2$)$_4$CH$_3$. In some embodiments, $R^{11}$ is $C_6$ alkyl, such as hexyl, e.g. —(CH$_2$)$_5$CH$_3$. In some embodiments, $R^{11}$ is $C_7$ alkyl, such as heptyl, e.g. —(CH$_2$)$_6$CH$_3$. In some embodiments, $R^{11}$ is $C_8$ —O-alkyl, such as —O-octyl, e.g. —O—(CH$_2$)$_7$CH$_3$.

With respect to Formula 5, $Cy^1$ is cyclohexyl or phenyl. In some embodiments, $Cy^1$ is cyclohexyl. In some embodiments, $Cy^1$ is phenyl.

With respect to Formula 5, $Cy^2$ is a single covalent bond or phenyl. In some embodiments, $Cy^2$ is a single covalent bond. In some embodiments, $Cy^2$ is phenyl.

With respect to Formula 5, $Y^3$ could be any substituent, including alkyl, —O-alkyl, a polar group such as CN or —NCS, or another substituent. In some embodiments, $Y^3$ is CN or —NCS. In some embodiments, $Y^3$ is CN. In some embodiments, $Y^3$ is —NCS. In some embodiments, $Y^3$ is an alkyl group.

In some embodiments, an additional liquid crystalline compound may be:

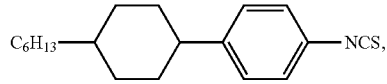

4-hexyl-4'-isothiocyanato-1,1'-biphenyl (6CHBT);

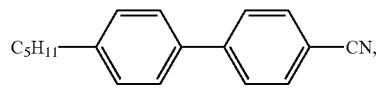

4'-pentyl-[1,1'-biphenyl]-4-carbonitrile (5CB);

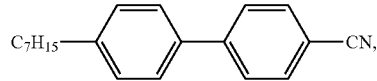

4'-heptyl-[1,1'-biphenyl]-4-carbonitrile (7CB);

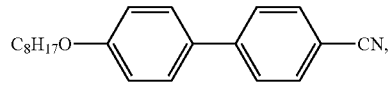

4'-(octyloxy)-[1,1'-biphenyl]-4-carbonitrile (8OCB);

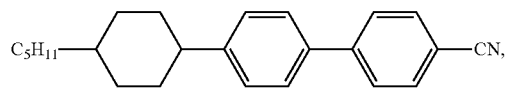

4'-(4-pentylcyclohexyl)-[1,1'-biphenyl]-4-carbonitrile (5CCB), or

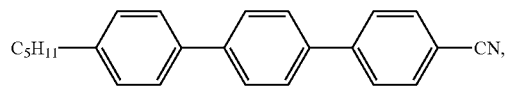

4"-pentyl-[1,1':4',1"-terphenyl]-4-carbonitrile (5CT).

In some mixtures, the mass percentage of 6CHBT can be from 0 wt % to about 15 wt %, such as about 0.1-1 wt %, about 1-2 wt %, or about 2-3 wt %; about 3-4 wt %, about 4-5 wt %, or about 5-6 wt %; about 6-7 wt %, about 7-8 wt %, or about 8-9 wt %; about 9-10 wt %, about 10-11 wt %, or about 11-12 wt %; about 12-13 wt %, about 13-14 wt %, or about 14-15 wt %; about 15-16 wt %, about 16-17 wt %, about 17-18 wt %, about 18-19 wt %, or about 19-20 wt %; about 8.3-12 wt %; or about 20-25 wt %, with respect to the total mass of the liquid crystalline mixture.

For some mixture embodiments, the mass percentage of 5CB can be from about 0 wt % to about 70 wt %, such as about 1-10 wt %, about 10-20 wt %, or about 20-25 wt %; about 25-30 wt %, about 30-34 wt %, or about 34-36 wt %; about 36-38 wt % or about 38-40 wt %; about 40-41 wt %, about 41-42 wt %, or about 42-43 wt %; about 43-44 wt %, about 44-45 wt %, or about 45-46 wt %; about 46-47 wt %. about 47-48 wt %, about 48-49 wt %, about 49-50 wt %, or about 51-52 wt %; about 52-53 wt %, about 53-54 wt %, or about 54-55 wt %; about 55-56 wt %, about 56-57 wt %, about 57-58 wt %, about 58-59 wt %, or about 59-60 wt %; about 60-65 wt % or about 65-70 wt %; or about 45.5 wt % to about 61.7 wt %, etc., with respect to the total mass of the liquid crystalline mixture.

In some embodiments, the mass percentage of 7CB can be from about 0 wt % to about 30 wt %, such as about 0.1-1 wt %, about 1-2 wt %, or about 2-3 wt %; about 3-4 wt %, about 4-5 wt %, or about 5-6 wt %; about 6-7 wt %, about 7-8 wt %, or about 8-9 wt %; about 9-10 wt %, about 10-11 wt %, or about 11-12 wt %; about 12-13 wt %, about 13-14 wt %, or about 14-15 wt %; about 15-16 wt %, about 16-17 wt %, about 17-18 wt %, about 18-19 wt %, or about 19-20 wt %; or about 4.4 wt % to about 25 wt %, etc., with respect to the total mass of the liquid crystalline mixture.

In some liquid crystal mixtures, the mass percentage of 8OCB can be from about 0 wt % to about 20 wt %, such as about 0.1-1 wt %, about 1-2 wt %, or about 2-3 wt %; about 3-4 wt %, about 4-5 wt %, or about 5-6 wt %; about 6-7 wt %, about 7-8 wt %, or about 8-9 wt %; about 9-10 wt %, about 10-11 wt %, or about 11-12 wt %; about 12-13 wt %, about 13-14 wt %, or about 14-15 wt %; about 15-16 wt %, about 16-17 wt %, about 17-18 wt %, about 18-19 wt %, or about 19-20 wt %; or about 4.4 wt % to about 16 wt %, etc., with respect to the total mass of the liquid crystalline mixture.

For some mixtures, the mass percentage of 5CCB can be from 0 wt % to about 18 wt %, such as about 4.5 wt % to about 17 wt %; about 0.1-1 wt %, about 1-2 wt %, or about 2-3 wt %; about 3-4 wt %, about 4-5 wt %, or about 5-6 wt %; about 6-7 wt %, about 7-8 wt %, or about 8-9 wt %; about 9-10 wt %, about 10-11 wt %, or about 11-12 wt %; about 12-13 wt %, about 13-14 wt %, or about 14-15 wt %; about 15-16 wt %, about 16-17 wt %, about 17-18 wt %, about 18-19 wt %, or about 19-20 wt %, etc., with respect to the total mass of the liquid crystalline mixture.

In some embodiments, the mass percentage of 5CT can be from about 0 wt % and about 30 wt %, such as about 8 wt % to about 24.6 wt %; about 0.1-1 wt %, about 1-2 wt %, or about 2-3 wt %; about 3-4 wt %, about 4-5 wt %, or about 5-6 wt %; about 6-7 wt %, about 7-8 wt %, or about 8-9 wt %; about 9-10 wt %, about 10-11 wt %, or about 11-12 wt %; about 12-13 wt %, about 13-14 wt %, or about 14-15 wt %; about 15-16 wt %, about 16-17 wt %, about 17-18 wt %, about 18-19 wt %, or about 19-20 wt %, etc., with respect to the total mass of the liquid crystalline mixture.

For some liquid crystalline mixtures, the mass percentage of MLC-2132 is about 70-72 wt %, about 72-74 wt %, about 74-76 wt %, about 76-78 wt %, about 78-80 wt %, about 80-81 wt %, about 81-82 wt %, about 82-83 wt %, about 83-84 wt %, about 84-85 wt %, about 85-86 wt %, about 86-87 wt %, about 87-88 wt %, about 88-89 wt %, about 89-90 wt %, about 91-92 wt %, about 92-93 wt %, about 93-94 wt %, about or 94-95 wt %, etc., with respect to the total mass of the liquid crystalline mixture.

Chiral Dopant

A liquid crystal mixture may contain a chiral dopant. A chiral dopant may be useful to enhance haze by creating scattering centers. A chiral agent can create a helical configuration, which gives focal conic type alignment of liquid crystal under applied voltage and this gives rise to higher haze. Higher haze may be helpful for the application of privacy.

In some embodiments, the chiral dopant can comprise a di-benzoate based compound, such as (S)-octan-2-yl 4-((4-(hexyloxy)benzoyl)oxy)benzoate (S-811 or ZLI-0811), R-octan-2-yl 4-((4-(hexyloxy)benzoyl)oxy)benzoate (R-811 or ZLI-3786), (S)-1-phenylethane-1,2-diyl bis(4-(4-pentylcyclohexyl)benzoate) (S-1011 or ZLI-4571), or (R)-1-phenylethane-1,2-diyl bis(4-(4-pentylcyclohexyl)benzoate) (R-1011 or ZLI-4572). In some embodiments, the chiral dopant can be (S)-octan-2-yl 4-((4-(hexyloxy)benzoyl)oxy)benzoate (S-811 or ZLI-0811) or R-octan-2-yl 4-((4-(hexyloxy)benzoyl)oxy)benzoate (R-811 or ZLI-3786). In some embodiments, the chiral dopant is R-octan-2-yl 4-((4-(hexyloxy)benzoyl)oxy)benzoate.

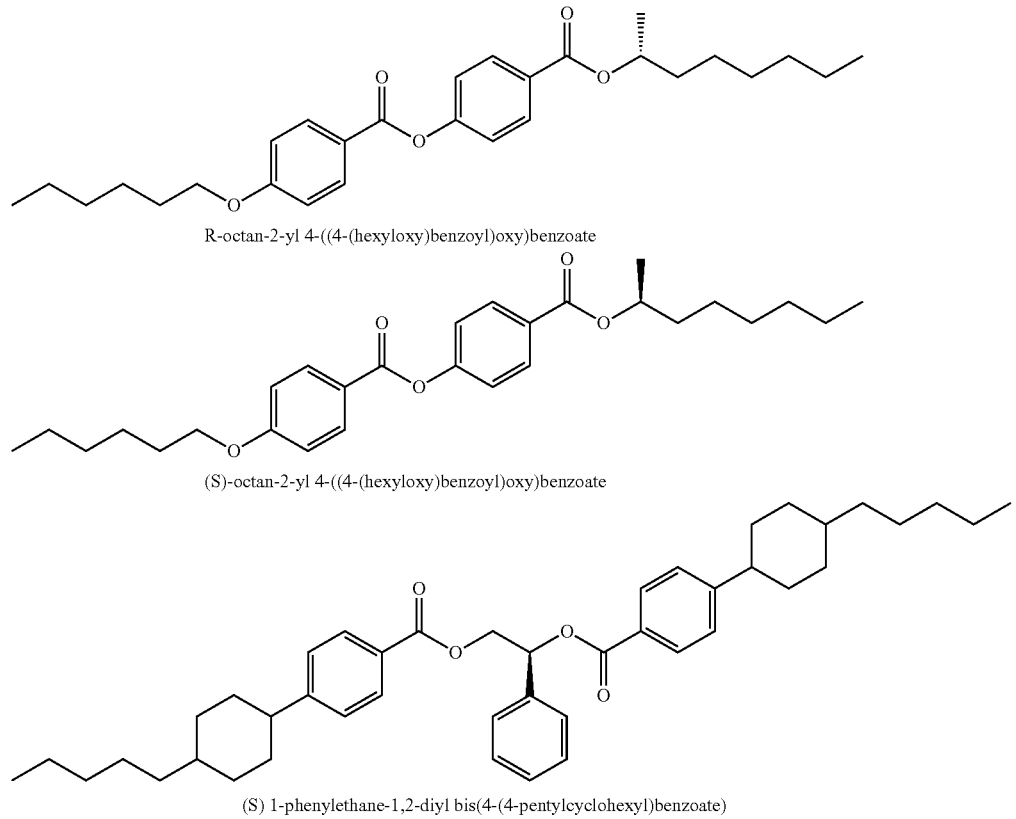

R-octan-2-yl 4-((4-(hexyloxy)benzoyl)oxy)benzoate (S)-octan-2-yl 4-((4-(hexyloxy)benzoyl)oxy)benzoate (S) 1-phenylethane-1,2-diyl bis(4-(4-pentylcyclohexyl)benzoate)

-continued

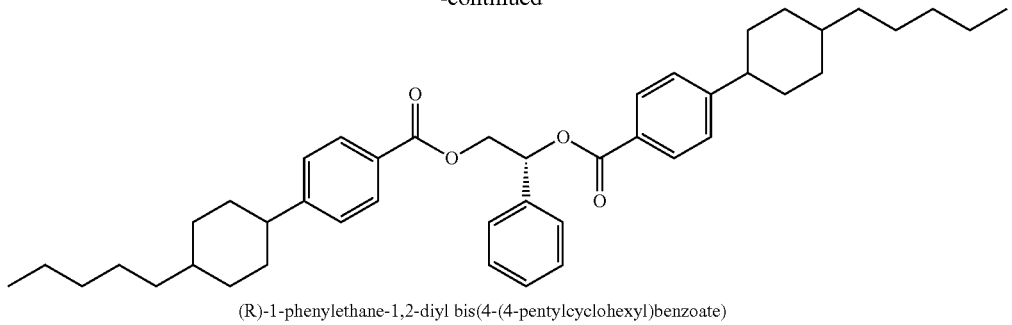

(R)-1-phenylethane-1,2-diyl bis(4-(4-pentylcyclohexyl)benzoate)

In some embodiments, the mass percentage of chiral dopant to the composition can be from about 0-10 wt %, or about 0-5 wt %, about such as about 0.1-1 wt %, about 1-2 wt %, about 2-2.5 wt %, about 2.5-3 wt %, or about 3-3.4 wt %; about 3.4-3.6 wt %, about 3.6-3.8 wt %, or about 3.8-4 wt %; about 4-4.1 wt %. about 4.1-4.2 wt %, about 4.2-4.3 wt %, or about 4.3-4.4 wt %; about 4.4-4.5 wt %, about 4.5-4.6 wt %, or about 4.6-4.7 wt %; about 4.7-4.8 wt %, about 4.8-4.9 wt %, about 4.9-5 wt %, or about 5-5.2 wt %; about 5.2-5.4 wt %, about 5.4-5.7 wt %, or about 5.7-6 wt %; about 6-6.5-wt %, about 6.5-7 wt %, or about 7-8 wt %; about 8-9 wt %, about 9-10 wt %, or about 4.9 wt % to about 4.3 wt %.

Liquid Crystal Element

Typically, a liquid crystal element comprises a liquid crystalline composition, a first alignment layer, and a second alignment layer. The transparency changing layer may comprise a liquid-crystalline composition described herein, and may have a first opposing surface and a second opposing surface. The first alignment layer may bound the first opposing surface, and the second alignment layer may bound the second opposing surface. In some embodiments, the transparency changing layer's opposing surfaces are also the transparency changing layer's surfaces that have the greatest surface areas.

In addition to a liquid crystalline composition, a transparency changing layer may further comprise a spacer, a dispersant, a plasticizers, binders, and/or a solvents.

In some embodiments, a spacer can be used to control the thickness of the liquid crystal element (i.e. defining the gap between the two alignment layers and the conducting substrates). In some embodiments, the spacers provide structural support to ensure a uniform thickness of the liquid crystal element. In some embodiments, the spacers can be in the form of beads. In some embodiments, the spacers can comprise silica dioxide or glass, or a polymer, such as divinylbenzene, polymethylmethacrylate, polybuthymethacrylate, polymethylsilsesquioxane, polyurethane, polytetrafluoroethylene (Teflon), benzocyclobutene (BCB), amorphous fluoropolymer (Cytop), perfluorocyclobutene, or combinations thereof.

A bead may have any appropriate diameter depending upon the desired spacing characteristics sought. For example, the beads may have an average diameter of about 1-60 μm, about 1-50 μm, about 1-5 μm, about 10 μm, about 15 μm, or to about 20 μm, to about 50 μm; about 1-2 μm, about 2-3 μm, about 3-4 μm, about 4-5 μm, about 5-6 μm, about 6-7 μm, about 7-8 μm, about 8-9 μm, or about 9-10 μm; about 10-11 μm, about 11-12 μm, about 12-13 μm, about 13-14 μm, about 14-15 μm, about 15-16 μm, about 16-17 μm, about 17-18 μm, about 18-19 μm, or about 19-20 μm; about 20-21 μm, about 21-22 μm, about 22-23 μm, about 23-24 μm, about 24-25 μm, about 25-26 μm, about 26-27 μm, about 27-28 μm, about 28-29 μm, or about 29-30 μm; about 30-31 μm, about 31-32 μm, about 32-33 μm, about 33-34 μm, about 34-35 μm, about 35-36 μm, about 36-37 μm, about 37-38 μm, about 38-39 μm, or about 39-40 μm; about 40-41 μm, about 41-42 μm, about 42-43 μm, about 43-44 μm, about 44-45 μm, about 45-46 μm, about 46-47 μm, about 47-48 μm, about 48-49 μm, or about 49-50 μm; about 50-51 μm, about 51-52 μm, about 52-53 μm, about 53-54 μm, about 54-55 μm, about 55-56 μm, about 56-57 μm, about 57-58 μm, about 58-59 μm, or about 59-60 μm; or any combination thereof. In some embodiments, the spacers can be dispersed in a random distribution. In some embodiments, the spacers can be dispersed uniformly. In some embodiments, the liquid crystal element may contain spacers with an average spacer density ranging from about 10 spacers/in$^2$ to about 1000 spacers/in$^2$. In some embodiments, the liquid crystal element may contain spacers with an average spacer density of about 10 spacers/in$^2$, about 20 spacers in$^2$, about 25 spacers/in$^2$, about 50 spacers/in$^2$ to about 100 spacers/in$^2$, about 200 spacers/in$^2$, about 500 spacers/in$^2$, about 1000 spacers/in$^2$, or any combination thereof.

An alignment layer, such as a first alignment layer or a second alignment layer, is a layer that helps to align a liquid crystalline compound. The alignment layer may be composed of any suitable alignment material, or a material that can help with this alignment. In some embodiments, the alignment layers can comprise a polyimide.

Some liquid crystals may have positive dielectric anisotropy, negative dielectric anisotropy, or neutral dielectric anisotropy. In some embodiments, the liquid crystal mixture can comprise one or more compounds with positive dielectric anisotropy. In some embodiments, the liquid crystal mixture can comprise one or more compounds with negative dielectric anisotropy. In some embodiments, the liquid crystal mixture can comprise both a compound with positive dielectric anisotropy and a compound with negative dielectric anisotropy.

The dielectric anisotropy is related to dielectric properties as well as optical properties depending on the direction, either along the length of the molecule (or molecular axis), or perpendicular to the length of the molecule (or molecular axis). The dielectric properties depend on the molecular shape and substituent moieties and their locations on a given molecule.

Molecules with a positive dielectric anisotropy include molecules having a dielectric constant parallel to the length of the molecule that is greater than the dielectric constant perpendicular to the length of the molecule, where the length of a molecule is defined as vector between the two farthest moieties. Molecules with a negative dielectric anisotropy include molecules having a dielectric constant perpendicular to the length molecule that is greater than the dielectric constant parallel to the length of the molecule, where the length of a molecule is defined as vector between the two farthest moieties. Molecules with a neutral dielectric anisotropy include molecules having dielectric constant perpendicular to the length molecule that is approximately the same as (e.g. a difference that is less than about 5% or less than about 1%) the dielectric constant parallel to the length of the molecule, where the length of a molecule is defined as vector between the two farthest moieties.

For liquid crystal mixtures having a positive dielectric anisotropy, the polyimide can be chosen to help liquid crystalline compounds to homogenously align with the alignment layer, or to be oriented roughly parallel to the alignment layer, when there is no voltage applied. For example, a polyimide may be chosen that has a low pre-tilt angle. The pre-tilt angle is the angle between a substrate containing the polymide and the direction along the length of the liquid crystal compound(s) that results from the presence of the polyimide. For a transparency changing layer having two opposing surfaces that are bounded by two alignment layers, the pre-tile angle will be approximately the angle between the surface of the alignment layer and the liquid crystalline compounds in the transparency changing layer.

For some liquid crystal mixtures having a positive dielectric anisotropy, the homogenous-alignment polyimide can comprise a polyimide that has a pre-tilt angle of less than about 15 degrees; less than about 5 degrees; about 0.01-1 degrees, about 1-2 degrees, or about 2-3 degrees; about 3-4 degrees, about 4-5 degrees, or about 5-6 degrees; about 6-7 degrees, about 7-8 degrees, or about 8-9 degrees; about 9-10 degrees, about 10-11 degrees, or about 11-12 degrees; or about 12-13 degrees, about 13-14 degrees, or about 14-15 degrees. In some embodiments, the homogenous-alignment polyimide can comprise: AL3056, AL16301, AL17901, PI-2525, PI-2555, PI-2574, SE-141, SE-150, SE-4540, SE-6441, SE-7792, SE-8292, LX-1400, or combinations thereof.

For liquid crystal mixtures having a negative dielectric anisotropy, the polyimide can be chosen to help a liquid crystalline compound to homeotropically align with an alignment layer, or to be oriented perpendicularly to the alignment layer, when there is no voltage applied. For example a polyimide may have a pre-tilt angle of about 85-90 degrees, about 75-76 degrees, or about 76-77 degrees; about 77-78 degrees, about 78-79 degrees, or about 79-80 degrees; about 80-81 degrees, about 81-82 degrees, or about 82-83 degrees; about 83-84 degrees, about 85-86 degrees, or about 86-87 degrees; about 87-88 degrees, about 88-89, or about 89-90 degrees. In some embodiments the homeotropic-alignment polyimide can comprise a polyimide that has a pre-tilt angle of about 90 degrees. In some embodiments, the homeotropic-alignment polyimide can comprise of a polyimide selected from PI 1211, S60702, S659, SE-1211, SE-5300, SE-5661, or combinations thereof.

In some embodiments, a liquid crystalline element is configured so that when a voltage is applied across the element, the liquid crystals will rotate from their pre-tilt positions in response to the application of an electric field. The change in orientation may result in a change of index of refraction due to the change in orientation of the individual molecules. The change in the liquid crystal index of refraction within the suspended liquid crystal droplets can result in an index of refraction mismatch between the droplets and the polymer. If the droplets are of an appropriate size, the index of refraction mismatch and the polymer can result in a haze or loss of transparency in the liquid crystalline element due to light scatter.

In addition to an alignment material, an alignment layer may further comprise a dispersant, a plasticizer, binder, and/or a solvent.

In some embodiments, the liquid crystal element can also comprise a dispersant such as an ammonium salts, e.g., $NH_4Cl$; Flowlen; fish oil; long chain polymers; steric acid; oxidized Menhaden Fish Oil (MFO); dicarboxylic acids such as but not limited to succinic acid, ethanedioic acid, propanedioic acid, pentanedioic acid, hexanedioic acid, heptanedioic acid, octanedioic acid, nonanedioic acid, decanedioic acid, o-phthalic acid, and p-phthalic acid; sorbitan monooleate; or a mixture thereof. In some embodiments, the dispersant can comprise oxidized MFO.

In some embodiments, the liquid crystal element can also comprise a plasticizer. A plasticizer can be type 1 plasticizer, that can generally decrease the glass transition temperature (Tg), e.g. makes it more flexible, phthalates (n-butyl, dibutyl, dioctyl, butyl benzyl, mixed esters, and dimethyl); and type 2 plasticizers that can enable more flexible, more deformable layers, and perhaps reduce the amount of voids resulting from lamination, e.g., glycols (polyethylene; polyalkylene; polypropylene; triethylene; dipropylglycol benzoate).

Type 1 plasticizers can include, but are not limited to: butyl benzyl phthalate, dicarboxylic/tricarboxylic ester-based plasticizers such as but not limited to phthalate-based plasticizers such as but not limited to bis(2-ethylhexyl) phthalate, diisononyl phthalate, bis(n-butyl)phthalate, butyl benzyl phthalate, diisodecyl phthalate, di-n-octyl phthalate, diisooctyl phthalate, diethyl phthalate, diisobutyl phthalate, di-n-hexyl phthalate and mixtures thereof; adipate-based plasticizers such as but not limited to bis(2-ethylhexyl) adipate, dimethyl adipate, monomethyl adipate, dioctyl adipate and mixtures thereof; sebacate-based plasticizers such as but not limited to dibutyl sebacate, and maleate.

Type 2 plasticizers can include, but not limited to: dibutyl maleate, diisobutyl maleate and mixtures thereof, polyalkylene glycols such as but not limited to polyethylene glycol, polypropylene glycol and mixtures thereof. Other plasticizers which may be used include but are not limited to benzoates, epoxidized vegetable oils, sulfonamides such as but not limited to, N-ethyl toluene sulfonamide, N-(2-hydroxypropyl)benzene sulfonamide, N-(n-butyl)benzene sulfonamide, organophosphates such as but not limited to, tricresyl phosphate, tributyl phosphate, glycols/polyethers such as, but not limited to, triethylene glycol dihexanoate, tetraethylene glycol diheptanoate and mixtures thereof; alkyl citrates such as, but not limited to, triethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trimethyl citrate, alkyl sulphonic acid phenyl ester, and mixtures thereof.

In some embodiments, the liquid crystal element can also comprise a binder. In some embodiments, an organic binder can be used. In some embodiments, an organic binder can comprise a vinyl polymer such as, but not limited to, polyvinyl butyral (PVB), polyvinyl alcohol (PVA), polyvinyl chloride (PVC), polyvinyl acetate (PVAc), polyacrylonitrile, a mixture thereof or a copolymer thereof; polyethyleneimine; poly methyl methacrylate (PMMA); vinyl chloride-acetate; and mixtures thereof. In some embodiments, the organic binder can comprise PVB.

In some embodiments, the liquid crystal element can also comprise a solvent as part of the method of synthesizing the element. In some embodiments, the solvent can comprise a polar solvent, such as water or tetrahydrofuran (THF). In some embodiments, the polar solvent can comprise THF. In some embodiments, the solvent may comprise a non-polar solvent. In some embodiments, the non-polar solvent may be an organic solvent. In some embodiments, the non-polar solvent may include, but is not limited to, a lower alkanol such as but not limited to ethanol, methanol, isopropyl alcohol, xylenes, cyclohexanone, acetone, toluene and methyl ethyl ketone, and mixtures thereof. In some embodiments, the non-polar solvent may be toluene.

Some liquid crystal elements may be generally represented by FIG. 1A or FIG. 1B. In FIGS. 1A and 1B a liquid crystal element, e.g. liquid crystal element 100, comprises a transparency changing layer, 110, and at least two alignment layers, 120. In the particular embodiments depicted by FIGS. 1A and 1B, the transparency changing layer has two opposing surfaces bounded by the two alignment layers 120.

In some embodiments, the transparency changing layer, 110, can comprise any of the aforedescribed liquid crystal compositions. As shown in FIG. 1A or 1B, some compositions can comprise a polymer and a liquid crystal mixture, where the mixture is dispersed within the transparency changing layer such that the mixture forms droplets, 111, suspended within the polymer matrix, 112. In some embodiments, as shown in FIG. 1A, the composition can comprise a liquid crystal mixture of one or more positive dielectric anisotropic compounds, 113. Non-limiting examples of positive dielectric anisotropic compounds can be LC-1 described in detail elsewhere in this document. In some embodiments, as shown in FIG. 1B, the composition can comprise a mixture of one or more negative dielectric anisotropic compounds, 114. In some embodiments, the composition can comprise a mixture of both a positive dielectric anisotropic compound and a negative dielectric anisotropic compound. In some embodiments, the transparency changing layer can be described as a polymer dispersed liquid crystal (PDLC). In some embodiments, the transparency changing layer can further comprise spacers, 115.

In some embodiments, the transparency changing layer can be described as a PDLC, where the liquid crystal mixture forms droplets within the polymer matrix. In some embodiments, the liquid crystal droplets form as suspended precipitate during the polymerization of the polymer precursors, and thus the liquid crystalline mixture is suspended as a precipitate within the polymer. In some embodiments, the droplets can have a uniform distribution, a gradient distribution, or a random distribution within the polymer matrix. In some embodiments, the droplets can have a uniform distribution within the polymer matrix.

In some embodiments, the liquid crystal element can be opaque to visible light but turn transparent upon the application of an electric field, or a normal mode PDLC. In some embodiments, the liquid crystal element can be transparent to visual light but opaque upon the application of an electric field, or a reverse mode element. In some embodiments, the liquid crystal element can be characterized as a reverse mode PDLC element.

In some embodiments, the liquid crystal element can also comprise a surfactant. In some embodiments, the surfactant can comprise octanoic acid, heptanoic acid, hexanoic acid, and/or combinations thereof. In some embodiments, the surfactant can comprise acetylinic diol-based compounds, such as, for example, tetramethyl decynediol in a 2-ethyl hexanol solvent (Surfynol® 104A), ethoxylated acetylenic diols (Dynol® 604), dodecylbenzene sulfonate (Witconate® P-1059), Witcoamide® 511, Witcoamide® 5138, Surfynol® CT-171, Surfynol® CT-111, Surfynol® CT-131, Surfynol® TG, DBE Microemulsion, Fluorad® FC-431, Fluorad® FC-430, Surfynol® 104A, Dynol® 604, or combinations thereof.

Selectively Dimmable Device

A liquid crystal element may be incorporated into a selectively dimmable device. The selectively dimmable device can comprise the liquid crystal element disposed between a first conductive substrate and a second conductive substrate. A selectively dimmable device also includes a voltage source which is configured so that the substrates, the element, and the voltage source are all in electrical communication such that when a voltage is applied by the voltage source an electric field is applied across the element.

A conductive substrate can comprise a base, which comprises a conductive material, such as a conductive polymer. In some embodiments, the conductive polymer can comprise poly(3,4-ethylenedioxythiophene) (PEDOT), PEDOT: poly (styrene sulfonate) (PSS), and/or combinations thereof.

In some embodiments, each conductive substrate can further comprise an electron conduction layer which is in physical communication with the base. In some embodiments, the electron conduction layer is placed in direct physical contact with the base, such as a layer on top of the base. In other embodiments, the electron conduction layer may be impregnated directly into the base (e.g. ITO glass), or sandwiched in between two bases to form a single conductive substrate. In some embodiments, where there is an electron conduction layer present, the base can comprise a non-conductive material. In some embodiments, non-conductive material can comprise glass, polycarbonate, polymer, or combinations thereof. In some embodiments, the substrate polymer can comprise polyvinyl alcohol (PVA), polycarbonate (PC), acrylics including but not limited to Poly(methyl methacrylate) (PMMA), polystyrene, allyl diglycol carbonate (e.g. CR-39), polyesters, polyetherimide (PEI) (e.g. Ultem®), Cyclo Olefin polymers (e.g. Zeonex®), triacetylcellulose (TAC), polyethylene terephthalate (PET), polyethylene naphthalate (PEN), or combinations thereof. In some embodiments, the substrate can comprise polyethylene terephthalate (PET), polyethylene naphthalate (PEN), or a combination thereof. In some embodiments, the electron conduction layer can comprise a transparent conductive oxide, a conductive polymer, a metal grid, carbon nanotubes (CNT), graphene, or a combination thereof. In some embodiments, the transparent conductive oxide can comprise a metal oxide. In some embodiments, the metal oxide can comprise iridium tin oxide (IrTO), indium tin oxide (ITO), fluorine doped tin oxide (FTO), doped zinc oxide, or combinations thereof. In some embodiments, the metal oxide can comprise indium tin oxide incorporated onto the base, e.g. ITO glass, ITO PET, or ITO PEN.

FIGS. 2 and 3 schematically depict the structure of some embodiments of a selectively dimmable device, e.g. selectively dimmable device, 200. Selectively dimmable device 200 can include conductive substrates, such as conductive substrates 210, liquid crystal element, 100 and a voltage source. Liquid crystal element 100 may be disposed in a gap between two conductive substrates 210. In some embodiments, liquid crystal element 100, conductive substrates 210, and the voltage source are in all in electrical communication such that upon the application of a voltage from the voltage source, an electric field is applied across liquid crystal element 100.

In some embodiments, the conductive substrates can each comprise a base, e.g. base 211, where the base can be conductive. In some embodiments, each conductive substrate can further comprise an electron conductive layer, e.g. electron conductive layer 212, which is in physical contact with the base.

In some embodiments with electron conduction layers, the base can be non-conductive. In some embodiments, the device can further comprise a sealant, e.g. sealant 250, to protect the liquid crystal element from the environment. In some embodiments, the device can further comprise an adhesive layer, 260, and a removable backing, 261, to allow application to existing windows.

As shown in FIGS. 2 and 3, in some embodiments of the device the liquid crystal element integrated into the device, 100, can comprise a polymer matrix, 112, in which the polymer dispersed liquid crystal droplets, 111, are suspended, all bound by two alignment layers, 120. In some embodiments of the device, as shown in FIG. 2, the liquid crystal droplets can comprise a positive dielectric anisotropic compound, 114. In other embodiments of the device, as shown in FIG. 3, the liquid crystal droplets can comprise a negative dielectric anisotropic compound, 113. In still other embodiments, the liquid crystal droplets can comprise of a combination of positive and negative dielectric anisotropic compounds.

In some embodiments of the device, the liquid crystal element can be chosen such that under a condition when there is no induced electric field is present, within the transparency changing layer, the index of refraction of the liquid crystal composition and the index of refraction of the polymer are similar relative to each other so that the total transmission of visible light allowed to pass through the device can be at least about 70%, at least about 75%, at least about 80%, at least about 85%, at least about 90%, and/or at least about 95%. In some embodiments, when there is an electric field present, e.g. due to a voltage applied to the electrical circuit, the index of refraction of the liquid crystal and the index of refraction of the polymer can vary relative to each other so that incident light is scattered and at most only about 70%, only about 65%, only about 60%, only about 50%, only about 30%, only about 25%, only about 15%, only about 10%, or only about 5% of visible light is allowed to pass through the device. In some embodiments, the magnitude of the electric field necessary to achieve scattering corresponds to applying a voltage of less than 120 V, less than 110 V, less than 50 V, less than 20 V, less than 15 V, less than 12 V, less than 10 V, or less than 5V across the device. Across the device is the direction normal to the plane of the display, or from a first conductive substrate to a second conductive substrate. In some embodiments, the electric field across the device is less than about 500 kV/m, less than about 1,000 kV/m, less than about 5,000 kV/m, less than about 10,000 kV/m, less than about 20,000 kV/m, less than about 40,000 kV/m to less than about 80,000 kV/m. It is believed that the effectiveness of dimming of the device can also be depicted in terms of percentage of haze, which generally can be defined as:

$$\text{Haze } [\%] = \frac{\text{Total Light Transmitted} - \text{Diffuse Light Transmitted}}{\text{Total Light Transmitted}} \times 100\%,$$

where the total light transmitted is the light from a known source and the diffuse light transmitted is the light transmitted through the element. In some embodiments, the haze of the device can be a maximum of about 4.5%, about 5%, about 7%, about 8%, about 10%, about 15%, about 20%, about 25%, or about 30% when a voltage of 0 volts, or no voltage, less than about 2 volts, less than about 4 volts, less than about 5 volts, or any combination of the aforementioned values, is applied to the device.

In some embodiments, the haze of the device can be at least about 20%, about 25%, about 28%, about 30%, about 35%, about 40%, about 50%, about 70%, about 75%, about 85%, about 90%, about 95%, when a voltage of at least 15 volts, 30 volts, or 60 volts is applied to achieve scattering.

In some embodiments, the device is resistant to ultraviolet (UV) radiation. In some embodiments, the resistance to UV radiation can be exhibited by a minimized change in Yellowness Index (YI) after prolonged exposure to UV radiation. In some embodiments, the relative change in YI can be less than about 500%, less than about 200%, less than about 100%, less than about 80%, or less than about 50%, after exposure to about 80 hours, about 100 hours, about 140 hours, about 160 hours, or about 200 hours of 10 mW/cm$^2$ UV radiation, or any combination of the aforementioned values. Suitable methods for determining YI are disclosed in ASTM E313 and/or ASTM D1925, which are incorporated by reference in their entireties.

In some embodiments, the device can be characterized as having a long endurance when exposed to an extended continuous duty cycle or multiple cyclic duty cycles. In some embodiments, the device can sustain operation with a relative increase of off-mode haze of at most about 250%, about 230%, about 200%, about 100%, or about 70%, when the device has been operated continuously for at least about 30 hours, about 40 hours, about 50 hours, about 60 hours, about 64 hours, about 70 hours, or about 80 hours, or any combination of the aforementioned values. The some embodiments, the device can sustain cyclic operation with a relative increase of off-mode haze of at most about 200%, about 180%, about 160%, about 155%, or about 50% after, about 1,000 cycles, 5,000 cycles, 7,000 cycles, or 10,000 cycles, or any combination of the aforementioned values. One cycle refers to cycling the device on at 20 volts for 10 seconds and then off at zero volts for 10 seconds.

In some embodiments, the device can be semi-rigid or rigid. In some embodiments, the device can be flexible. A device is flexible if it can have a radius of curvature of 10,000 mm without withstanding material failure (e.g., fractures and delamination). In some embodiments, a selectively dimmable device can form a flexible sheet, as shown in FIG. 4, which can be applied between or on the surface of pre-existing windows. In some embodiments, the conductive substrates can comprise flexible materials so that the aforementioned device may be a flexible film. In some embodiments, the flexible device may be placed in between or on one side of pre-existing window glass to provide a dimming capability. In other embodiments, the device can be rigid, the base comprising inflexible materials.

In some embodiments, as shown in FIGS. 2 and 3, the selectively dimmable device can also comprise a sealant, 250. In some embodiments, the sealant can encapsulate liquid crystal element between the conductive substrates to protect the element from the environment. In some embodiments, the sealant can comprise a two-part real time cure epoxy, 3-Bond 2087, or the like. In some embodiments, the sealant can comprise a UV-curable photopolymer, such as NOA-61, or the like. In some embodiments, as shown in FIG. 4, the selectively dimmable device can also comprise an adhesive layer, 260. In some embodiments, the adhesive layer will allow a flexible sheet embodiment of the aforementioned device to be installed on pre-existing windows. In some embodiments, the adhesive can comprise an optically clear adhesive (OCA). In some embodiments, the OCA can comprise OCA products commercially available and known to those skilled in the art (e.g., Nitto OCA tape, Scapa OCA tape). In some embodiments, the selectively dimmable device can also comprise a removable carrier substrate, 261, to protect the adhesive layer from contamination which will be peeled away before the device's application.

The following embodiments are specifically contemplated:

Embodiment 1

A liquid-crystalline composition comprising, (1) a polymer created by polymerization of a monomer of a formula:

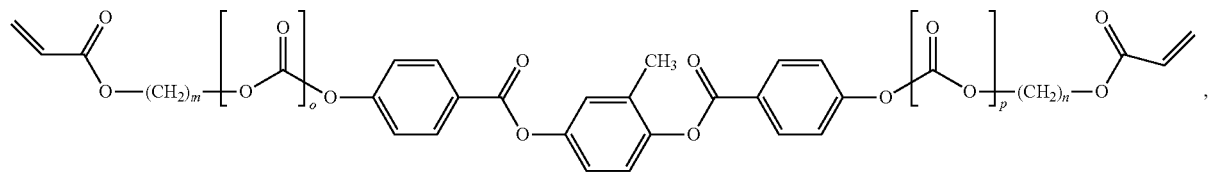

wherein m and n are independently 1, 2, 3, 4, 5, or 6, and o and p are independently 0 or 1; and (2) a liquid crystalline mixture comprising a first liquid crystalline compound of a formula:

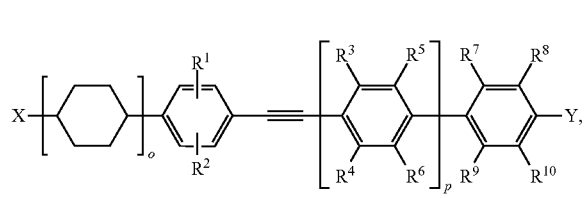

wherein $R^1$ is H or $CH_3$; $R^2$, $R^3$, $R^4$, $R^5$, $R^6$, $R^7$, $R^8$, $R^9$, and $R^{10}$ are independently H, $CH_3$, or F, wherein at least one of $R^1$ and $R^3$ is $CH_3$; X is $C_{2-8}$ alkyl; Y is F or CN; and o and p are independently 0 or 1;

wherein the liquid crystalline mixture is dispersed within the polymer.

Embodiment 2

The liquid-crystalline composition of embodiment 1, wherein the first liquid crystalline compound is further represented by the formula:

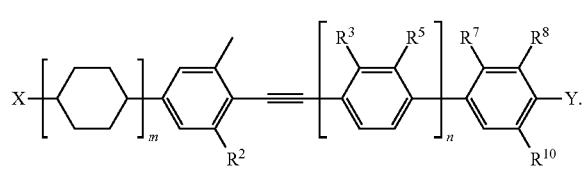

Embodiment 3

The liquid-crystalline composition of embodiment 1 or 2, wherein X is:

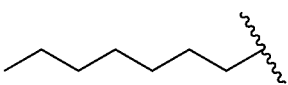

Embodiment 4

The liquid-crystalline composition of embodiment 1, wherein the first liquid crystalline compound is:

LC-1
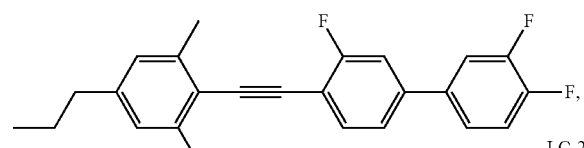

LC-2
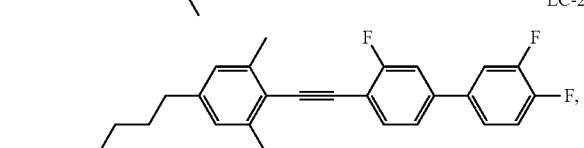

LC-3
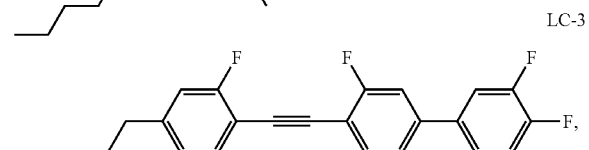

LC-4
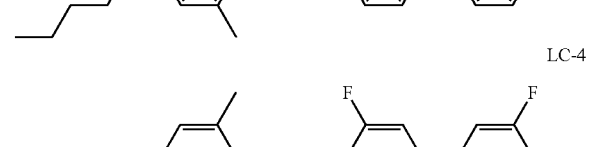

LC-5
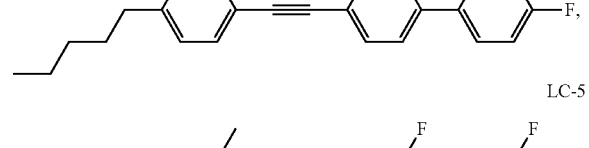

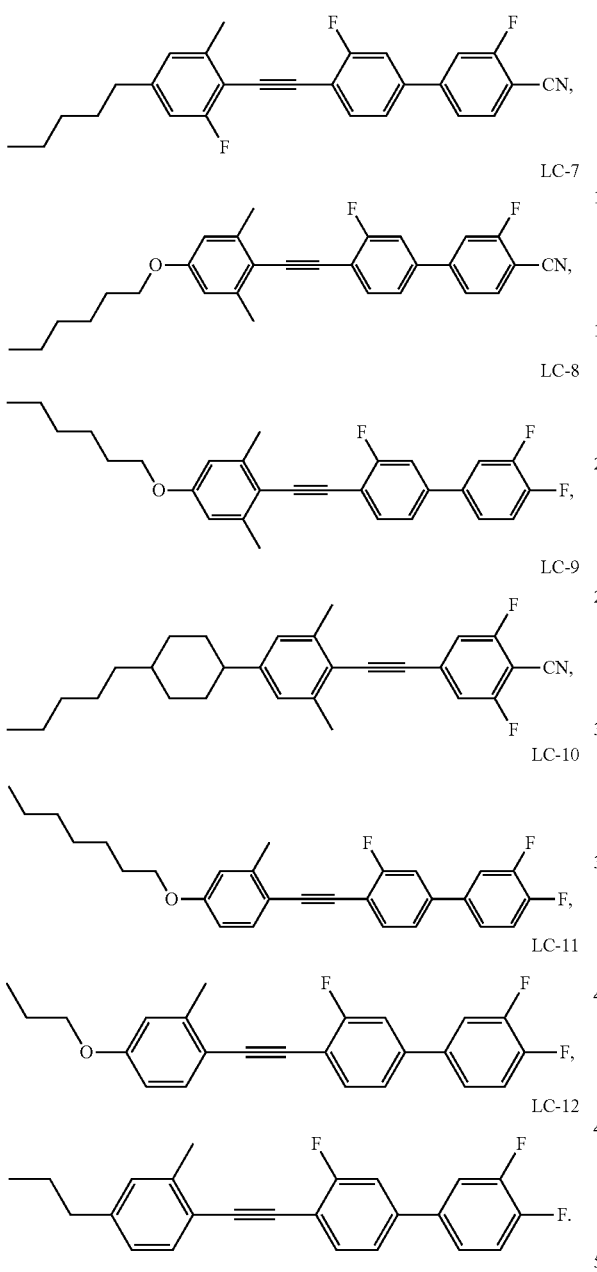

Embodiment 5

The liquid-crystalline composition of embodiment 1, 2, 3, or 4, wherein the liquid crystal mixture further comprises a second liquid crystalline compound of the formula:

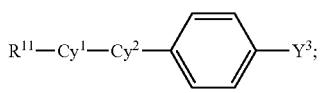

wherein $R^{11}$ is $C_{3-9}$ alkyl or $C_{3-9}$ —O-alkyl, $Cy^1$ is cyclohexyl or phenyl, $Cy^2$ is a single covalent bond or phenyl; and $Y^3$ is CN or —NCS.

The liquid-crystalline composition of embodiment 1, 2, 3, 4, 5, or 6, further comprising R-octan-2-yl 4-((4-(hexyloxy)benzoyl)oxy)benzoate.

Embodiment 6

A liquid crystal element comprising:
a transparency changing layer comprising the liquid-crystalline composition of embodiment 1, 2, 3, 4, or 5, and having a first opposing surface and a second opposing surface, and
a first alignment layer bounding the first opposing surface; and
a second alignment layer bounding the second opposing surface.

Embodiment 7

A selectively dimmable device comprising:
the liquid crystal element of embodiment 6 disposed between a first conductive substrate and a second conductive substrate; and
a voltage source;
wherein the element, the first conductive substrate, the second conductive substrate, and the voltage source are all in electrical communication such that when a voltage is applied by the voltage source an electric field is applied across the element.

Embodiment 8

The device of embodiment 6, wherein the device has a haze of at most 7% when there is no voltage applied across the device.

Embodiment 9

The device of embodiment 6, wherein the device has a haze of at least 28% when a voltage of at least 60 volts is applied across the device.

Embodiment 10

The device of embodiment 6, wherein the substrates are flexible so that the device forms a flexible sheet.

EXAMPLES

It has been discovered that embodiments of the liquid crystal composition and related reverse-mode polymer dispersed liquid crystal elements and devices described herein provide the ability for a selectively dimmable surface. These benefits are further shown by the following examples, which are intended to be illustrative of the embodiments of the disclosure, but are not intended to limit the scope or underlying principles in any way.

In general, the preparation of the compounds was performed in an argon atmosphere (Airgas, San Marcos, Calif. USA) inside of a fume-hood. In addition, where degassing is mentioned it can be performed by bubbling of argon (Airgas) through the compound or other similar methods.

Example 1.1: Synthesis of Liquid Crystal Compound (LC-1)

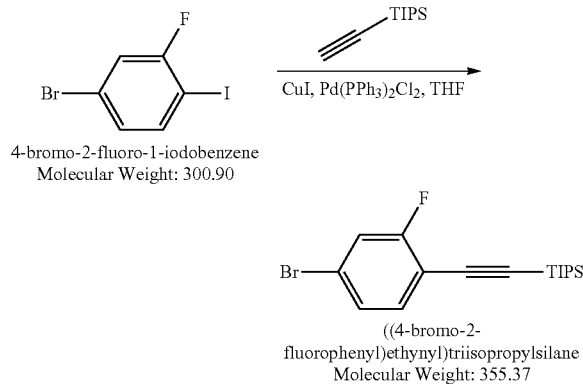

4-bromo-2-fluoro-1-iodobenzene
Molecular Weight: 300.90

((4-bromo-2-fluorophenyl)ethynyl)triisopropylsilane
Molecular Weight: 355.37

(4-Bromo-2-fluorophenyl)ethynyl)triisopropylsilane: Under Nitrogen protection, a mixture of 4-bromo-2-fluoro-1-iodobenzene (30.1 g, 0.1 mol), Pd(PPh$_3$)$_2$Cl$_2$ (0.7 g, 0.001 mol), CuI (0.57 g, 0.003 mol), triethylamine (20.2 g, 0.2 mol), anhydrous THF (100 mL) was stirred at 0° C. TIPS acetylene (18.23 g, 0.1 mol) was added drop wise to above mixture over 1 hour period. The resulting mixture was stirred at RT for 16 hours. The salts were removed by filtration. The filtrate was concentrated to dryness. The residue was dissolved into Hexanes (350 mL), light brown insoluble materials were filtered off, the filtrate was concentrated to gain 35.5 g oil product. Yield 100%. LCMS M+H=356.

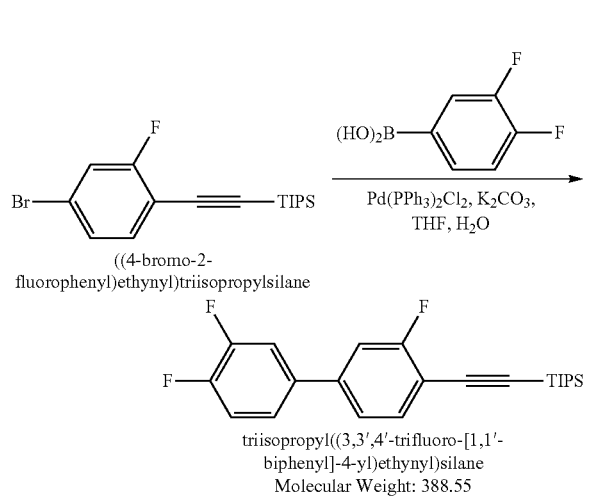

((4-bromo-2-fluorophenyl)ethynyl)triisopropylsilane triisopropyl((3,3',4'-trifluoro-[1,1'-biphenyl]-4-yl)ethynyl)silane
Molecular Weight: 388.55

Triisopropyl((3,3',4'-trifluoro-[1,1'-biphenyl]-4-yl)ethynyl)silane: Under Nitrogen protection, a mixture of (4-bromo-2-fluorophenyl)ethynyl)triisopropylsilane (7.017 g, 20 mmol), Pd(PPh$_3$)$_2$Cl$_2$ (0.28 g, 0.4 mmol), K$_2$CO$_3$ (5.6 g, 40 mmol), 3,4-difluorophenylboronic acid (3.8 g, 24 mmol), THF (20 mL), and H$_2$O (20 mL) was refluxed for 4 hours. The mixture was cooled to RT than poured into saturated water. The organic layer was extracted into Toluene (50 mL) and washed twice with water (2×35 mL). The organic layer was separated, concentrated to dryness. The crude product was purified by silica gel column chromatography, Hexanes was used for eluting to gain 4.41 g colorless solid product. Yield 96.25%. LCMS M−H=388.

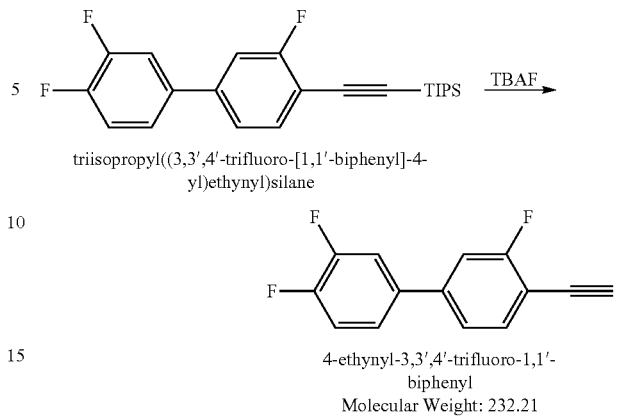

triisopropyl((3,3',4'-trifluoro-[1,1'-biphenyl]-4-yl)ethynyl)silane 4-ethynyl-3,3',4'-trifluoro-1,1'-biphenyl
Molecular Weight: 232.21

4-Ethynyl-3,3',4'-trifluoro-1,1'-biphenyl: TBAF 1M solution in THF (48.12 mL, 48.12 mmol) was added to a mixture of triisopropyl((3,3',4'-trifluoro-[1,1'-biphenyl]-4-yl) ethynyl)silane (7.48 g, 19.25 mmol) in THF (200 mL) at 0° C. over 15 minutes period. The resulting mixture was stirred at RT for 2 hours then poured into saturated NH$_4$Cl aqueous solution (100 mL). The mixture was stirred at RT for 15 minutes. Diethyl ether (200 mL) was added and the organic layer was separated, concentrated. The crude product was purified by silica gel column chromatography, Hexanes was used for eluting to gain 4.41 g colorless solid product. Yield 98.7%. LCMS M−H=231.

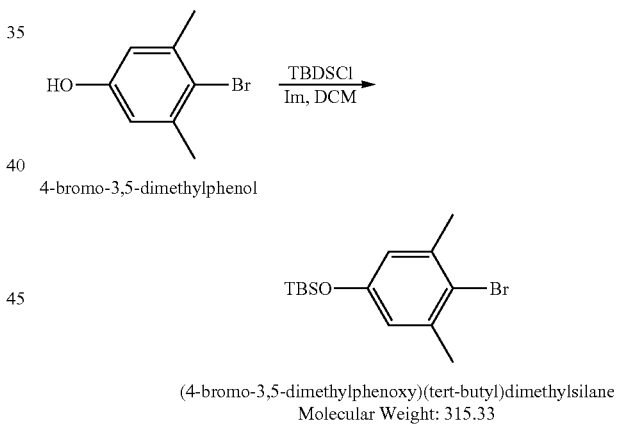

4-bromo-3,5-dimethylphenol (4-bromo-3,5-dimethylphenoxy)(tert-butyl)dimethylsilane
Molecular Weight: 315.33

(4-Bromo-3,5-dimethylphenoxy)(tert-butyl)dimethylsilane: Under nitrogen protection, tert-butyldimethylsilyl chloride (9.81 g, 65.27 mmol) was added portion wise to a mixture of 4-bromo-3,5-dimethylphenol (12.5 g, 62.17 mmol) and imidazole (8.43 g, 124.34 mmol) in DCM (250 mL) at 0° C. over 15 minutes period. The resulting mixture was stirred at RT for 16 hours. The reaction mixture was quenched with saturated NH$_4$Cl aqueous solution (15 mL) then poured into water. DCM (200 mL) was added and the organic layer was separated, passed through a short pad of silica gel. The silica gel was washed with DCM (250 mL×2), The filtrates were combined and concentrated to gain 20 g colorless solid product. Yield 100%. LCMS M+H=316. $^1$H NMR (500 MHz) (CDCl$_3$) δ ppm 6.58 (s, 2H), 2.35 (s, 6H), 0.98 (s, 9H).

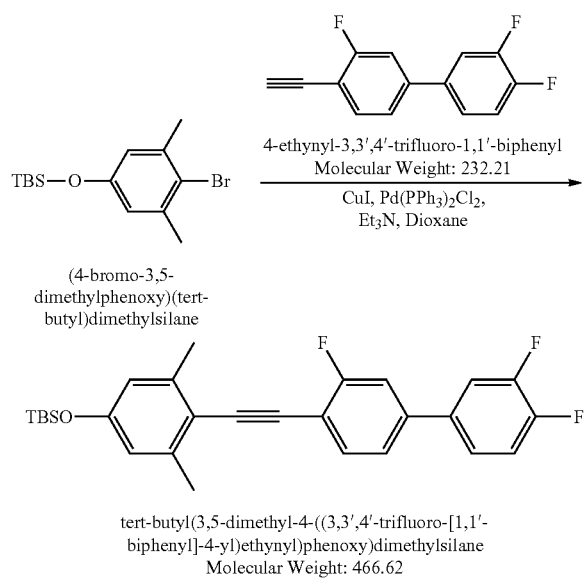

tert-Butyl(3,5-dimethyl-4-((3,3',4'-trifluoro-[1,1'-biphenyl]-4-yl)ethynyl)phenoxy)dimethylsilane: Under Nitrogen protection, to a mixture of (4-bromo-3,5-dimethylphenoxy)(tert-butyl)dimethylsilane (3.39 g, 10.76 mmol), Pd(PPh₃)₂Cl₂ (75 mg, 0.01 mmol), CuI (61 mg, 0.044 mmol), triethylamine (3 mL, 21.5 mmol), anhydrous dioxane (10 mL), 4-ethynyl-3,3',4'-trifluoro-1,1'-biphenyl (2.5 g, 10.76 mmol) was added at RT. The resulting mixture was stirred at 110° C. for 16 hours. After cooling to RT, the mixture was diluted with Hexanes (100 mL). The insoluble materials were removed by filtration. The filtrate was concentrated to dryness. The residue was dissolved into Hexanes (350 mL) and passed through a short pad silica gel. The silica gel was washed with Hexanes (2×250 mL), the filtrates were combined and concentrated to dryness to gain 1 g light yellow solid product. Yield 19.9%. LCMS M+H=467.

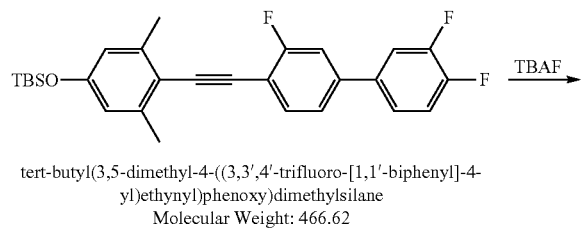

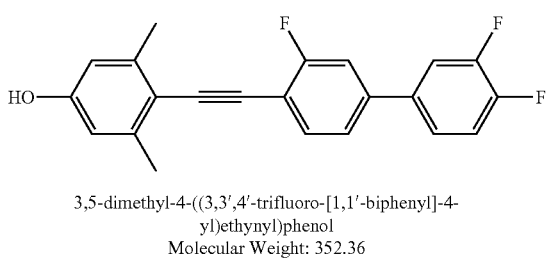

3,5-Dimethyl-4-((3,3',4'-trifluoro-[1,1'-biphenyl]-4-yl)ethynyl)phenol: TBAF 1M solution in THF (4.82 mL, 4.82 mmol) was added to a mixture of tert-butyl(3,5-dimethyl-4-((3,3',4'-trifluoro-[1,1'-biphenyl]-4-yl)ethynyl)phenoxy)dimethylsilane (1 g, 2.14 mmol) in THF (2 mL) at 0° C. The resulting mixture was stirred at RT for 2 hours then poured into saturated NH₄Cl aqueous solution (1 mL). The mixture was stirred at RT for 15 minutes. Diethyl ether (10 mL) was added and the organic layer was separated, concentrated. The crude product was purified by silica gel column chromatography, Hexanes was used for eluting to gain 754 mg colorless solid product.

Yield 98.7%. LCMS M−H=351. ¹H NMR (500 MHz) (CDCl₃) δ ppm 7.54 (t, J=8.00 Hz, 1H), 7.4-7.38 (m, 1H), 7.37-7.23 (m, 4H), 6.57 (s, 2H), 4.75 (bs, 1H).

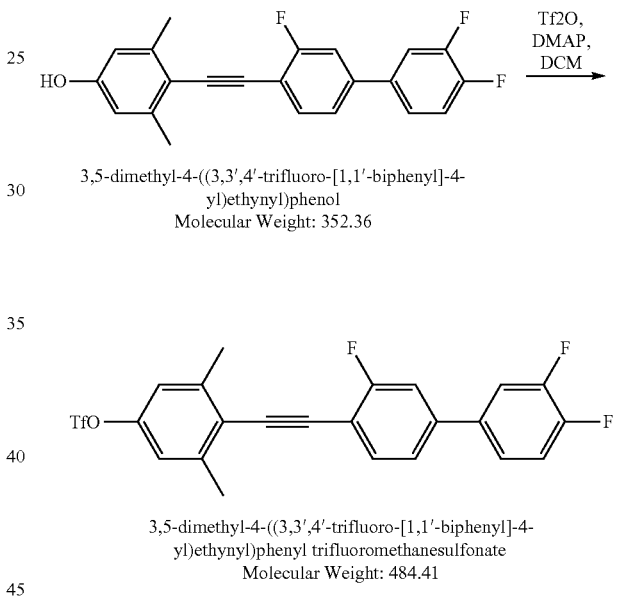

3,5-Dimethyl-4-((3,3',4'-trifluoro-[1,1'-biphenyl]-4-yl)ethynyl)phenyl trifluoromethanesulfonate: Triflic anhydride (0.38 mL, 2.35 mmol) was added to a mixture of 3,5-dimethyl-4-((3,3',4'-trifluoro-[1,1'-biphenyl]-4-yl) ethynyl) phenol (754 mg, 2.14 mmol), Et₃N (0.403 mL, 3.00 mmol), dimethylaminopyridine (5.08 mg, 0.041 mmol) in DCM (6 mL) at 0° C. The resulting mixture was stirred at RT for 2 hours than poured into saturated NH₄Cl aqueous solution (1 mL). The mixture was stirred at RT for 15 minutes. Diethyl ether (10 mL) was added and the organic layer was separated, concentrated. The crude product was purified by silica gel column chromatography, Hexanes was used for eluting to gain 680 mg colorless solid product. Yield 65.6%. LCMS M+H=485. ¹H NMR (500 MHz) (CDCl₃) δ ppm 7.58 (t, J=10.0 Hz, 1H), 7.41-7.37 (m, 1H), 7.33-7.23 (m, 4H), 7.01 (s, 2H).

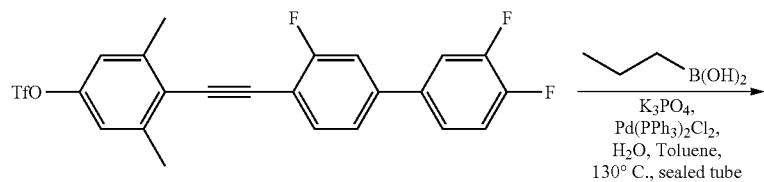

3,5-dimethyl-4-((3',4'-trifluoro-[1,1'-biphenyl]-4-yl)ethynyl)phenyl trifluoromethanesulfonate
Molecular Weight: 484.41

1452-027
4-((2,6-dimethyl-4-propylphenyl)ethynyl)-3',4'-trifluoro-1,1'-biphenyl
Molecular Weight: 378.44

4-((2,6-Dimethyl-4-propylphenyl)ethynyl)-3,3',4'-trifluoro-1,1'-biphenyl (LC-1): In a sealed tube, the reaction mixture of 3,5-dimethyl-4-((3',4'-trifluoro-[1,1'-biphenyl]-4-yl)ethynyl)phenyl trifluoromethanesulfonate (600 mg, 1.23 mmol), propyl boronic acid (540 mg, 6.15 mmol), $K_3PO_4$ (545 mg, 2.49 mmol) and $Pd(PPh_3)_2Cl_2$ (8.63 mg, 0.0123 mmol) in Toluene (4 mL) and $H_2O$ (0.5 mL) was stirred at 130° C. for 3 days. After work up with water-ethyl acetate then purification by silica-gel column chromatograph, gained 180 mg colorless solid, 38.6% yield. LCMS M+H=379. $^1$H NMR (500 MHz) (CDCl$_3$) δ ppm 7.56 (t, J=7.75 Hz, 1H), 7.41-7.37 (m, 1H), 7.31-7.21 (m, 4H), 6.91 (s, 2H), 2.54 (t, J=7.75 Hz, 2H), 2.51 (s, 6H), 1.67-1.6 (m, 2H), 0.73 (t, J=7.25 Hz, 3H).

Example 1.2: Synthesis of Liquid Crystal Compound (1452-002) (LC-2)

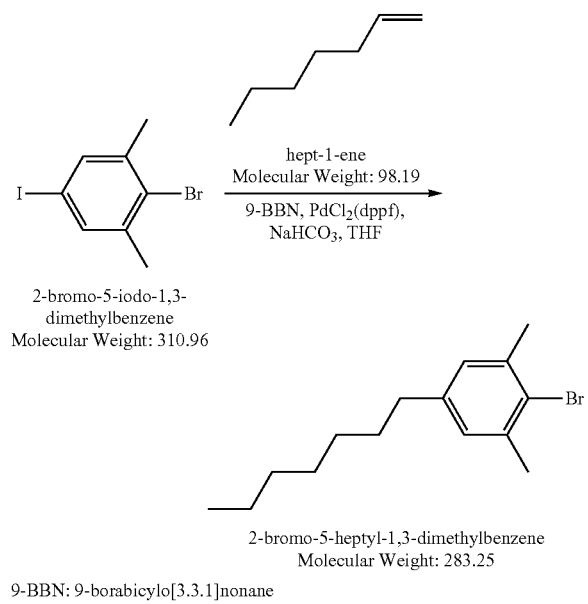

2-bromo-5-iodo-1,3-dimethylbenzene
Molecular Weight: 310.96

2-bromo-5-heptyl-1,3-dimethylbenzene
Molecular Weight: 283.25

9-BBN: 9-borabicylo[3.3.1]nonane

2-Bromo-5-heptyl-1,3-dimethylbenzene: A solution 0.5 M of 9-BBN in THF (38.6 mL, 19.29 mmol) was added dropwise to a mixture of 1-hepene (1.894 g, 19.29 mmol) in THF (8 mL) at 0° C. The resulting mixture was warmed up to RT gradually under Argon atmosphere and stirred at RT for 4 hours. Via a cannula, the heptyl-9 BBN which was prepared from above step without further purification, was added to a mixture of 2-bromo-5-iodo-m-xylene (4.03 g, 16.08 mmol), PdCl$_2$(dppf) (393 mg, 0.482 mmol) and 4N NaHCO$_3$ aq soln (4.015 mL, 16.08 mmol) in THF (38 mL) at 0° C. The resulting mixture was warmed up and stirred at RT under Argon atmosphere for 16 hours. After addition of H$_2$O$_2$ 30% (6.43 mL) the mixture was diluted with Hexanes, washed with brine. Organic layer was separated, dried MgSO$_4$, concentrated to dryness. The crude product was purified by silica gel column chromatography then distillation to gain 2.00 g colorless liquid product, yield 43%. LCMS M+H=284.

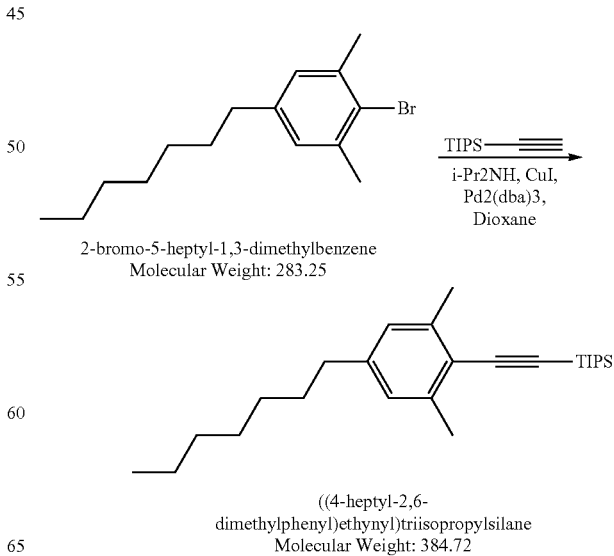

2-bromo-5-heptyl-1,3-dimethylbenzene
Molecular Weight: 283.25

((4-heptyl-2,6-dimethylphenyl)ethynyl)triisopropylsilane
Molecular Weight: 384.72

[(4-Heptyl-2,6-dimethylphenyl)ethynyl]triisopropylsilane: A mixture of 2-bromo-5-heptyl-1,3-dimethylbenzene (2 g, 7.06 mmol), $Pd_2(dba)_3$ (25.9 mg, 0.45 mmol), CuI (28 mg, 0.147 mmol), 1M solution of t-$Bu_3P$ in Toluene (4.46 mL, 4.46 mmol), anhydrous Dioxane (30 mL) was bubbled with Argon at RT for 15 minutes. TIPS acetylene (1.418 g, 7.73 mmol) was added dropwise, the mixture was bubbled with Argon at RT for 5 minutes. Finally, diisopropylamine (3.96 mL, 28.28 mmol) was added. The resulting mixture was stirred at 120° C. for 2 days. After cooling to RT the mixture was diluted with diethyl ether (50 mL), the salts were removed by filtration. The filtrate was concentrated to dryness. The residue was dissolved into Hexanes (350 mL), light brown insoluble materials were filtered off, the filtrate was concentrated to gain 2.71 g light brown crude product which was carried on next step without further purification. Yield 100%. LCMS M=H=384.

((4-heptyl-2,6-dimethylphenyl)ethynyl)triisopropylsilane
Molecular Weight: 384.72

→ TBAF →

2-ethynyl-5-heptyl-1,3-dimethylbenzene
Molecular Weight: 228.38

2-Ethynyl-5-heptyl-1,3-dimethylbenzene: 1M TBAF solution in THF (8.825 mL, 8.825 mmol) was added to a mixture of ((4-heptyl-2,6-dimethylphenyl)ethynyl)triisopropylsilane (2.71 g, 7.06 mmol) in THF (20 mL) at 0° C. under Nitrogen atmosphere. The resulting mixture was stirred at RT for 2 hours then poured into sat. aq. $NH_4Cl$ solution (20 mL), then extracted with diethyl ether, organic layer was separated, dried $MgSO_4$, concentrated to dryness. The crude product was used purified by silica gel column chromatography to gain 1.26 g light yellow liquid product. Yield 78%. LCMS M+H=229.

2-ethynyl-5-heptyl-1,3-dimethylbenzene
Molecular Weight: 228.38

+ I—⟨⟩—Br (F)

$Et_3N$, CuI, $Pd(PPh_3)_2Cl_2$,
THF, 5° C.-RT, 16 h 2-((4-bromo-2-fluorophenyl)ethynyl)-5-heptyl-1,3-dimethylbenzene
Molecular Weight: 401.36

2-((4-Bromo-2-fluorophenyl)ethynyl)-5-heptyl-1,3-dimethylbenzene: Under Nitrogen protection, to a mixture of 4-bromo-2-fluoro-1-iodobenzene (658 mg, 2.19 mmol), $Pd(PPh_3)_2Cl_2$ (15.32 mg, 0.02 mmol), CuI (12.48 mg, 0.006 mmol) in anhydrous THF (5 mL) was added triethylamine (0.61 mL, 4.38 mmol) following by 2-ethynyl-5-heptyl-1,3-dimethylbenzene (500 mg, 2.19 mmol) at 5° C. The resulting mixture was stirred at RT for 16 hours. The mixture was diluted with Hexane and the salts were removed by filtration. The solid was washed with Hexanes, the filtrate was concentrated. The crude product was purified by silica-gel column chromatography, gained 350 mg colorless solid product. Yield 39.8%. LCMS M+H=402.

2-((4-bromo-2-fluorophenyl)ethynyl)-5-heptyl-1,3-dimethylbenzene
Molecular Weight: 401.36

+ F—⟨⟩—B(OH)₂ (F)

$Pd(PPh_3)_2Cl_2, K_2CO_3$
THF, $H_2O$, reflux, 6 h

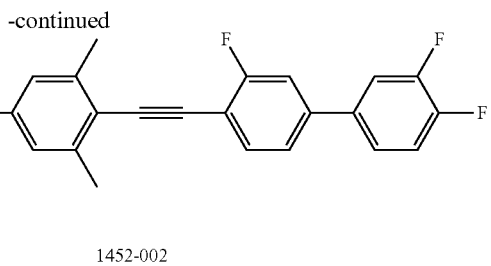

1452-002
3,3',4-trifluoro-4'-((4-heptyl-2,6-dimethylphenyl)ethynyl)-1,1'-biphenyl
Molecular Weight: 434.55

3,3',4-Trifluoro-4'-((4-heptyl-2,6-dimethylphenyl)ethynyl)-1,1'-biphenyl (LC-2): Under Nitrogen protection, a mixture of 2-((4-bromo-2-fluorophenyl)ethynyl)-5-heptyl-1,3-dimethylbenzene (300 mg, 0.747 mmol), $Pd(PPh_3)_2Cl_2$ (10.45 mg, 0.015 mmol), $K_2CO_3$ (206.48 mg g, 1.49 mmol), 3,4-difuorophenylboronic acid (141.55 mg, 0.89 mmol), THF (5 mL), and $H_2O$ (0.5 mL) was refluxed for 4 hours. The mixture was cooled to RT than poured into water. The organic layer was extracted into Ethylacetate (10 mL) and washed twice with water (2×5 mL). The organic layer was separated, concentrated to dryness. The crude product was purified by silica gel column chromatography, Hexanes was used for eluting to gain 162 mg colorless solid product. Yield 50%. LCMS M+H=435. $^1$H NMR (400 MHz) (CDCl$_3$) δ ppm 7.55 (t, J=7.88 Hz, 1H), 7.41-7.35 (m, 1H), 7.29-7.20 (m, 4H), 6.91 (s, 2H), 2.53 (t, J=7.86 Hz, 2H), 2.46 (s, 6H), 1.60-1.57 (m, 2H), 1.31-1.21 (m, 8H), 0.88 (t, J=6.76 Hz, 3H).

Example 1.3: Synthesis of Liquid Crystal Compound (1489-034) (LC-3)

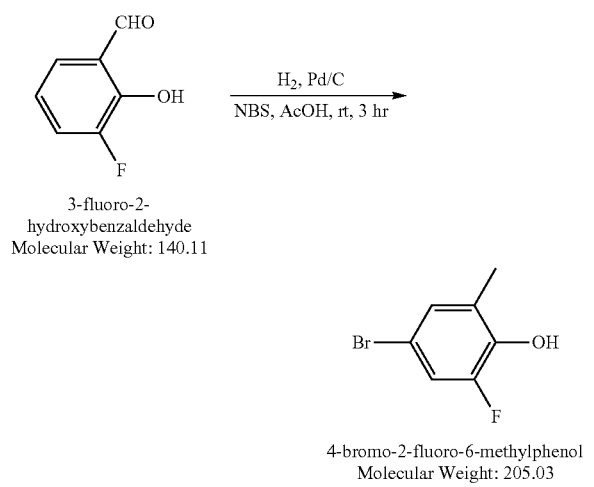

4-Bromo-2-fluoro-6-methylphenol: 3-Fluoro-2-hydroxybenzaldehyde (2.5 g, 17.84 mmol) was dissolved in MeOH (200 mL) and HCl conc. (2 mL); Pd/C (10% w/w) (0.25 g) was added under a stream of nitrogen. The mixture was hydrogenated at 50 psi for 4 days. The mixture was filtered through a pad of celite and the filter was washed with methanol. The solvents were evaporated to give 0.9 g (40%) of the title compound.

2-Fluoro-6-methylphenol (0.95 g, 7.53 mmol) was dissolved in acetic acid (15 mL). The mixture was cooled on an ice-water bath. N-bromosuccinimide (1.408 g, 7.91 mmol) was added in portions and the mixture was allowed to reach rt and was stirred at rt for 3 h. The mixture was concentrated under reduced pressure and the residue was diluted with dichloromethane (100 ml). The organic phase was washed with $NaHCO_3$ (sat, aq) containing $Na_2S_2O_3$. The aqueous phase was extracted with dichloromethane. The combined organic phases were dried over $MgSO_4$ and evaporated to give 1.36 g (88%) of the title compound.

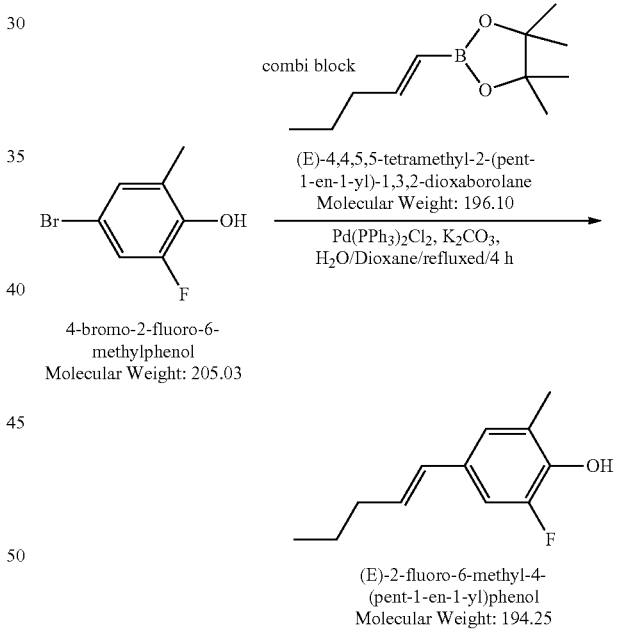

(E)-2-Fluoro-6-methyl-4-(pent-1-en-1-yl)phenol: Under Nitrogen protection, a mixture of 4-bromo-2-fluoro-6-methylphenol (4.10 g, 20 mmol), $Pd(PPh_3)_2Cl_2$ (0.28 g, 0.4 mmol), $K_2CO_3$ (5.6 g, 40 mmol), (E)-4,4,5,5-tetramethyl-2-(pent-1-en-1-yl)-1,3,2-dioxaborolane (4.706 g, 24 mmol), Dioxane (20 mL), and $H_2O$ (5 mL) was refluxed for 4 hours. The mixture was cooled to RT than poured into saturated water. The organic layer was extracted into Toluene (50 mL) and washed twice with water (2×35 mL). The organic layer was separated, concentrated to dryness. The crude product was purified by silica gel column chromatography, Hexanes was used for eluting to gain 4.41 g colorless solid product. Yield 96.25%.

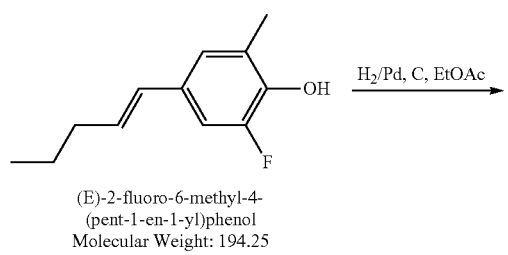

(E)-2-fluoro-6-methyl-4-
(pent-1-en-1-yl)phenol
Molecular Weight: 194.25

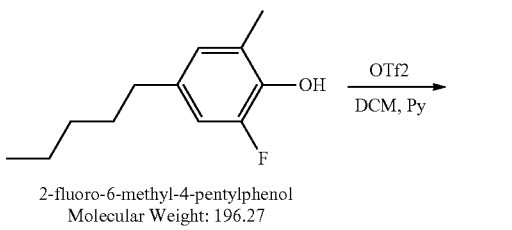

2-fluoro-6-methyl-4-pentylphenol
Molecular Weight: 196.27

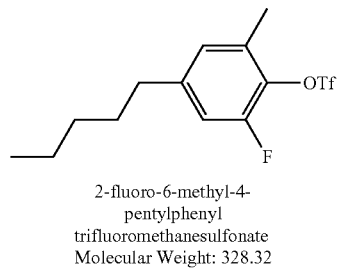

2-fluoro-6-methyl-4-
pentylphenyl
trifluoromethanesulfonate
Molecular Weight: 328.32

2-Fluoro-6-methyl-4-pentylphenol: A mixture of (E)-2-fluoro-6-methyl-4-(pent-1-en-1-yl)phenolbenzene (3.1 g, 15.95 mmol), Pd/C (10% w/w) (0.8 g), in EtOAc (5 mL) MeOH (5 mL) was hydrogenated at 50 psi with Parr shaker for 5 hours. NMR shown starting material was consumed. The reaction mixture was filtered through celite; the filtrate was concentrated to dryness to dryness gain 3.08 g colorless solid. Yield 100%. LCMS M−H=195.

Dissolve 2-fluoro-6-methyl-4-pentylphenol (1.061 g, 5.41 mmol) in a mixture of DCM (20 mL) and pyridine (2 mL) and cool in an ice bath. Add dropwise to the stirred solution a mixture of trifluoromethanesulfonic anhydride (1.64 mL, 9.74 mmol) in DCM and stir the reaction for 1.5 hours at ambient temperature. Dilute the reaction with DCM (300 mL) and wash with 2.5N aqueous HCl. Dry the organic fraction over $Na_2SO_4$, filter and concentrate to give the title product as a white solid (1.7 g, 99%) of 2-fluoro-6-methyl-4-pentylphenyl trifluoromethanesulfonate.

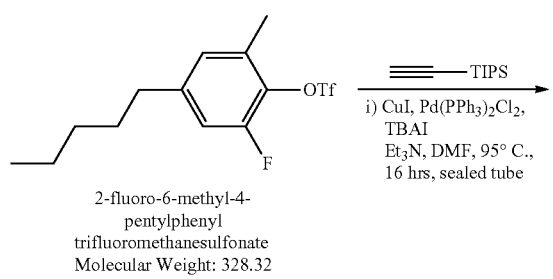

2-fluoro-6-methyl-4-
pentylphenyl
trifluoromethanesulfonate
Molecular Weight: 328.32

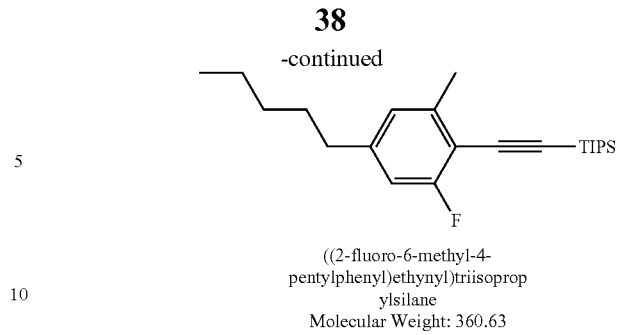

((2-fluoro-6-methyl-4-
pentylphenyl)ethynyl)triisoprop
ylsilane
Molecular Weight: 360.63

((2-Fluoro-6-methyl-4-pentylphenyl)ethynyl)triisopropylsilane: Under protection of nitrogen atmosphere, a mixture of 2-fluoro-6-methyl-4-pentylphenyl trifluoromethanesulfonate 0.28 g, 10 mmol), $PdCl_2(PPh_3)_2$ (70.1 mg, 0.1 mmol), tetrabutyl ammonium iodide (11.08 g, 30 mmol) and copper(I) iodide (57 mg, 3 mmol) in triethylamine/DMF (1:4) (100 mL) was stirred for 5 min at ambient temperature. To above mixture, triisopropylsilyl acetylene (5.47 g, 30 mmol) was added and the reaction mixture was stirred at 70° C. for 16 h in a sealed tube. The reaction mixture was cooled to ambient temperature, diluted with EtOAc/hexane (1:1) and washed with water. Dried the organic fraction over $Na_2SO_4$, filtered and concentrated to dryness. Purified by chromatography on silica gel eluting with hexane/EtOAc (95:5) to gain 3.06 g colorless solid. LCMS M−H=360.

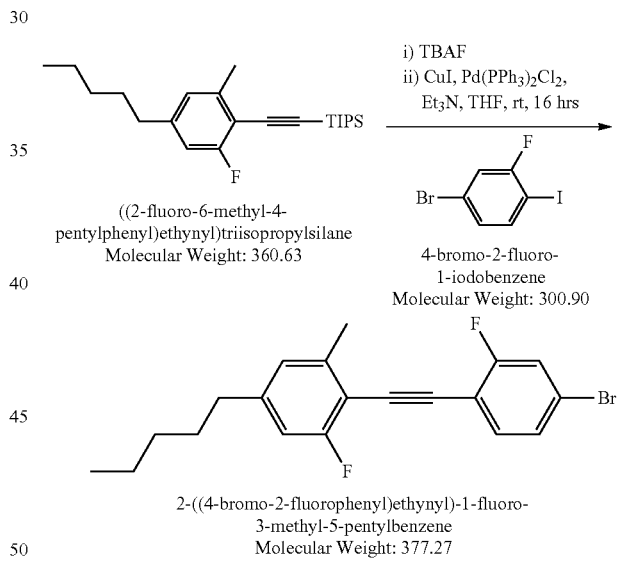

2-((4-bromo-2-fluorophenyl)ethynyl)-1-fluoro-
3-methyl-5-pentylbenzene
Molecular Weight: 377.27

2-((4-Bromo-2-fluorophenyl)ethynyl)-1-fluoro-3-methyl-5-pentylbenzene: TBAF 1M/THF (20 mL, 20 mL) was added to a mixture of ((2-fluoro-6-methyl-4-pentylphenyl)ethynyl)triisopropylsilane (3.606 g, 10 mmol) in THF anhydrous (30 mL) at 0° C. under nitrogen atmosphere. The resulting mixture was allowed to stir at RT for 2 h.

To above mixture; 4-bromo-2-fluoro-1-iodobenzene (3.009 g, 10 mmol) was added following by $PdCl_2(PPh_3)_2$ (0.7 g, 0.99 mmol), CuI (0.57 g, 2.99 mmol) and triethylamine (10 mL). The mixture was stirred at ambient temperature for 16 h. The mixture was diluted with EtOAc/hexane (1:1) and washed with water. Dry the organic layer over $MgSO_4$, filter and concentrate in vacuo. Purify by chromatography on silica gel eluting with hexanes to gain 1.1 g colorless solid, yield 29%.

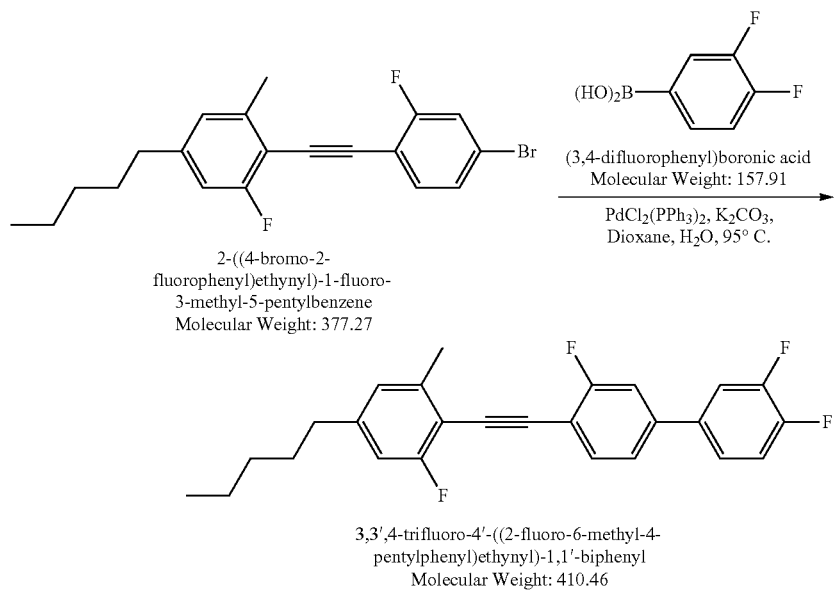

3,3',4-Trifluoro-4'-((2-fluoro-6-methyl-4-pentyl phenyl)ethynyl)-1,1'-biphenyl (LC-3): Under Nitrogen protection, a mixture of 2-((4-bromo-2-fluorophenyl)ethynyl)-1-fluoro-3-methyl-5-pentylbenzene (0.377 g, 1 mmol), Pd(PPh$_3$)$_2$Cl$_2$ (0.014 g, 0.02 mmol), K$_2$CO$_3$ (0.27 g, 2 mmol), (3,4-difluorophenyl)boronic acid (0.236 g, 1.5 mmol), Dioxane (5 mL), and H$_2$O (1 mL) was refluxed for 4 hours. The mixture was cooled to RT than poured into saturated water. The organic layer was extracted into Toluene (50 mL) and washed twice with water (2×35 mL). The organic layer was separated, concentrated to dryness. The crude product was purified by silica gel column chromatography; Hexanes was used for eluting to gain 0.23 g colorless solid product. LCMS M+H=411. $^1$H NMR (400 MHz) (DMSO) δ ppm 7.96-7.84 (m, 1H), 7.8-7.7 (m, 1H), 7.68-7.59 (m, 2H), 7.6-7.59-7.52 (m, 1H), 7.05 (s, 1H), 7.03 (d, J=10.58 Hz, 1H), 2.6 (t, J=6.52 Hz, 2H), 2.49 (s, 3H), 1.65-1.50 (m, 2H), 1.48-1.22 (m, 4H), 1.35-1.23 (m, 4H), 0.71 (t, J=6.76 Hz, 3H).

Example 1.4: Synthesis of Liquid Crystal Compound (1452-42) (LC-4)

2-Iodo-4-pentylphenol & 2,6-diiodo-4-pentylphenol: A mixture of Iodine (13.29 g, 52.5 mmol) and KI (8.74 g, 52.5 mmol) in H$_2$O/MeOH (1:1) (200 mL) was added dropwise to a mixture of NaOH (4.00 g, 100 mmol), 4-pentylphenol (purchased from TCI) (8.21 g, 50.00 mmol) in H$_2$O/MeOH (1:1) (250 mL) at 0° C. over 2 hours period. The resulting mixture was stirred at 0° C. for 2 hours than neutralized with saturated NH$_4$Cl aqueous solution (50 mL). The mixture was stirred at RT for 15 minutes. Diethyl ether (400 mL) was added and the organic layer was separated, concentrated. The crude product was purified by silica gel column chromatography, Hexanes was used for eluting to gain and 8.29 g colorless liquid of 2-iodo-4-pentylphenol. Yield 57%. LCMS M−H=289.

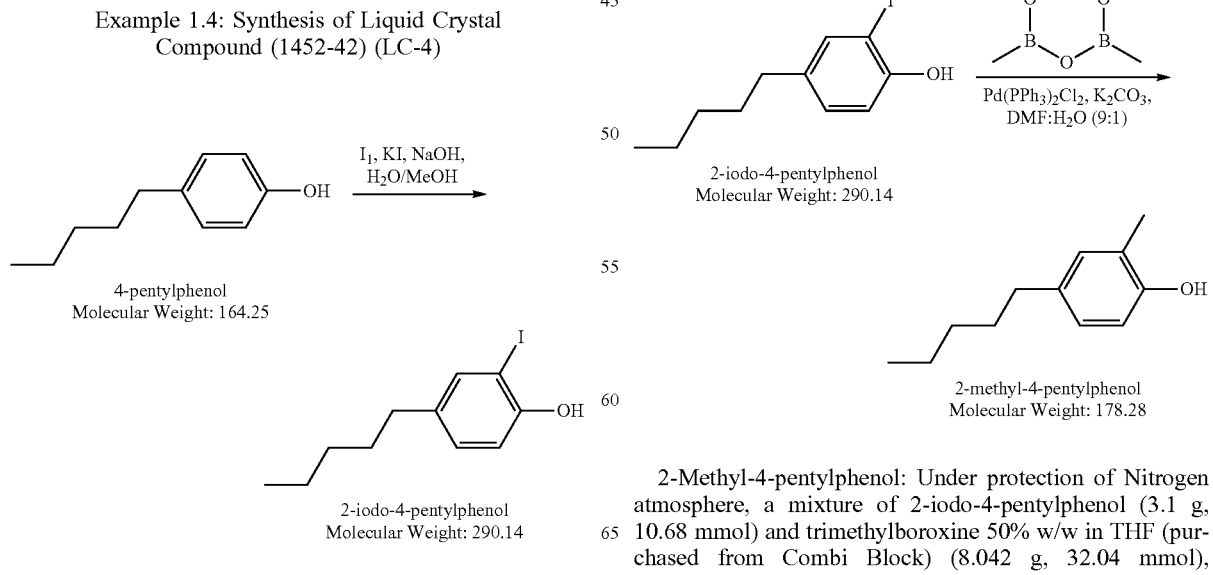

2-Methyl-4-pentylphenol: Under protection of Nitrogen atmosphere, a mixture of 2-iodo-4-pentylphenol (3.1 g, 10.68 mmol) and trimethylboroxine 50% w/w in THF (purchased from Combi Block) (8.042 g, 32.04 mmol), Pd(PPh$_3$)$_2$Cl$_2$ (187.4 mg, 0.266 mmol), K$_2$CO$_3$ (2.95 g, 21.36 mmol) in DMF/H$_2$O (9:1) (10 mL) was stirred at 130° C. for 16 hours. After cooling to room temperature pH of mixture was adjusted to pH 7-6 with 2 N HCl aqueous solution. The mixture extracted into Ethyl acetate. The organic layer was separated, concentrated. The crude product was purified by silica gel column chromatography, Hexanes was used for eluting to gain 1.6 g colorless liquid of 2-methyl-4-pentylphenol. Yield 84%.

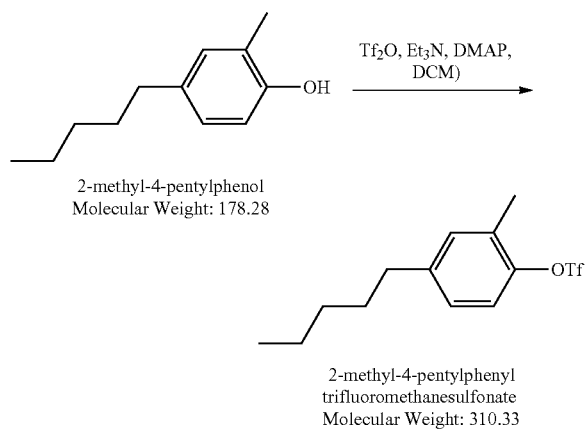

2-Methyl-4-pentylphenyl trifluoromethanesulfonate: Under protection of Nitrogen atmosphere, triflic anhydride (1.32 mL, 8.136 mmol) was added dropwise to a mixture of 2-methyl-4-pentylphenol (1.32 g, 7.404 mmol), Et$_3$N (1.39 mL, 10.38 mmol), DMAP (17.57 mg, 0.143 mmol) in DCM (20 mL) at 0° C. The resulting mixture was stirred at RT for 1.5 hours. NH$_4$Cl saturated aqueous solution was added following by H$_2$O:Ethyl acetate. The organic layer was separated, dried MgSO$_4$ then concentrated. The crude product was purified by silica gel column chromatography; Hexanes was used for eluting to gain 1.8 g colorless liquid of 2methyl4pentylphenyltrifluoromethanesulfonate. Yield 78%.

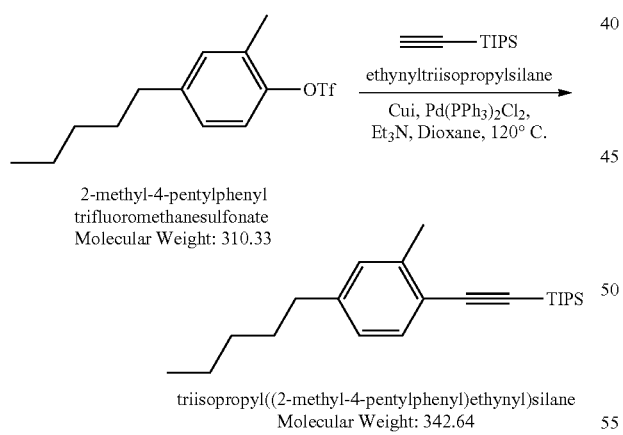

Triisopropyl((2-methyl-4-pentylphenyl)ethynyl)silane: A mixture of CuI (12.5 mg, 0.064 mmol), Pd(PPh$_3$)$_2$Cl$_2$ (44.92 mg, 0.064 mmol), ethynyltriisopropylsilane (1.756 g, 9.63 mmol), 2methyl4pentylphenyltrifluoromethanesulfonate (0.998 g, 3.21 mmol), Et$_3$N (0.89 mL, 6.42 mmol) in Dioxane anhydrous (5 mL) was placed in a sealed tube and stirred at 120° C. for 16 hours. After cooling to RT the mixture was poured to H$_2$O then extracted into Ethyl acetate. The organic layer was separated, dried MgSO$_4$, and concentrated. The crude product was purified by silica gel column chromatography; Hexanes:EtOAc (95:5) was used for eluting. The product was re-crystallized from EtOH to gain 0.384 g colorless liquid. Yield 35%.

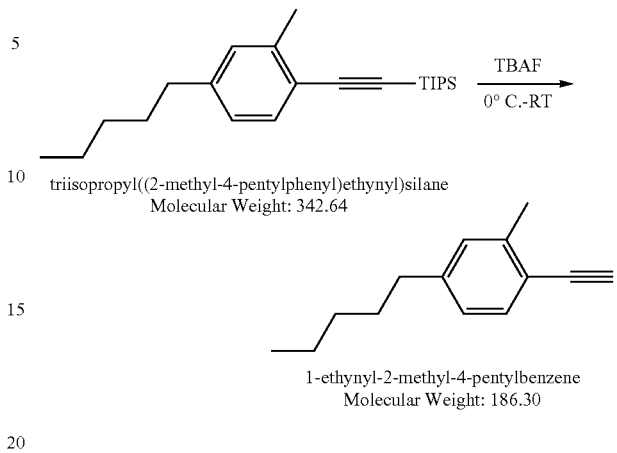

1-Ethynyl-2-methyl-4-pentylbenzene: TBAF 1M solution in THF (2.8 mL, 2.8 mmol) was added to a mixture of triisopropyl((2-methyl-4-pentylphenyl)ethynyl)silane (384.9 mg, 1.1235 mmol) in THF (2 mL) at 0° C. The resulting mixture was stirred at RT for 2 hours than poured into saturated NH$_4$Cl aqueous solution (2 mL). The mixture was stirred at RT for 15 minutes. Diethyl ether (10 mL) was added and the organic layer was separated, concentrated. The crude product was purified by silica gel column chromatography; Hexanes was used for eluting to gain 188.3 mg colorless solid product. Yield 90%.

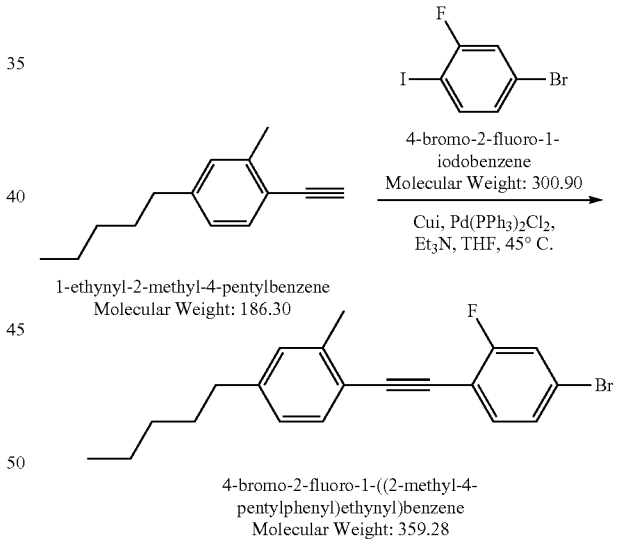

4-Bromo-2-fluoro-1-((2-methyl-4-pentylphenyl)ethynyl) benzene: A mixture of CuI (5.75 mg, 0.03 mmol), Pd(PPh$_3$)$_2$Cl$_2$ (7.01 mg, 0.01 mmol), 1-ethynyl-2-methyl-4-pentylbenzene (188.3 mg, 1.01 mmol), 4-bromo-2-fluoro-1-iodobenzene (304.14 mg, 1.01 mmol), Et$_3$N (0.5 mL, 3.6 mmol) in THF anhydrous (3 mL) was placed in a sealed tube and stirred at 45° C. for 16 hours. After cooling to RT the mixture was poured to H$_2$O then extracted into Ethyl acetate. The organic layer was separated, dried MgSO$_4$, and concentrated. The crude product was purified by silica gel column chromatography; Hexanes was used for eluting, gained 30 mg colorless solid. Yield 82.6%.

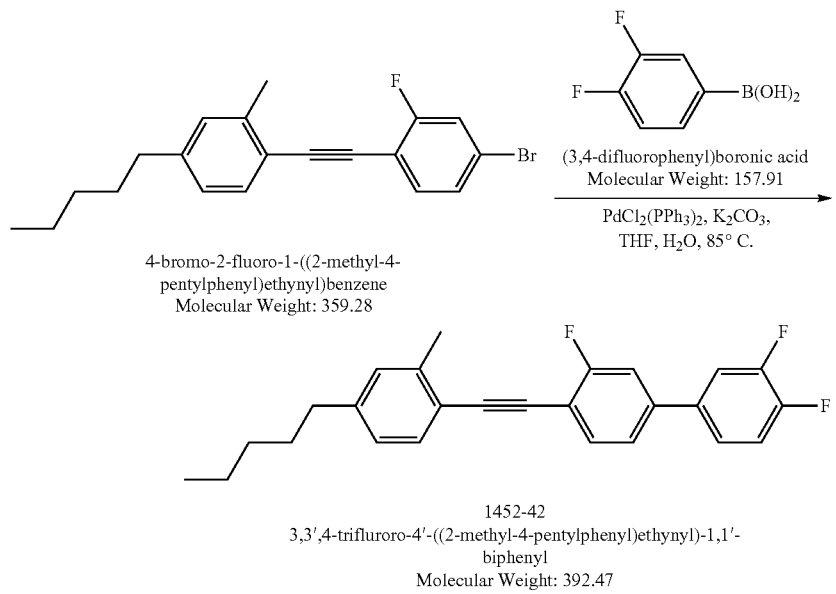

3,3',4-Trifluoro-4'-((2-methyl-4-pentylphenyl)ethynyl)-1,1'-biphenyl (LC-4): A mixture of $K_2CO_3$ (23.08 mg, 0.167 mmol), $Pd(PPh_3)_2Cl_2$ (1.17 mg, 0.00167 mmol), (3,4-difluorophenyl)boronic acid (14.5 mg, 0.0918 mmol), 4-bromo-2-fluoro-1-((2-methyl-4-pentylphenyl)ethynyl)benzene (30 mg, 0.0835 mmol) in THF (1 mL), $H_2O$ (0.5 mL) was placed in a sealed tube and stirred at 85° C. for 16 hours. After cooling to RT the mixture was poured to $H_2O$ then extracted into Ethyl acetate. The organic layer was separated, dried $MgSO_4$, and concentrated. The crude product was purified by silica gel column chromatography; Hexanes was used for eluting, gained 20 mg colorless solid. Yield 61%. LCMS M+H=393. $^1$H NMR (500 MHz) ($CDCl_3$) δ ppm 7.55 (t, J=7.5 Hz, 1H), 7.44 (d, J=7.5, 1H), 7.40-7.38 (m, 1H), 7.37-7.23 (m, 4H), 7.07 (s, 1H), 7.0 (d, J=7.5 Hz, 1H), 2.58 (t, J=7.75 Hz, 2H), 2.51 (s, 3H), 1.64-1.58 (m, 2H), 1.36-1.30 (m, 4H), 0.90 (t, J=7.00 Hz, 3H).

Example 1.5: Synthesis of Liquid Crystal Compound (1452-44) (LC-5)

4-Bromo-2,3',4'-trifluoro-1,1'-biphenyl: A mixture of $K_2CO_3$ (5.6 g, 40 mmol), $Pd(PPh_3)_2Cl_2$ (0.28 g, 0.4 mmol), (3,4-difluorophenyl)boronic acid (3.8 g, 24 mmol), 1-bromo-2-fluoro-4-iodobenzene (6.018 g, 20 mmol) in THF (60 mL), $H_2O$ (5.0 mL) was placed in a sealed tube and stirred at 85° C. for 16 hours. After cooling to RT the mixture was poured to $H_2O$ then extracted into Ethyl acetate. The organic layer was separated, dried $MgSO_4$, and concentrated. The crude product was purified by silica gel column chromatography; Hexanes was used for eluting, gained 4.67 g colorless solid. Yield 86%. LCMS M−H=286.

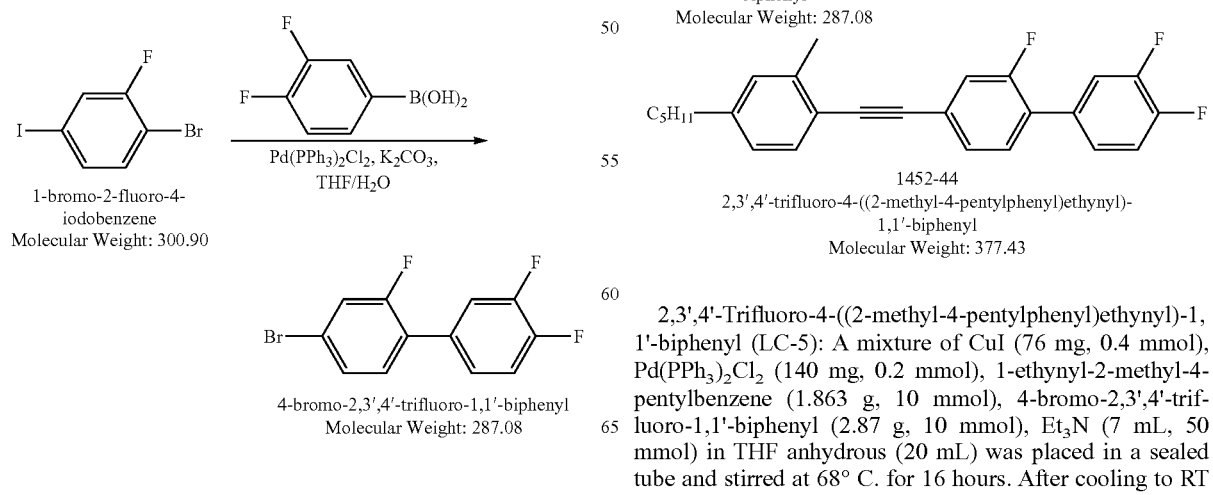

2,3',4'-Trifluoro-4-((2-methyl-4-pentylphenyl)ethynyl)-1,1'-biphenyl (LC-5): A mixture of CuI (76 mg, 0.4 mmol), $Pd(PPh_3)_2Cl_2$ (140 mg, 0.2 mmol), 1-ethynyl-2-methyl-4-pentylbenzene (1.863 g, 10 mmol), 4-bromo-2,3',4'-trifluoro-1,1'-biphenyl (2.87 g, 10 mmol), $Et_3N$ (7 mL, 50 mmol) in THF anhydrous (20 mL) was placed in a sealed tube and stirred at 68° C. for 16 hours. After cooling to RT the mixture was poured to H₂O then extracted into Ethyl acetate. The organic layer was separated, dried MgSO₄, and concentrated. The crude product was purified by silica gel column chromatography; Hexanes was used for eluting, gained 180 mg colorless solid. Yield 4.5%. LCMS M+H=393. $^1$H NMR (500 MHz) (CDCl₃) δ ppm 7.41 (d, J=7.5, 1H), 7.39-7.36 (m, 2H), 7.32 (s, 1H)), 7.3 (s, 1H), 7.29-7.27 (m, 2H), 7.06 (s, 1H), 7.0 (d, J=8 Hz, 1H), 2.58 (t, J=7.75 Hz, 2H), 2.49 (s, 3H), 1.64-1.58 (m, 2H), 1.35-1.31 (m, 4H), 0.90 (t, J=7.00 Hz, 3H).

Example 1.6: Synthesis of Liquid Crystal Compound (1489-035) (LC-6)

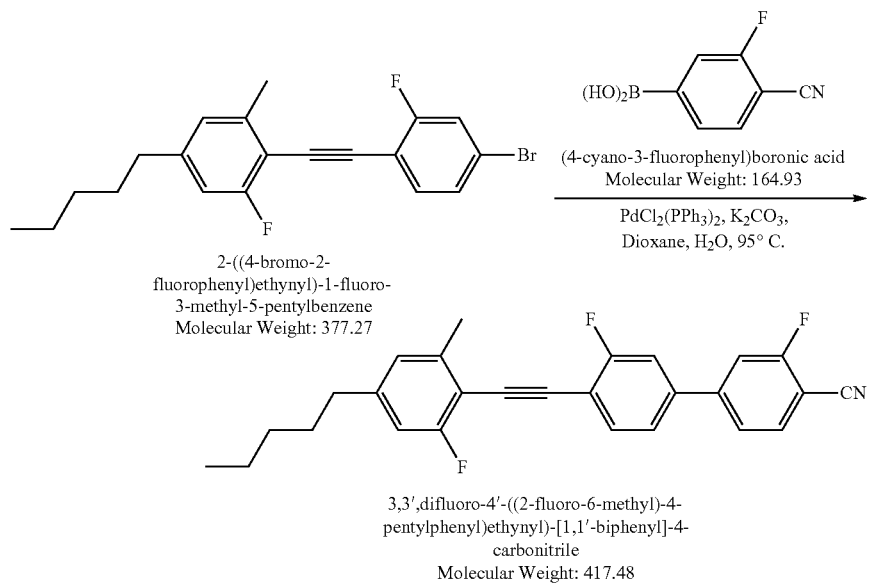

3,3'-Difluoro-4'-((2-fluoro-6-methyl-4-pentylphenyl)ethynyl)-[1,1'-biphenyl]-4-carbonitrile: Under Nitrogen protection, a mixture of 2-((4-bromo-2-fluorophenyl)ethynyl)-1-fluoro-3-methyl-5-pentylbenzene (0.377 g, 1 mmol), Pd(PPh₃)₂Cl₂ (0.014 g, 0.02 mmol), K₂CO₃ (0.27 g, 2 mmol), (4-cyano-3-fluorophenyl)boronic acid (0.247 g, 1.5 mmol), Dioxane (5 mL), and H₂O (1 mL) was refluxed for 4 hours. The mixture was cooled to RT than poured into water. The product was extracted into ethyl acetate (50 mL) and washed twice with water (2×35 mL). The organic layer was separated, concentrated to dryness. The crude product was purified by silica gel column chromatography; hexanes was used for eluting to gain 0.35 g colorless solid product. LCMS M+H=418. $^1$H NMR (400 MHz) (DMSO) δ ppm 8.26-8.00 (m, 2H), 7.96-7.71 (m, 2H), 7.04-7.01 (m, 2H), 2.70 (t, J=7.58 Hz, 2H), 2.46 (s, 3H), 1.99-1.54 (m, 2H), 1.47-1.02 (m, 4H), 0.86 (t, J=6.43 Hz, 3H).

Example 1.7: Synthesis of Liquid Crystal Compound (1489-032) (LC-7)

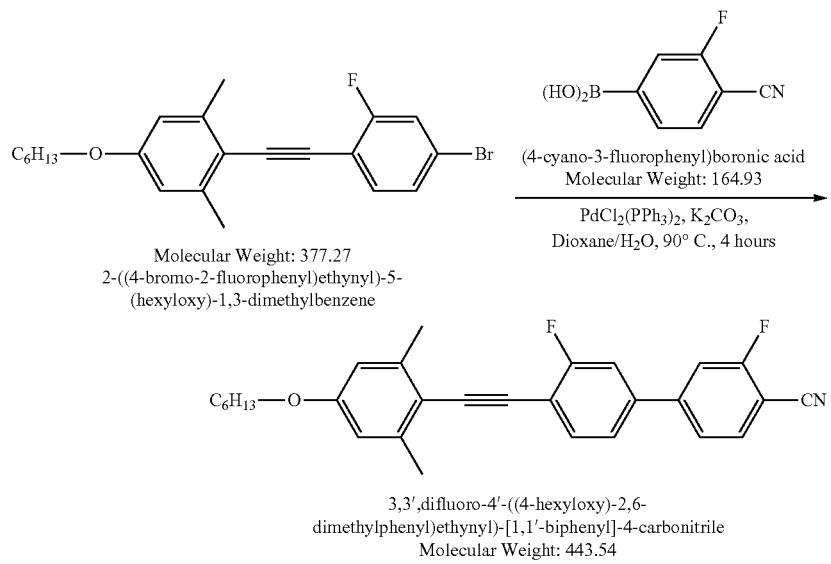

3,3'-Difluoro-4'-((4-(hexyloxy)-2,6-dimethylphenyl)ethynyl)-[1,1'-biphenyl]-4-carbonitrile (LC-7): Under Nitrogen protection, a mixture of 2-((4-bromo-2-fluorophenyl)ethynyl)-5-(hexyloxy)-1,3-dimethylbenzene (1.22 g, 3.23 mmol), Pd(PPh$_3$)$_2$Cl$_2$ (0.045 g, 0.0646 mmol), K$_2$CO$_3$ (0.891 g, 6.46 mmol), (3,4-difluorophenyl)boronic acid (0.8 g, 4.85 mmol), Dioxane (15 mL), and H$_2$O (5 mL) was stirred at 90° C. for 4 hours. The mixture was cooled to RT than poured into water. The organic layer was extracted into DCM (50 mL) and washed twice with water (2×35 mL). The organic layer was separated, concentrated to dryness. The crude product was purified by silica gel column chromatography, Hexanes:DCM (9:1) was used for eluting to gain 1 g yellow solid product which was recrystallized from hexanes to gain 990 mg colorless crystals. Yield 69%. LCMS M+H=444. $^1$H NMR (400 MHz) (DMSO) δ ppm 8.10-8.01 (m, 2H), 7.96-7.85 (m, 2H), 7.62-7.64 (m, 2H), 6.75 (s, 2H), 3.98 (t, J=6.52 Hz, 2H), 2.44 (s, 6H), 1.74-1.67 (m, 2H), 1.49-1.37 (m, 2H), 1.35-1.23 (m, 4H), 0.73 (t, J=6.43 Hz, 3H).

Example 1.8: Synthesis of Liquid Crystal Compound (1489-026) (LC-8)

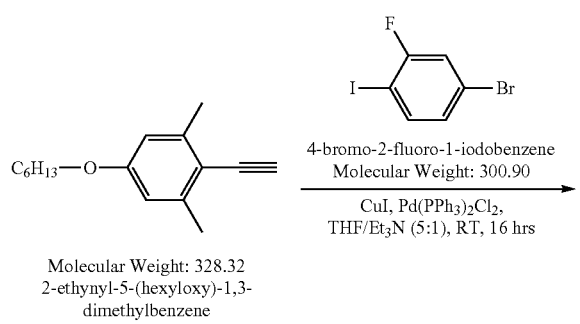

Molecular Weight: 328.32
2-ethynyl-5-(hexyloxy)-1,3-dimethylbenzene 4-bromo-2-fluoro-1-iodobenzene
Molecular Weight: 300.90

CuI, Pd(PPh$_3$)$_2$Cl$_2$,
THF/Et$_3$N (5:1), RT, 16 hrs

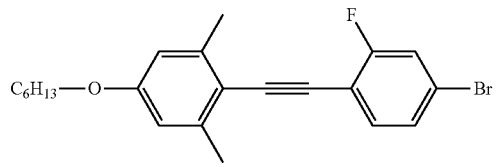

Molecular Weight: 377.27
2-((4-bromo-2-fluorophenyl)ethynyl)-5-(hexyloxy)-1,3-dimethylbenzene 2-((4-Bromo-2-fluorophenyl)ethynyl)-5-(hexyloxy)-1,3 dimethylbenzene: Under Nitrogen protection, a mixture of 2-ethynyl-5-(hexyloxy)-1,3-dimethylbenzene (2.3 g, 0.01 mol), Pd(PPh$_3$)$_2$Cl$_2$ (73.1 mg, 0.1 mmol), CuI (57 mg, 0.3 mmol), 4-bromo-2-fluoro-1-iodobenzene (3.01 g, 0.01 mmol), diisopropylamine (2.4 mL) and THF (9.6 mL) was stirred at RT for 4 hours. The mixture was poured into water. The product was extracted into DCM (50 mL) and washed twice with water (2×35 mL). The organic layer was separated, concentrated to dryness. The crude product was purified by silica gel column chromatography; hexanes was used for eluting to gain 3.5 g colorless solid product. Yield 85%. LCMS M+H=378. $^1$H NMR (400 MHz) (CDCl$_3$) δ ppm 7.34 (t, J=7.78 Hz, 1H), 7.31-7.25 (m, 2H), 6.61 (s, 2H), 3.94 (t, J=6.6 Hz, 2H), 2.46 (s, 3H), 1.79-1.72 (m, 2H), 1.45-1.39 (m, 6H), 0.91 (t, J=6.43 Hz, 3H).

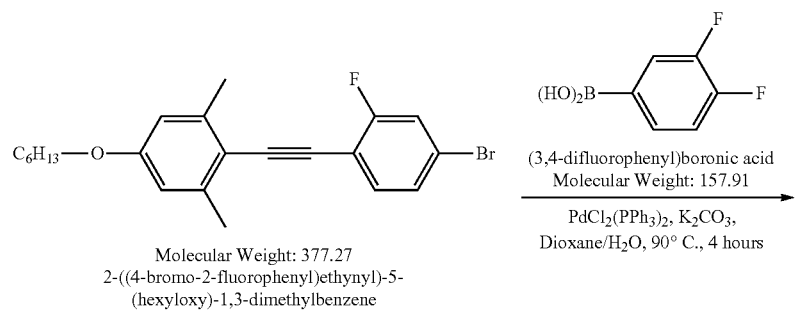

Molecular Weight: 377.27
2-((4-bromo-2-fluorophenyl)ethynyl)-5-(hexyloxy)-1,3-dimethylbenzene (3,4-difluorophenyl)boronic acid
Molecular Weight: 157.91

PdCl$_2$(PPh$_3$)$_2$, K$_2$CO$_3$,
Dioxane/H$_2$O, 90° C., 4 hours

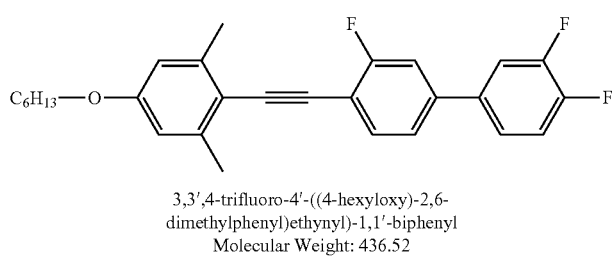

3,3',4-trifluoro-4'-((4-hexyloxy)-2,6-dimethylphenyl)ethynyl)-1,1'-biphenyl
Molecular Weight: 436.52

3,3',4-Trifluoro-4'-((4-(hexyloxy)-2,6-dimethylphenyl)ethynyl)-1,1'-biphenyl (LC-8): Under Nitrogen protection, a mixture of 2-((4-bromo-2-fluorophenyl)ethynyl)-5-(hexyloxy)-1,3-dimethylbenzene (0.84 g, 2.08 mmol), Pd(PPh$_3$)$_2$Cl$_2$ (0.014 g, 0.02 mmol), K$_2$CO$_3$ (0.575 g, 4.16 mmol), (3,4-difluorophenyl)boronic acid (0.493 g, 3.12 mmol), Dioxane (5 mL), and H$_2$O (1 mL) was stirred at 90° C. for 4 hours. The mixture was cooled to RT than poured into water. The organic layer was extracted into DCM (50 mL) and washed twice with water (2×35 mL). The organic layer was separated, concentrated to dryness. The crude product was purified by silica gel column chromatography, Hexanes:DCM (95:5) was used for eluting to gain 0.83 g yellow solid product which was recrystallized from hexanes to gain 771 mg colorless crystals. Yield 85%. LCMS M+H=437. $^1$H NMR (400 MHz) (DMSO) δ ppm 7.94-7.855 (m, 1H), 7.74 (dd, J=1.34 Hz, 11.04 Hz, 1H), 7.65-7.51 (m, 4H), 6.74 (s, 2H), 3.97 (t, J=6.6 Hz, 2H), 2.44 (s, 6H), 1.73-1.66 (m, 2H), 1.42-1.37 (m, 2H), 1.34-1.28 (m, 4H), 0.88 (t, J=6.92 Hz, 3H).

Example 1.9: Synthesis of Liquid Crystal Compound (1340-110) (LC-9)

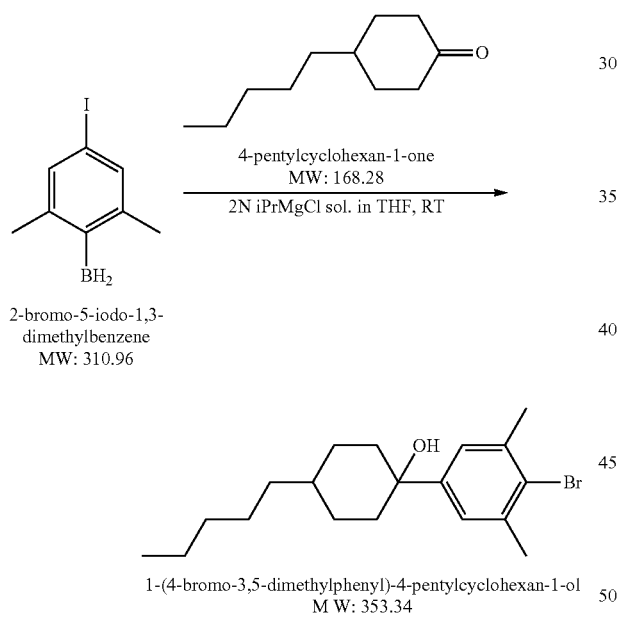

1-(4-Bromo-3,5-dimethylphenyl)-4-pentylcyclohexan-1-ol: Under Nitrogen atmosphere protection, 9.67 mL (19.141 mmol) of a 2M solution of isopropyl magnesium chloride in THF anhydrous was added to a mixture of 2-bromo-5-iodo-1,3-dimethylbenzene (5 g, 16.08 mmol) in 30 mL of THF at 20° C. The mixture was stirred at RT for 1 hour; to that mixture, 4-pentylcyclohexane-1-one (3.22 g, 19.141 mmol) in 20 mL THF was added at RT. The resulting mixture was stirred at RT for 1 hour. The mixture was hydrolyzed with 25 mL H$_2$O, acidified with 1N HCl and then diluted with hexanes (50 mL), organic layer was separated. The water layer was extracted into diethyl ether. The organic layers were combined, washed with saturated aqueous solution of sodium bicarbonate, water, dried over sodium sulfate, concentrated to dryness. 5.6 g crude yellow liquid product was gained. The product was used next step without further purification yellow liquid product. Yield 98%. LCMS (M+H=354).

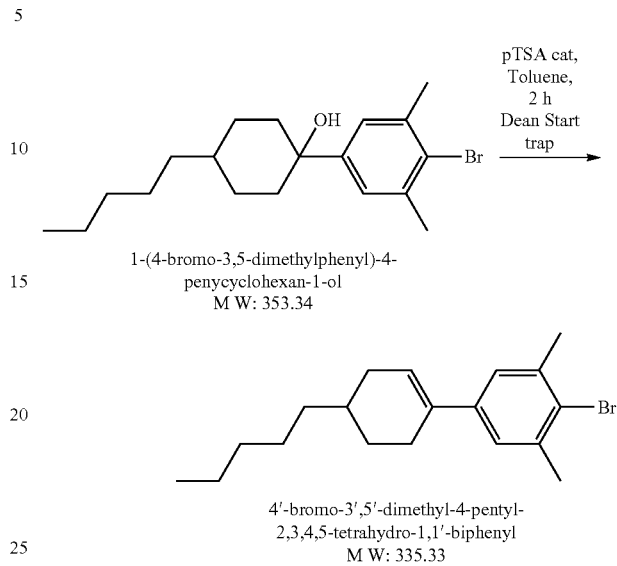

4'-Bromo-3',5'-dimethyl-4-pentyl-2,3,4,5-tetrahydro-1,1'-biphenyl: A mixture of (6.8 g, 19.2 mmol) of 1-(4-bromo-3,5-dimethylphenyl)-4-pentylcyclohexan-1-ol and p-toluenesulfonic acid monohydrate (catalyst amount) in 40 mL Toluene was heated to reflux with Dean-Stark trap for 3 hours. Subsequently, the solvent was removed and the residue was purified by silica-gel column chromatography eluting with hexanes to gain 4.4 g colorless liquid, yield 81.6%, 5.6 g, LCMS (M+H=336).

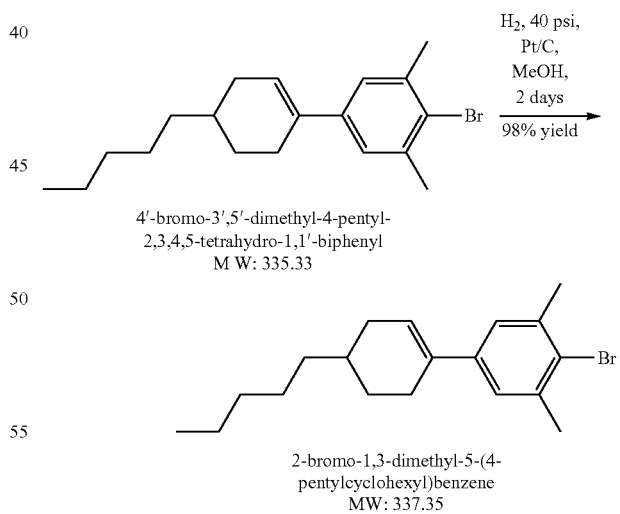

2-Bromo-1,3-dimethyl-5-(4-pentylcyclohexyl)benzene: A mixture of 4'-bromo-3',5'-dimethyl-4-pentyl-2,3,4,5-tetrahydro-1,1'-biphenyl (2.87 g, 8.55 mmol) and Pt/C (160 mg) in methanol (65 mL) was shaken in Parr Shaker at RT under 40 psi H$_2$, the mixture was filtered through celite, concentrated to gain 2.8 g colorless liquid product. Yield 98%. LCMS (M+H=338).

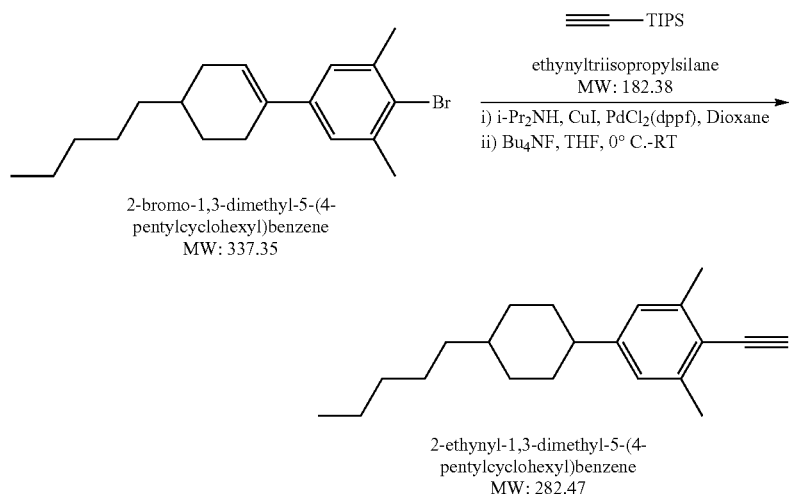

2-Ethynyl-1,3-dimethyl-5-(4-pentylcyclohexyl)benzene: A mixture of 2-bromo-1,3-dimethyl-5-(4-pentylcyclohexyl)benzene (3.97 g, 9.408 mmol), ethynyltriisopropylsilane (4.7 g, 25.77 mmol), CuI (45.9 mg, 0.48 mmol), PdCl$_2$(dppf) (130.4 mg, 0.185 mmol), diisopropylamine (4.34 mL, 0.059 mmol) in 1,4 dioxane (35 mL) was stirred at 120° C. for 2 days. After cooling to RT the mixture was filtered through celite; the celite was washed with toluene. The filtrates were combined than concentrated to dryness. The crude product was carried on next step without further purification.

The crude of product of above step was dissolved into THF (50 mL) then cooled to 0° C.; 1M TBAF solution in THF (23.52 mL, 23.52 mmol) was added. The resulting mixture was stirred at 0° C. for 15 minutes then stirred at RT for 1 hour. The mixture was poured to 36 mL of saturated NH4CL aqueous solution then extracted into diethyl ether (350 mL), organic layer was separated, dried MgSO$_4$, concentrated to dryness. Purification by silica gel column chromatography, eluting with Hexanes, gained 620 mg colorless liquid, yield 23%. LCMS (M+H=283).

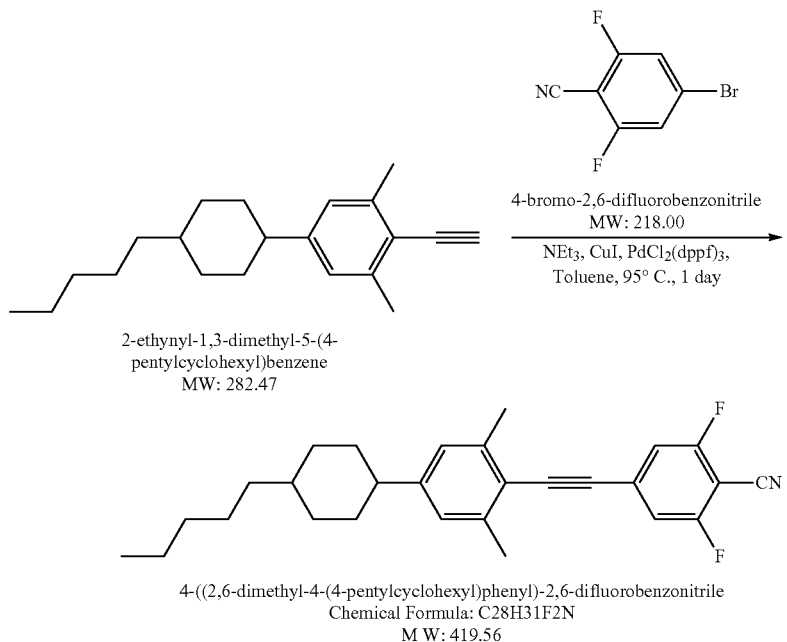

4-((2,6-Dimethyl-4-(4-pentylcyclohexyl)phenyl)ethynyl)-2,6-difluorobenzonitrile (LC-9): A mixture of 2-ethynyl-1,3-dimethyl-5-(4-pentylcyclohexyl)benzene (620 mg, 2.19 mmol), 4-bromo-2,6-difluorobenzonitrile (478.5 mg, 2.19 mmol), CuI (43 mg, 0.225 mmol), PdCl$_2$(dppf) (39 mg, 0.055 mmol), triethylamine (8 mL, 108.9 mmol) in toluene (10 mL) was stirred at 95° C. for 1 day. After cooling to RT the mixture was filtered through celite; the celite was washed with toluene. The filtrates were combined than concentrated to dryness. The crude product was purified by silica gel column chromatography, eluting with hexanes. The pure fraction was concentrated and the solid was re-crystallized from MeOH, gained 240 mg colorless crystals, yield 26%. LCMS (M+H=420). $^1$H NMR (400 MHz)

CDCl₃ δ 7.13 (d, J=7.64 Hz, 2H), 6.95 (s, 2H), 2.50-2.49 (m, 1H), 2.42 (s, 3H), 1.65-1.58 (m, 9H), 1.39-1.29 (m, 8H), 0.91 (t, J=7.68 Hz, 3H).

Example 1.10: Synthesis of Liquid Crystal Compound (1489-041) (LC-10)

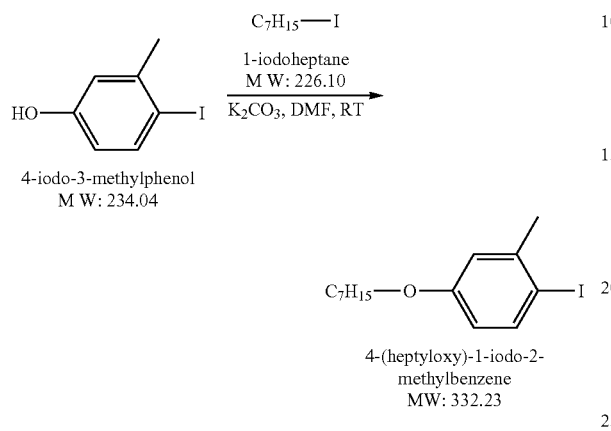

4-(Heptyloxy)-1-iodo-2-methylbenzene: A mixture of 1-iodoheptane (1.808 g, 8 mmol), 4-iodo-3-methylphenol (0.936 g, 4 mmol), K₂CO₃ (1.105 g, 8 mmol), in DMF (10 mL) was stirred at RT under N₂ atmosphere for 16 hours. The mixture was poured into water. The product was extracted into ethyl acetate (50 mL) and washed twice with water (2×35 mL). The organic layer was separated, concentrated to dryness to gain 1.32 g colorless oil product. Yield 100%. LCMS M+H=334.

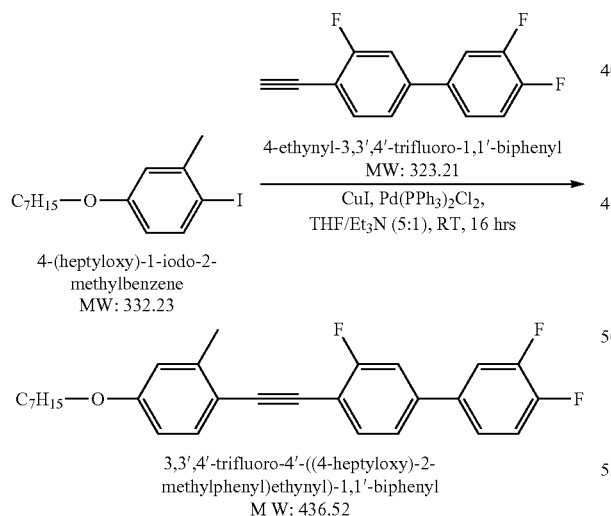

3,3',4-Trifluoro-4'-((4-(heptyloxy)-2-methylphenyl)ethynyl)-1,1'-biphenyl (LC-10): To a mixture of 4-(heptyloxy)-1-iodo-2-methylbenzene (1.192 g, 3.58 mmol) in THF anhydrous (9 mL) was added 4-ethynyl-3,3',4'-trifluoro-1,1'-biphenyl (1.00 g, 4.3 mmol) following by PdCl₂(PPh₃)₂ (50 mg, 0.071 mmol), CuI (68 mg, 0.35 mmol) and triethylamine (1.0 mL). The mixture was stirred at 85° C. for 16 h. The mixture was cooled to RT than poured into water. The mixture was extracted with dichloromethane. The organic layer was dried over MgSO₄, filtered and concentrated in vacuo. Purify by chromatography on silica gel eluting with hexanes/DCM (95:5) to gain 1.1 g yellow solid product which was recrystallized from hexanes to gain 500 mg colorless crystals, yield 32%. LCMS (M+H)=437. ¹H NMR (400 MHz) (DMSO) δ ppm 7.94-7.88 (m, 1H), 7.74 (d, J=11.04 Hz, 1H), 7.68-7.60 (m, 3H), 7.58-7.51 (m, 1H), 7.44 (d, J=8.52, 1H), 6.92 (d, J=2.24 Hz, 1H), 6.82 (dd, J=2.54 Hz, 8.52 Hz, 1H), 3.99 (t, J=6.52 Hz, 2H), 2.45 (s, 3H), 1.74-1.68 (m, 2H), 1.4-1.28 (m, 8H), 0.87 (t, J=7.28 Hz, 3H).

Example 1.11: Synthesis of Liquid Crystal Compound (1489-040) (LC-11)

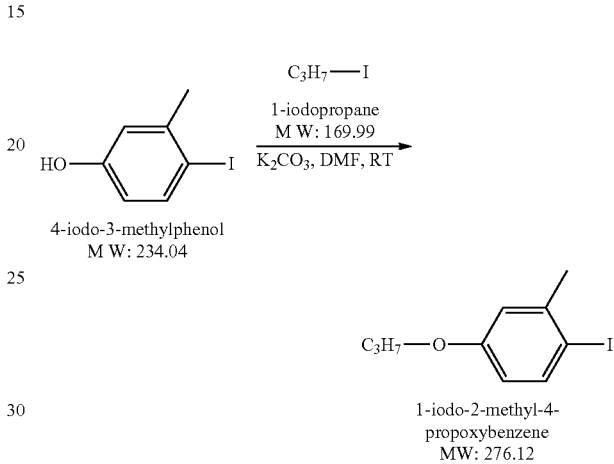

1-Iodo-2-methyl-4-propoxybenzene: A mixture of 1-iodopropane (1.359 g, 8 mmol), 4-iodo-3-methylphenol (0.936 g, 4 mmol), K₂CO₃ (1.105 g, 8 mmol), in DMF (10 mL) was stirred at RT under N₂ atmosphere for 16 hours. The mixture was poured into water. The product was extracted into ethyl acetate (50 mL) and washed twice with water (2×35 mL). The organic layer was separated, concentrated to dryness to gain 1.1 g colorless oil product. Yield 100%. LCMS M+H=277.

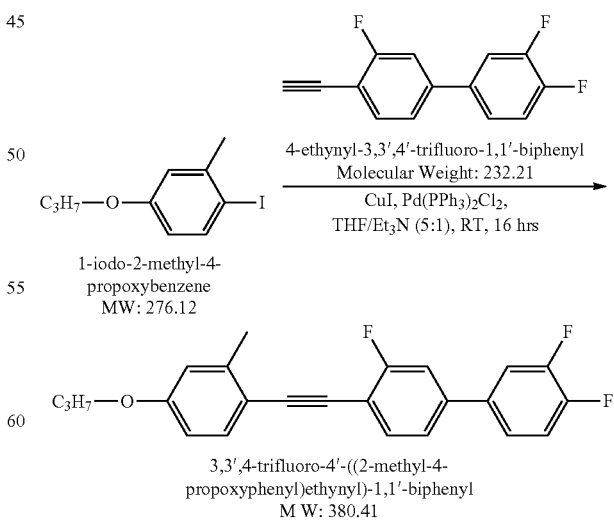

3,3',4-Trifluoro-4'-((2-methyl-4-propoxyphenyl)ethynyl)-1,1'-biphenyl (LC-11): To a mixture of 1-iodo-2-methyl-4- propoxybenzene (0.51 g, 1.84 mmol) in THF anhydrous (4.5 mL) was added 4-ethynyl-3,3′,4′-trifluoro-1,1′-biphenyl (0.514 g, 2.216 mmol) following by PdCl$_2$(PPh$_3$)$_2$ (25.8 mg, 0.036 mmol), CuI (35 mg, 0.184 mmol) and triethylamine (0.5 mL). The mixture was stirred at 85° C. for 16 h. The mixture was cooled to RT than poured into water. The mixture was extracted with dichloromethane. The organic layer was dried over MgSO$_4$, filtered and concentrated in vacuo. Purify by chromatography on silica gel eluting with hexanes/DCM (95:5) to gain 1.1 g yellow solid product which was recrystallized from hexanes to gain 500 mg colorless crystals, yield 71%. LCMS M+H=381. $^1$H NMR (400 MHz) (DMSO) δ ppm 7.94-7.88 (m, 1H), 7.74 (d, J=11.04 Hz, 1H), 7.68-7.60 (m, 3H), 7.58-7.51 (m, 1H), 7.44 (d, J=8.52 Hz, 1H), 6.93 (d, J=2.24 Hz, 1H), 6.82 (dd, J=2.54 Hz, 8.52 Hz, 1H), 3.96 (t, J=6.52 Hz, 2H), 2.5 (s, 3H), 1.76-1.69 (m, 2H), 0.95 (t, J=7.28 Hz, 3H).

Example 1.12: Synthesis of Liquid Crystal Compound (1489-033) (LC-12)

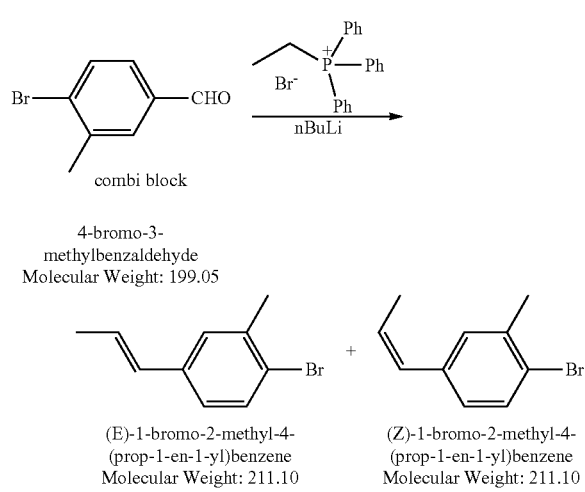

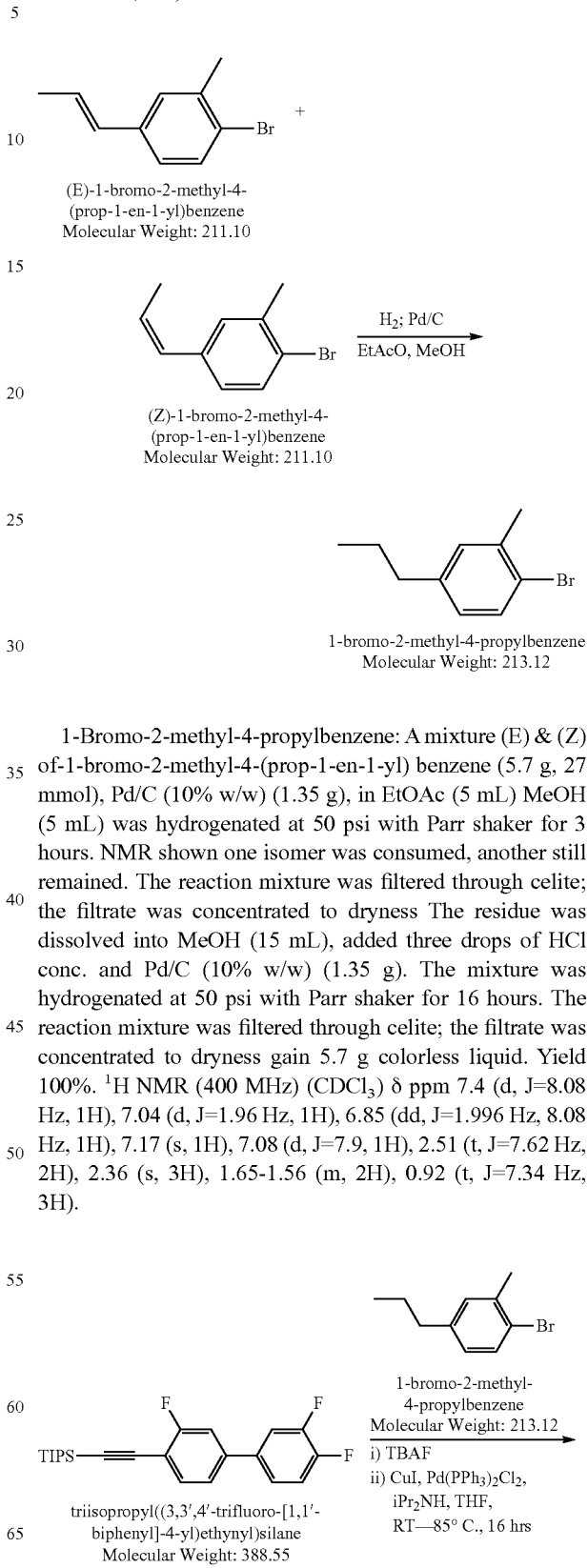

(E)&(Z)-1-Bromo-2-methyl-4-(prop-1-en-1-yl)benzene: Into a three neck flask equipped with condenser, press equalizing addition funnel, was placed ethyltriphenylphosphonium bromide (13.36 g, 36 mmol) suspended in 50 mL of anhydrous THF. The suspension was cooled to −5° C. with salt-ice bath. A solution of n-BuLi 2.5 M in Hexanes (14.4 mL, 36 mmol) was added dropwise to the suspension to give a red solution. After 1 hour a mixture of 4-bromo-3-methylbenzaldehyde (5.55 g, 30 mmol) in anhydrous THF (50 mL) was added dropwise to the red solution via the addition funnel at −5° C. After the addition was completed the ice cooling bath was removed to allow the reaction to stir at ambient temperature for 10 hours. Brine (50 mL) was added and the clear solution extracted with three portions (3×60 mL) of Toluene. The combined organic layers were dried over MgSO$_4$ concentrated to dryness to leave a mixture of solid and oil. The oil was dissolved into diethyl ether (100 mL). The undissolved materials were filtered off by filtration. The filtrate was concentrated and the residue was purified by silica gel column chromatography, Hexane was used for eluting to gain 5.7 g yellow semi-solid products which were two isomer trans and cis products. Yield 90%. LCMS M+H=213. $^1$H NMR (400 MHz) (CDCl$_3$) δ ppm 8.10-8.01 (m, 2H), 7.96-7.85 (m, 2H), 7.62-7.64 (m, 2H), 6.75 (s, 2H), 3.98 (t, J=6.52 Hz, 2H), 2.44 (s, 6H), 1.74-1.67 (m, 2H), 1.49-1.37 (m, 2H), 1.35-1.23 (m, 4H), 0.73 (t, J=6.43 Hz, 3H).

1-Bromo-2-methyl-4-propylbenzene: A mixture (E) & (Z) of-1-bromo-2-methyl-4-(prop-1-en-1-yl) benzene (5.7 g, 27 mmol), Pd/C (10% w/w) (1.35 g), in EtOAc (5 mL) MeOH (5 mL) was hydrogenated at 50 psi with Parr shaker for 3 hours. NMR shown one isomer was consumed, another still remained. The reaction mixture was filtered through celite; the filtrate was concentrated to dryness The residue was dissolved into MeOH (15 mL), added three drops of HCl conc. and Pd/C (10% w/w) (1.35 g). The mixture was hydrogenated at 50 psi with Parr shaker for 16 hours. The reaction mixture was filtered through celite; the filtrate was concentrated to dryness gain 5.7 g colorless liquid. Yield 100%. $^1$H NMR (400 MHz) (CDCl$_3$) δ ppm 7.4 (d, J=8.08 Hz, 1H), 7.04 (d, J=1.96 Hz, 1H), 6.85 (dd, J=1.996 Hz, 8.08 Hz, 1H), 7.17 (s, 1H), 7.08 (d, J=7.9, 1H), 2.51 (t, J=7.62 Hz, 2H), 2.36 (s, 3H), 1.65-1.56 (m, 2H), 0.92 (t, J=7.34 Hz, 3H).

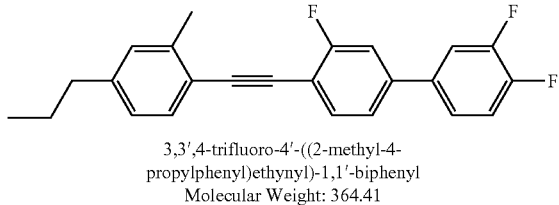

3,3',4-trifluoro-4'-((2-methyl-4-propylphenyl)ethynyl)-1,1'-biphenyl
Molecular Weight: 364.41

3,3',4-Trifluoro-4'-((2-methyl-4-propylphenyl)ethynyl)-1,1'-biphenyl (LC-12): Under Nitrogen protection, TBAF 1M/THF (9 mL, 9 mmol) was added to a mixture of triisopropyl((3,3',4'-trifluoro-[1,1'-biphenyl]-4-yl) ethynyl) silane (2.3 g, 0.01 mol) in THF (5 mL) at 0° C. The resulting mixture was stirred at RT for 2 hours. Pd(PPh$_3$)$_2$Cl$_2$ (42 mg, 0.06 mmol) and CuI (57 mg, 0.3 mmol) were added to above mixture following by 1-bromo-2-methyl-4-propylbenzene (0.639 g, 3 mmol) and triethylamine (1 mL). The resulting mixture was stirred at 85° C. for 16 hours. After cooling to RT the mixture was poured into water. The product was extracted into DCM (50 mL) and washed twice with water (2×35 mL). The organic layer was separated, concentrated to dryness. The crude product was purified by silica gel column chromatography; hexanes was used for eluting to gain 0.58 g colorless solid product. Yield 47%. LCMS M+H=365. $^1$H NMR (400 MHz) (DMSO) δ ppm 7.94-7.89 (m, 1H), 7.75 (d, J=11 Hz, 1H), 7.7-7.58 (m, 3H), 7.56-7.51 (m, 1H), 7.43 (d, J=7.8 Hz, 1H), 7.17 (s, 1H), 7.08 (d, J=7.9, 1H), 2.55 (t, J=7.54 Hz, 2H), 2.44 (s, 3H), 1.62-1.55 (m, 2H), 0.91 (t, J=7.32 Hz, 3H).

Comparative Example 1.13

Synthesis of Comparative Liquid Crystal #1
(CLC-1)

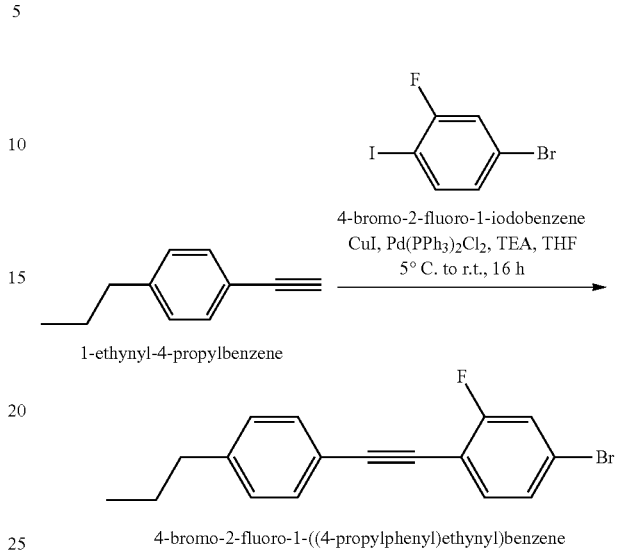

4-Bromo-2-fluoro-1-((4-propylphenyl)ethynyl)benzene:
To a mixture of CuI (12.48 mg, 0.06 mmol, Aldrich) and Pd$_2$(PPh$_3$)$_2$Cl$_2$ (15.32 mg, 0.02 mmol, Aldrich) and THF (5 mL, Aldrich), was added 4-bromo-2-fluoro-1-iodobenzene (658 mg, 2.19 mmol, Aldrich) and then the mixture was degassed for 15 minutes under a cooling bath of dry ice (Airgas, San Marcos, Calif. USA) and benzene (Aldrich) at 5° C. Then, TEA (0.061 g, 4.38 mmol, Aldrich) was added with 1-ethynyl-4-propylbenzene (316 mg, 2.19 mmol) followed by degassing for an additional 10 minutes at 5° C. Then, the mixture was allowed to heat to room temperature and then stirred for 16 hours. The mixture can then diluted with hexane (50 mL, Aldrich), filtered, and then concentrated. Next, the crude product was purified by flash column on silica gel (Aldrich) and 3:1 dichloromethane:hexanes (Aldrich) to give a colorless solid product. (580 mg, yield 83.5%).

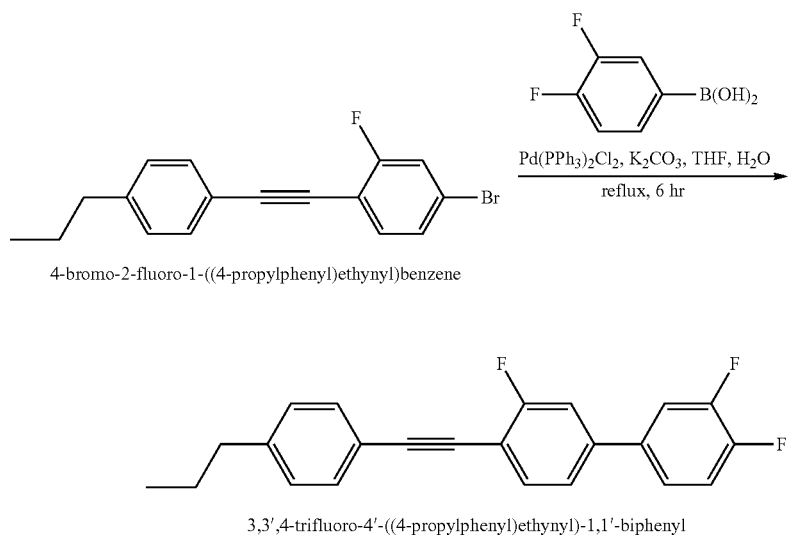 [SMILES: CCCc1ccc(C#Cc2ccc(Br)cc2F)cc1 ; OB(O)c1ccc(F)c(F)c1 ; CCCc1ccc(C#Cc2ccc(-c3ccc(F)c(F)c3)cc2F)cc1]

3,3',4-Trifluoro-4'-((4-propylphenyl)ethynyl)-1,1'-biphenyl (CLC-1): A solution of $Pd_2(PPh_3)_2Cl_2$ (10.45 mg, 0.015 mmol, Aldrich), $K_2CO_3$ (206.48 mg, 1.49 mmol, Aldrich), 4-bromo-2-fluoro-1-((4-propylphenyl)ethynyl)benzene (237 mg, 0.747 mmol), 3,4-difluorophenyl)boronic acid (141.55 mg, 0.89 mmol, Aldrich), tetrahydrofuran (THF) (5 mL, Aldrich), and DI water (0.5 mL) can be mixed and then refluxed for 6 hours. Then, the mixture was left to cool to room temperature and then poured into DI water (300 mL). Next, the organic layer was extracted with ethyl acetate (10 mL) and washed twice with DI water (2×5 mL). The combined organic layers were then dried over $Na_2SO_4$ (Aldrich). After concentration in vacuo, the resulting liquid can be purified via flash chromatography on silica gel (Aldrich) and 1:1 hexanes:$Et_2O$ (Aldrich) to yield a colorless solid, CLC-1 (198.9 mg, 72% yield).

Example 2.1: Preparation of Liquid Crystal Mixtures

For optimum PDLC functionality it is helpful for the liquid crystal system to have a specific combination of physical properties. One particularly useful property is a wide nematic temperature range. The target nematic range of smart window film was −20° C. to +80° C. Historically, it was hard for a single liquid crystal to achieve such a wide nematic range. As a result, a variety of different liquid crystals was used to achieve the desired nematic temperature range. To achieve such a formulation, liquid crystals with low melting points were mixed with liquid crystals having high melting points, good miscibility, and solubility. In the present embodiments, the mixture compounds were low melting compounds based on a two or three six-membered cyclic cores.

For Formulation 1 (F-1), a mixture of 5CB (0.261 g, 50.2 wt %, Qingdao QY Liquid Crystal Co., Ltd., Chengyang, Qingdao, China), 7CB (0.050 g, 9.7 wt %, Qingdao QY Liquid Crystal), 5CT (0.047 g, 9.0 wt %, Qingdao QY Liquid Crystal), 5CCB (0.085 g, 16.4 wt %, Qingdao QY Liquid Crystal), 6CHBT (0.057 g, 11.0 wt %, Aldrich), and LC-9 (0.020 g, 3.8 wt %) was mixed in a clear sample bottle and then put in a shaker (VWR Advanced Digital Shaker, Model-3500 ADV 120V) overnight to mix the liquid crystal compounds. The sample bottle was then heated on a hot plate at 120° C. to dissolve any remaining components. Then gentle shaking by hand was done for one to two minutes until a clear solution appeared. The mixture was then kept on hot plate for another two minutes. The resulting clear solution was then cooled at room temperature and then was confirmed to have a turbid liquid appearance, which is typical for liquid crystal formulation. A small amount (5-10 mg) of formulation-1 was taken to measure differential scanning calorimetry (DSC) (TA Instrument, Model-Q2000). A single phase transition peak was measured at 83.9° C. Normally if the mixture is homogeneous then it should have a single phase transition temperature different from the individual melting temperature of the components. This single phase transition temperature termed as eutectic temperature the presence of the single transition confirmed a eutectic mixture.

Additional mixtures were also generated using the same methodology with the exception that the mass ratios were varied according to the mass ratios in Table 1. Where chiral dopants were used to enhance the haze scattering, the dopants included the following: R-811 (Merck) and S-811 (Merck). All mixtures whose measurements were taken for their nematic range exhibited a single isotropic phase change temperature indicating a homogeneous mixture, which is also disclosed.

TABLE 1

Mixture Formulations and Associated Phase Properties.

| Mixture | 5CB (wt %) | 7CB (wt %) | 8OCB (wt %) | 5CT (wt %) | 5CCB (wt %) | 6CHBT (wt %) | Dopant/ (wt %) | LC Comp/ (wt %) | Nematic Range [° C.] |
|---|---|---|---|---|---|---|---|---|---|
| F-1 | 50.2 | 9.6 | — | 9.0 | 16.4 | 11.0 | — | LC-9/3.8 | C −20 N 74.6 I |
| F-2 | 49.8 | e | — | 8.9 | 16.2 | 10.9 | — | LC-2/4.6 | C −20 N 79.9 I |
| F-3 | 49.5 | 9.5 | — | 8.9 | 16.1 | 10.8 | — | LC-4/5.1 | C −20 N 80.8 I |
| F-4 | 49.8 | 9.6 | — | 8.9 | 16.2 | 10.9 | — | LC-1/4.7 | C −20 N 79.8 I |
| F-5 | 49.3 | 10.6 | 5.0 | 10.4 | 15.1 | 9.6 | — | —/0.0 | C −20 N 81 I |
| F-5A | 46.9 | 10.1 | 4.8 | 9.9 | 14.4 | 9.2 | — | LC-2/4.7 | C −20 N 80.2 I |
| F-6 | 50.3 | 9.3 | 6.8 | 14.4 | 10.2 | 9.0 | — | —/0.0 | C −20 N 82 I |
| F-6A | 47.7 | 8.8 | 6.4 | 13.7 | 9.6 | 8.6 | — | LC-2/5.2 | C −20 N 80.3 I |
| F-7 | 49.1 | 10.3 | 9.5 | 16.6 | 5.1 | 9.4 | — | —/0.0 | C −20 N 78 I |
| F-7A | 46.8 | 9.9 | 9.0 | 15.9 | 4.9 | 8.9 | — | LC-2/4.6 | C −20 N 77.2 I |
| F-8 | 48.3 | 4.7 | 5.1 | 15.0 | 14.9 | 12.0 | — | —/0.0 | C −20 N 91 I |
| F-8A | 46.1 | 4.5 | 4.9 | 14.3 | 14.2 | 11.5 | — | LC-2/4.5 | C −20 N 89.3 I |
| F-9 | 50.3 | 5.0 | 9.9 | 14.8 | 10.5 | 9.5 | — | —/0.0 | C −20 N 84 I |
| F-9A | 46.7 | 4.9 | 9.8 | 14.1 | 9.2 | 10.1 | — | LC-2/5.2 | C −20 N 83.9 I |
| F-10 | 49.8 | 4.8 | 5.0 | 19.9 | 10.7 | 9.8 | — | —/0.0 | C −20 N 93 I |
| F-10A | 47.2 | 4.5 | 4.7 | 18.9 | 10.1 | 9.3 | — | LC-2/5.3 | C −20 N 91.4 I |
| F-11 | 49.5 | 4.8 | 5.4 | 24.6 | 5.6 | 10.1 | — | —/0.0 | C −20 N 94 I |
| F-11A | 46.9 | 4.6 | 5.2 | 23.3 | 5.3 | 9.6 | — | LC-2/5.1 | C −20 N 90.5 I |
| F-12 | 49.6 | 5.0 | 10.2 | 20.2 | 4.9 | 10.1 | — | —/0.0 | C −20 N 86 I |
| F-12A | 45.6 | 4.6 | 9.4 | 18.6 | 4.5 | 9.3 | — | LC-2/8.0 | C −20 N 82.5 I |
| F-13 | 48.8 | 10.5 | 4.7 | 10.1 | 16.3 | 9.6 | — | —/0.0 | C −20 N 80.7 I |
| F-13A | 46.5 | 10.0 | 4.5 | 9.6 | 15.6 | 9.2 | — | LC-2/4.6 | C −20 N 75.0[3] I |
| F-14A | 48.0 | 9.2 | 10.4 | 8.7 | 15.7 | 3.2 | R-811/4.9 | LC-2/3.2 | — |
| F-15A | 48.6 | 9.3 | 10.3 | 8.7 | 15.9 | 2.9 | R-811/4.3 | LC-1/4.7 | — |
| CF-1 | 49.8 | 9.6 | — | 8.9 | 16.3 | 10.9 | — | CLC-1/4.5 | C −20 N 63.5 I |
| CF-2 | 52.2 | 10.0 | — | 9.4 | 17.0 | 11.4 | — | — | C −20 N 81.4 I |
| CF-3 | 61.7 | 18.6 | 11.5 | 8.1 | — | — | — | — | C −20 N 56.1 I |
| E7 Reference | 51 | 25 | 16 | 8 | — | — | — | — | C −20 N 58.7 I |
| F-16 | 49.4 | 14.98 | 0.00 | 10.8 | 15.02 | 9.90 | — | —/0.0 | C −20 N 81.3 I |
| F-16A | 46.9 | 14.2 | 0.00 | 10.3 | 14.3 | 9.40 | — | LC-7/4.9 | C −20 N 83.9 I |
| F-17 | 49 | 11.1 | 5.3 | 9.8 | 15 | 9.9 | — | —/0.0 | C −20 N 80.5 I |

TABLE 1-continued

Mixture Formulations and Associated Phase Properties.

| Mixture | 5CB (wt %) | 7CB (wt %) | 8OCB (wt %) | 5CT (wt %) | 5CCB (wt %) | 6CHBT (wt %) | Dopant/ (wt %) | LC Comp/ (wt %) | Nematic Range [° C.] |
|---|---|---|---|---|---|---|---|---|---|
| F-17A | 46.6 | 10.6 | 5.0 | 9.3 | 14.3 | 9.4 | — | LC-7/4.9 | C −20 N 85.3 I |
| F-18 | 50 | 9.9 | 9.9 | 10.0 | 10.1 | 10 | — | —/0.0 | C −20 N 74.5 I |
| F-18A | 47.5 | 9.4 | 9.4 | 9.5 | 9.5 | 9.5 | — | LC-7/5.0 | C −20 N 78.2 I |
| F-19 | 49.8 | 10 | 7.2 | 13.6 | 10.5 | 8.6 | — | —/0.0 | C −20 N 84.8 I |
| F-19A | 47.3 | 9.49 | 6.8 | 12.9 | 9.9 | 8.2 | — | LC-7/5.1 | C −20 N 85.2 I |
| F-20 | 49.5 | 10.1 | 5.3 | 9.8 | 14.9 | 10.1 | — | —/0.0 | C −20 N 80.8 I |
| F-20A | 47.1 | 9.6 | 5.0 | 9.3 | 14.2 | 9.6 | — | LC-7/4.9 | C −20 N 84.6 I |
| F-21 | 49.5 | 10 | 4.9 | 15.4 | 10 | 10 | — | —/0.0 | C −20 N 83.1 I |
| F-21A | 47.1 | 9.5 | 4.7 | 14.7 | 9.5 | 9.5 | — | LC-7/4.8 | C −20 N 85.3 I |
| F-22 | 47.9 | 10.1 | 10.2 | 15.6 | 6.9 | 8.9 | — | —/0.0 | C −20 N 80.2 I |
| F-22A | 45.6 | 9.6 | 9.6 | 15.8 | 6.6 | 8.5 | — | LC-7/4.8 | C −20 N 81.2 I |
| F-23 | 50.1 | 9.8 | 10.1 | 14.8 | 4.9 | 9.9 | — | —/0.0 | C −20 N 75.2 I |
| F-23A | 47.5 | 9.3 | 9.6 | 14.0 | 4.7 | 9.4 | — | LC-7/5.1 | C −20 N 78.9 I |
| F-24 | 47.6 | 5.1 | 5 | 14.8 | 15.4 | 12 | — | —/0.0 | C −20 N 92.0 I |
| F-24 | 45.3 | 4.9 | 4.8 | 14.1 | 14.6 | 11.4 | — | LC-7/4.9 | C −20 N 92.9 I |
| F-25 | 53.7 | 5.1 | 10 | 14.9 | 10.9 | 5.3 | — | —/0.0 | C −20 N 87.1 I |
| F-25A | 50.9 | 4.8 | 9.5 | 14.1 | 10.3 | 5.0 | — | LC-7/5.3 | C −20 N 89.1 I |
| F-26 | 49.6 | 5.0 | 4.9 | 19.9 | 10.5 | 10.1 | — | —/0.0 | C −20 N 93.8 I |
| F-26A | 47.1 | 4.7 | 4.7 | 18.9 | 9.9 | 9.6 | — | LC-7/5.1 | C −20 N 95.4 I |
| F-27 | 48.7 | 4.9 | 4.9 | 24.9 | 5.9 | 10.7 | — | —/0.0 | C −20 N 96.4 I |
| F-27A | 46.1 | 4.6 | 4.6 | 23.6 | 5.6 | 10.1 | — | LC-7/5.3 | C −20 N 97.8 I |
| F-28 | 48.6 | 4.8 | 9.9 | 21.4 | 5.4 | 9.8 | — | —/0.0 | C −20 N 89.9 I |
| F-28A | 46.2 | 4.6 | 9.4 | 20.3 | 5.1 | 9.3 | — | LC-7/4.9 | C −20 N 92.1 I |

[1] LC compound 8OCB was procured from Qingdao QY Liquid Crystal Co., Ltd., Chengyang, Qingdao, China.
[2] DSC Equipment was not run below −20° C.
[3] This transition was obtained via POM on the cooling cycle.

Example 3.1: Fabrication of LC-Based Dimmable Device Using Capillary Method

In Example 3.1, a selectively dimmable device based on a liquid crystal compound with positive dielectric anisotropy can be fabricated using the capillary method. For the capillary method, a homogeneous-type liquid crystal test cell (KSRO-10/B107M1NSS05, E.H.C. Co. Ltd, Tokyo, Japan) was used for making the device. The test cell comprised two substrates with supports that defined an active alignment area in between the two substrates. The size of the glass/ITO substrate was 20 mm×25 mm with a sheet resistance about 100 Ω/sq and the active alignment area was about 10 mm×10 mm with a cell gap of 10 μm. The cell was procured pre-coated with a polyamide alignment layer (LX-1400, Hitachi-Kasei Shoji Co., Ltd., Tokyo, Japan) so no application of the alignment layers was necessary. Also, because of the geometry of the cell included supports to ensure preservation of the cell gap, separate spacers were not required to be inserted into the cell before application of the liquid crystals.

First, the test cell was baked at 120° C. for 30 min before injection of liquid crystal mixture to remove any impurities and any vapors inside the chamber. The liquid crystal mixture was then prepared by first mixing LC-1 and MLC-2132 (EMD Chemicals, Gibbstown, N.J., USA) with a weight ratio of about 5 wt % to about 95 wt % respectively, or 4.8 wt % to 95.2 wt %, using an ultrasonic homogenizer to mix the formulation at about 120° C. to result a liquid crystal mixture. Next, the polymer precursors, reactive mesogen, LC-242 (BASF Corporation, Florham Park, N.J., USA) and photo initiator, Irgacure TPO (BASF) were mixed together separately at a mass ratio of 100:1 respectively and dissolved in 50 vol % THF (Aldrich) followed by mixing in a vortex mixer to create a precursor mixture. Then, the precursor mixture was slowly added to the first formulation still at about 120° C. such that the weight ratio liquid crystal mixture to precursor mixture was about 15:1 respectively. The result was a mixture with a mass ratio of 88.21 wt % MLC-2132, 4.41 w % LC-1, 7.31 wt % LC-242, and 0.07 wt % Irgacure TPO. The resulting mixture was then mixed with an ultrasonic homogenizer under a vacuum to thoroughly mix the solution and remove excess THF to yield a hot coating formulation.

Next, the test cells were pretreated for the liquid crystal injection by warming the substrates at 80° C. for 5 minutes on a hot plate. Then, the hot coating formulation was injected near the opening of the test cell. The solution was then allowed to enter into the test by capillary action until it coated the entire active alignment area. In some embodiments, the test cell was put on hot plate after injecting coating formulation to help ensure homogenous coverage of the liquid crystal. The resulting coated substrates were then soft baked at 80° C. for 3 minutes on a hot plate to remove any residual solvent. After soft baking, the result was a layered cell assembly, ready for ultraviolet (UV) radiation curing (UV-curing).

Then, the layered cell assembly was put on a stainless steel plate to provide a thermal sink so that the cell did not overheat during UV-curing. The assembly was then cured under a UV flood lamp (7411 UV Flood System; Loctite, Rocky Hill, Conn. USA) at an output of about 10 mW/cm$^2$ incident power for 3 minutes on each side to photopolymerize the LC-242. To keep the temperatures of the assembly from localized blooming as a by-product of the UV irradiation, the orientation of the sample was switched at approximately 3-minute intervals by flipping the assembly over. The result is an unsealed, dimmable assembly.

After UV-curing, the edges were optionally sealed with a sealant to protect the liquid crystal element. After encapsulation, the assembly was then baked in an oven at 80° C. for 30 minutes, which will result in a sealed, dimmable assembly.

Next, the dimmable assembly was be placed in electrical communication with a voltage source by electrically by attaching a conducting clamp and wire in electrical communication with a voltage source to each conductive substrate such that when a voltage was applied across the voltage source, an electrical field was applied across the liquid crystal.

In some embodiments, a voltage source provides an electrical field across the device to rotate the dispersed liquid crystals resulting in a mismatch of the index of refraction the liquid crystal element. The result was selectively dimmable device #1 (DD-1).

Example 3.2: Fabrication of Additional LC-Based Dimmable Devices

In Example 3.2, additional devices can be formulated using the same methodology as in Example 3.1 with the exception that the mass ratios and additives were varied according to Table 2, additional compounds used were Irgacure® 651 (BASF). For the benchmark device CDD-1, only MLC-2132 (EMD Chemicals) was used without any other liquid crystal composition.

TABLE 2

Variances between Dimmable Elements.

| Element | Example | Liquid Crystal Components | Polymer | Polyimide | Dielectric Anisotropy | Process |
|---|---|---|---|---|---|---|
| DD-1 | Example 3.1 | LC-1 (4.41 wt %) MLC-2132 (88.21 wt %) | LC-242 (7.31 wt %) Irgacure TPO (0.07 wt %) | LX-1400 | Positive | Layer |
| DD-2 | Example 3.2 | LC-2 (4.74 wt %) MLC-2132 (89.92 wt %) | LC-242 (5.29 wt %) Irgacure TPO (0.05 wt %) | LX-1400 | Positive | Layer |
| DD-3 | Example 3.2 | F-1 (90.91 wt %) | LC-242 (8.56 wt %) Irgacure 651 (0.52 wt %) | LX-1400 | Positive | Layer |
| DD-4 | Example 3.2 | F-2 (90.66 wt %) | LC-242 (8.82 wt %) Irgacure 651 (0.52 wt %) | LX-1400 | Positive | Layer |
| DD-5 | Example 3.2 | F-3 (90.86 wt %) | LC-242 (8.62 wt %) Irgacure 651 (0.52 wt %) | LX-1400 | Positive | Layer |
| DD-6 | Example 3.2 | F-4 (90.51 wt %) | LC-242 (8.97 wt %) Irgacure 651 (0.52 wt %) | LX-1400 | Positive | Layer |
| DD-7 | Example 3.2 | F-5 (89.85 wt %) | LC-242 (9.28 wt %) Irgacure 651 (0.87 wt %) | LX-1400 | Positive | Layer |
| DD-8 | Example 3.2 | F-5A (90.34 wt %) | LC-242 (7.95 wt %) Irgacure 651 (1.71 wt %) | LX-1400 | Positive | Layer |
| DD-9 | Example 3.2 | F-6A (91.11 wt %) | LC-242 (7.50 wt %) Irgacure 651 (1.39 wt %) | LX-1400 | Positive | Layer |
| DD-10 | Example 3.2 | F-7A (90.42 wt %) | LC-242 (7.61 wt %) Irgacure 651 (1.97 wt %) | LX-1400 | Positive | Layer |
| DD-11 | Example 3.2 | F-8A (90.77 wt %) | LC-242 (7.55 wt %) Irgacure 651 (1.68 wt %) | LX-1400 | Positive | Layer |
| DD-12 | Example 3.2 | F-9A (89.56 wt %) | LC-242 (8.52 wt %) Irgacure 651 (1.92 wt %) | LX-1400 | Positive | Layer |
| DD-13 | Example 3.2 | F-10A (90.24 wt %) | LC-242 (8.28 wt %) Irgacure 651 (1.48 wt %) | LX-1400 | Positive | Layer |
| DD-14 | Example 3.2 | F-11A (90.59 wt %) | LC-242 (8.07 wt %) Irgacure 651 (1.34 wt %) | LX-1400 | Positive | Layer |
| DD-15 | Example 3.2 | F-12A (74.08 wt %) | LC-242 (22.22 wt %) Irgacure 651 (3.70 wt %) | LX-1400 | Positive | Layer |
| DD-16 | Example 3.2 | F-13A (91.01 wt %) | LC-242 (7.59 wt %) Irgacure 651 (1.40 wt %) | LX-1400 | Positive | Layer |
| DD-17 | Example 3.2 | F-14A (94.90 wt %) | LC-242 (4.10 wt %) Irgacure 651 (1.00 wt %) | LX-1400 | Positive | Layer |
| DD-18 | Example 3.2 | F-15A (94.81 wt %) | LC-242 (3.95 wt %) Irgacure 651 (1.24 wt %) | LX-1400 | Positive | Layer |
| CDD-1 | Example 3.2 | MLC-2132 (94.83 wt %) | LC-242 (5.12 wt %) IrgacureTPO (0.05 wt %) | LX-1400 | Positive | Layer |
| CDD-2 | Example 3.2 | CLC-1 (5.07 wt %) MLC-2132 (89.36 wt %) | LC-242 (5.52 wt %) IrgacureTPO (0.05 wt %) | LX-1400 | Positive | Layer |
| CDD-3 | Example 3.2 | CF-1 (90.97 wt %) | LC-242 (8.51 wt %) Irgacure 651 (0.52 wt %) | LX-1400 | Positive | Layer |
| CDD-4 | Example 3.2 | CF-2 (90.75 wt %) | LC-242 (8.71 wt %) Irgacure 651 (0.54 wt %) | LX-1400 | Positive | Layer |
| DD-17A | Example 3.2 | F17A(91%) + R811(3.0%) | LC-242 (5.0 wt %); Irgacure 651(1%) | LX-1400 | Positive | Layer |
| DD-18A | Example 3.2 | F18A(91%) + R811(3.0%) | LC-242 (5.0 wt %); Irgacure 651(1%) | LX-1400 | Positive | Layer |
| DD-19A | Example 3.2 | F18A(91%) + R811(3.0%) | LC-242 (5.0%); Irgacure 651(1%) | LX-1400 | Positive | Layer |
| DD-22A | Example 3.2 | F22A(91%) + R811(3.0%) | LC-242 (5.0%); Irgacure 651(1%) | LX-1400 | Positive | Layer |
| DD-28A | Example 3.2 | F28A(91%) + R811(3.0%) | LC-242 (5.0%); Irgacure 651(1%) | LX-1400 | Positive | Layer |

Example 4.1: Composition Polarization Observations

The synthesized compounds can be examined with an optical microscope in a crossed polarization lighting condition to characterize their liquid crystal behavior and to study the composition's birefringence, or the difference between high and low refractive index of anisotropic liquid crystal molecules.

For the setup, a microscope (BX-53F; Olympus, Tokyo, Japan) can be setup for polarizing microscopy with the analyzer attachment (U-PA, Olympus) rotated 90 degrees from the polarizer filter (BX45-PO, Olympus) all within the optical path from an adjustable 100 watt halogen light attachment (U-LH100HG, Olympus). In addition, to capture the images the microscope can be also equipped with a video camera adapter (U-TVO.35XC-2, Olympus) which was further connected to a computer for capturing the images. For measurement, the samples can be placed on the microscope's stage placing it in the halogen lamp's optical path between the polarizer and the analyzer. Since the polarization between the analyzer and polarizer are completely mismatched by 90 degrees, if the sample is isotropic, e.g. glass, the light emitted from the source would be nearly completely blocked by the second polarizer because the unblocked polarized light exiting the first polarizer would not bend and would be subsequently blocked by the analyzer. The blockage of the remaining light by the mismatched analyzer is due to the inability of isotropic materials to change the polarization direction of light passing through them. However, if an anisotropic sample is placed in between both polarizer films, the polarized light passing through the sample material can change polarization if the sample exhibits birefringence properties. As a result, at least some of the light will not be blocked by the analyzer, or a detected interference pattern. Since glass is isotropic and has minimal effect light polarization, the liquid crystal compositions can be sandwiched between two glass substrates during the measurements.

In addition to the microscope setup, a heating stage (FP 82 HT, Mettler Toledo, Columbus, Ohio, USA) and associated controller (FP 90, Mettler Toledo) can be used to heat the samples sandwiched in glass to preset temperatures right before measurements are taken. The purpose is to determine the birefringence properties of the samples at specific temperatures in order to determine their phase as a function of temperature.

If a nematic or a smectic phase is present after cooling and the samples exhibit birefringence, it can be detected as transformed light component at the microscope or an interference pattern of light. If the material is in an isotropic phase, it can be observed by the detection of no discernible light at the microscope, or darkness due to no transformation of light and subsequent blockage by the second polarizer.

For the measurements, a homogeneous-type liquid crystal test cell (KSRO-10/B107M1NSS05, E.H.C. Co. Ltd, Tokyo, Japan), described above was used to hold the liquid crystal compositions. The cell was procured pre-coated with a polyamide alignment layer (LX-1400, Hitachi-Kasei Shoji Co., Ltd., Tokyo, Japan). Before injecting the liquid crystal composition to be measured, the test cell was first baked at 120° C. for 30 min to remove any impurities and vapors inside the chamber. Next, the test cells were pretreated for the liquid crystal injection by warming the substrates at 80° C. for 5 minutes on a hot plate. Then, the liquid crystal composition, LC-1, was injected near the opening of the test cell. The solution was then allowed to enter into the test by capillary action until it coated the entire active alignment area. For the measurements, the test cell containing LC-1 was then placed in the above described apparatus.

Starting at 20° C., an image can be captured to baseline the mixture phase. Then, during first heating cycle the liquid crystal molecules in the sample can be heated at a rate of 20° C. per minute until a black image was observed, which indicates an isotropic phase change, and the temperature can be recorded. Then during cooling, when an interference color image is observed as a result of the samples transition back to nematic from isotropic, the phase transition temperature can be re-verified and an image can be recorded. Then, during second heating cycle, the samples can be heating at a heating rate of 5° C. per min in order to carefully record the phase change temperature.

In addition to measuring LC-1, measurements were also made for LC-2, LC-4, CLC-1, and MLC-2132 (EMD Chemicals, Gibbstown, N.J., USA). In addition, to characterize the liquid crystal applied mixture, mixtures of LC-1/MLC-2132 (~5 wt %:95 wt %), LC-2/MLC-2132 (~5 wt %:95 wt %), and CLC-1/MLC-2132 (~5 wt %:95 wt %) were also measured using a similar methodology.

As shown in Table 3, it was observed that the presence of the methyl groups resulted in a lowering of the crystalline to nematic phase change, or melting point ($T_{C-N}$). However, the nematic phase range also decreased because of a greater lowering of the transition from nematic to isotropic, or clearing point ($T_{N-I}$). It appears that lengthening the alkyl chain from a three-carbon alkyl chain to a seven-carbon alkyl chain had marginal effect on the range; in part due to competing underlying dynamics like increased mass form longer chains versus increase motion and flexibility from longer chains.

TABLE 3

Observed Transition Temperatures for Various Compounds

| Compounds | $T_{C-N}$ [° C.] | $T_{N-I}$ [° C.] |
|---|---|---|
| LC-1 | 37 | 44 |
| LC-2 | 43 | 50 |
| LC-3 | 52 | 91 |
| LC-4 | 37 | 83 |
| LC-5 | — | 53 |
| LC-6 | 97 | 172 |
| LC-7 | 114 | 162 |
| LC-8 | 72 | 99 |
| LC-9 | 81 | 102 |
| LC-10 | 77 | 121 |
| LC-11 | 78 | 147 |
| LC-12 | 61 | 92 |

In addition, the phases for the liquid crystal mixtures were measured using the above methods in combination with a Differential Scanning Calorimeter (DSC Q2000A, TA Instruments New Castle, Del. USA). The results are shown in Table 1 alongside the respective mixture.

Example 4.2: Environmental/Ultraviolet Durability Measurements

In Example 4.2, two liquid crystal compositions based on DD-2 (LC-2 and MLC-2132) and CDD-2 (CLC-1 and MLC-2132) were subjected to irradiation to a UV flood lamp to simulate UV environmental stresses such as continuous exposure to unfiltered daylight for long durations to determine the effect of the substitutions. First, the samples were measured by Differential Scanning Calorimetry (DSC) (Q2000, TA Instruments, New Castle, Del. USA) to interrogate the phase changes of the material before UV irradiation as well as to check the clearing temperature, or phase change from nematic to isotropic. For each sample, a small portion was placed in between two glass slides (Thin Film Devices, Inc. Anaheim, Calif. USA) to make a thin film and the Yellowness Index (YI) was measured with a spectrophotometer (Ultrascan Pro, Hunter Associates Laboratory, Inc., Reston, Va. USA) to determine the initial YI of the sample.

Then, about 100 mg of each sample was placed on to a transparent glass cap (30 mm×23 mm×0.7 mm OLED Encapsulation Glass; Senyo Trading Company, Hyogo, Japan) and covered with a glass slide (Thin Film Devices) to form an assembly. The samples were then exposed to a UV light source (7411 UV Flood System; Loctite, Rocky Hill, Conn. USA) at an output of about 10 mW/cm$^2$ incident power for 140 hours to simulate daylight exposure.

After UV irradiation, a small amount of the sample was then taken from the assembly and measured in the DSC (Q2000, TA Instruments) in order to see any changes in the transition temperatures due to any UV induced degradation. Also, a small portion of the irradiated samples extracted from their respective assemblies, sandwiched between two glass slides (Thin Film Devices), and then re-measured with the spectrophotometer (Ultrascan Pro, Hunter Associates).

The yellowness index (YI) was calculated according to ASTM E313. In Tables 4 and 5, the results show that the YI increase for the embodiment was surprisingly lower than that of the comparative compound. It is believed that YI increase is associated with UV degradation. The substantially lower increase in YI indicates that the embodiment tested has an increased UV resistance.

TABLE 4

Yellowness Index measurement of Selected Samples

| Element | Liquid Crystal Components | Initial Yellowness Index @ 0 hrs. | Yellowness Index @ 140 hrs. | % Degradation (Increase of YI) |
|---|---|---|---|---|
| DD-2 | LC-2 | 1.52 | 2.22 | 46% |
| CDD-2 | CLC-1 | 0.28 | 6.42 | 2,192% |

TABLE 5

Yellowness Index measurement of Selected Samples.

| Element | Liquid Crystal Components | Initial Yellowness Index @ 0 hrs. | Yellowness Index @ 24 hrs. |
|---|---|---|---|
| | F16A | 0.98 | 2.02 |
| | F17A | 1.14 | 1.67 |
| | F18A | 0.92 | 1.01 |
| | F19A | 1.05 | 1.95 |
| | F20A | 1.20 | 2.85 |
| | F21A | 0.94 | 0.61 |
| | F22A | 0.97 | 0.83 |
| | F23A | 1.12 | 2.17 |
| | F24A | 1.23 | 2.51 |
| | F25A | 1.12 | 1.61 |
| | F26A | 0.94 | 1.41 |
| | F27A | 1.15 | 2.44 |
| | F28A | 1.12 | 2.55 |

Figure 5A:
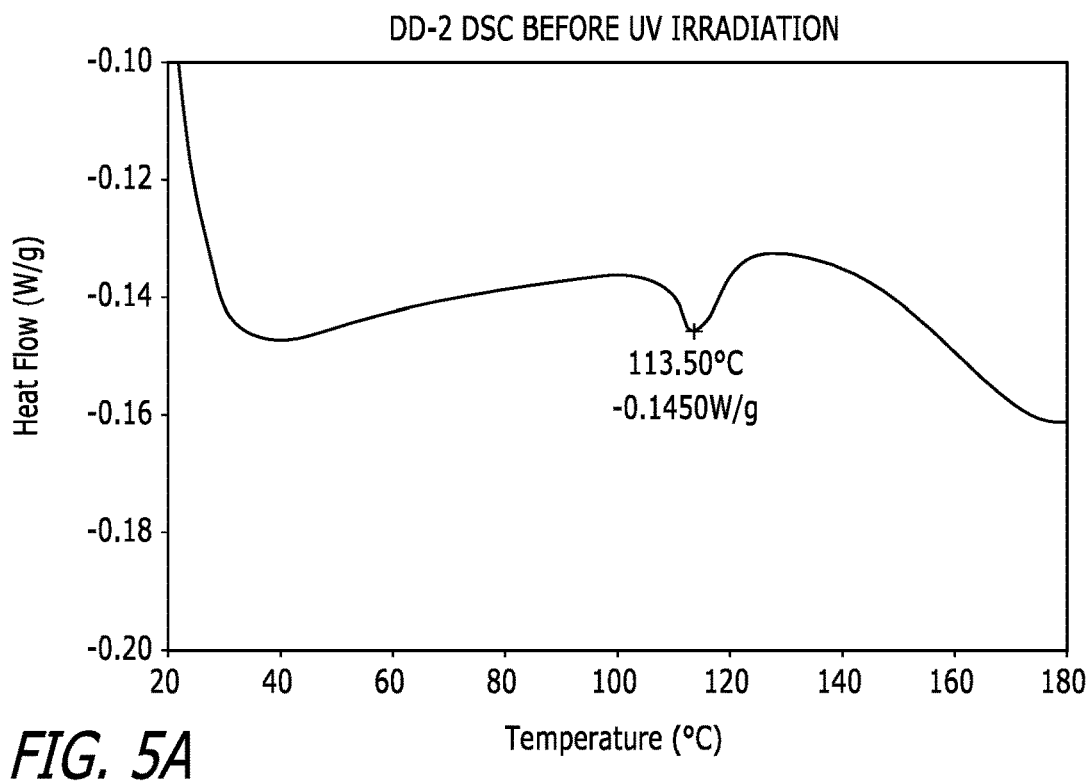
FIG. 5A is a Differential Scanning calorimetry plot for an embodiment of a liquid crystal mixture representative of DD-2 before ultraviolet irradiation.
Figure 5B:
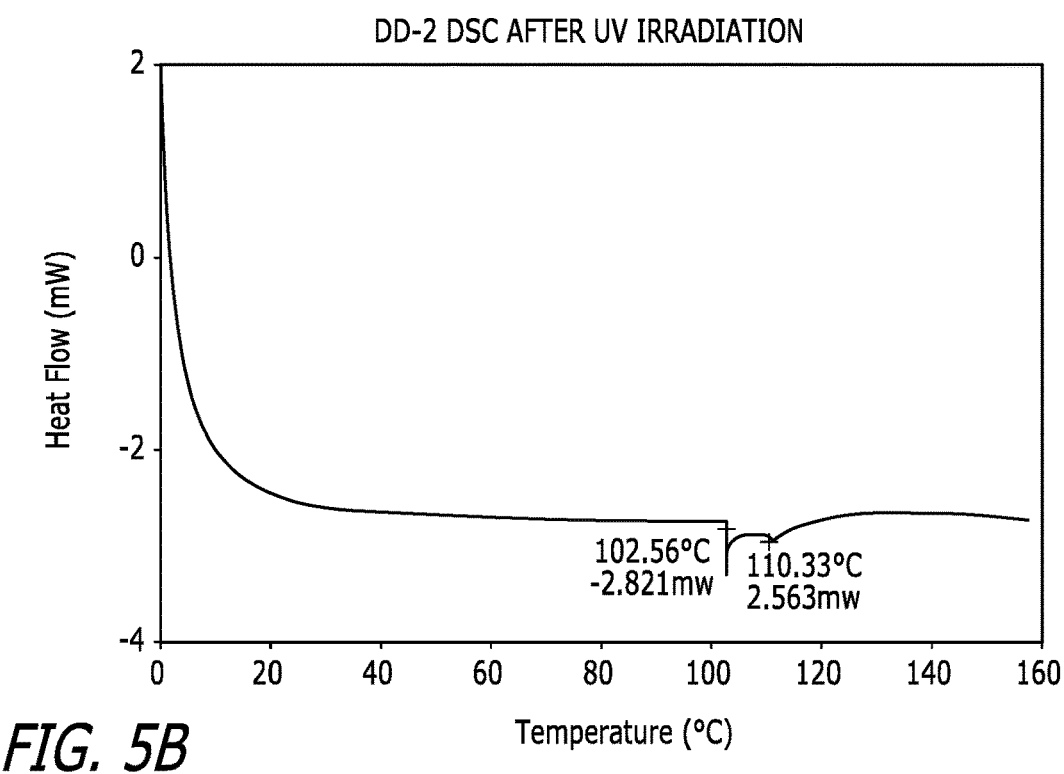
FIG. 5B is a Differential Scanning calorimetry plot for an embodiment of a liquid crystal mixture representative of DD-2 after ultraviolet irradiation for 140 hours.
Figure 5C:
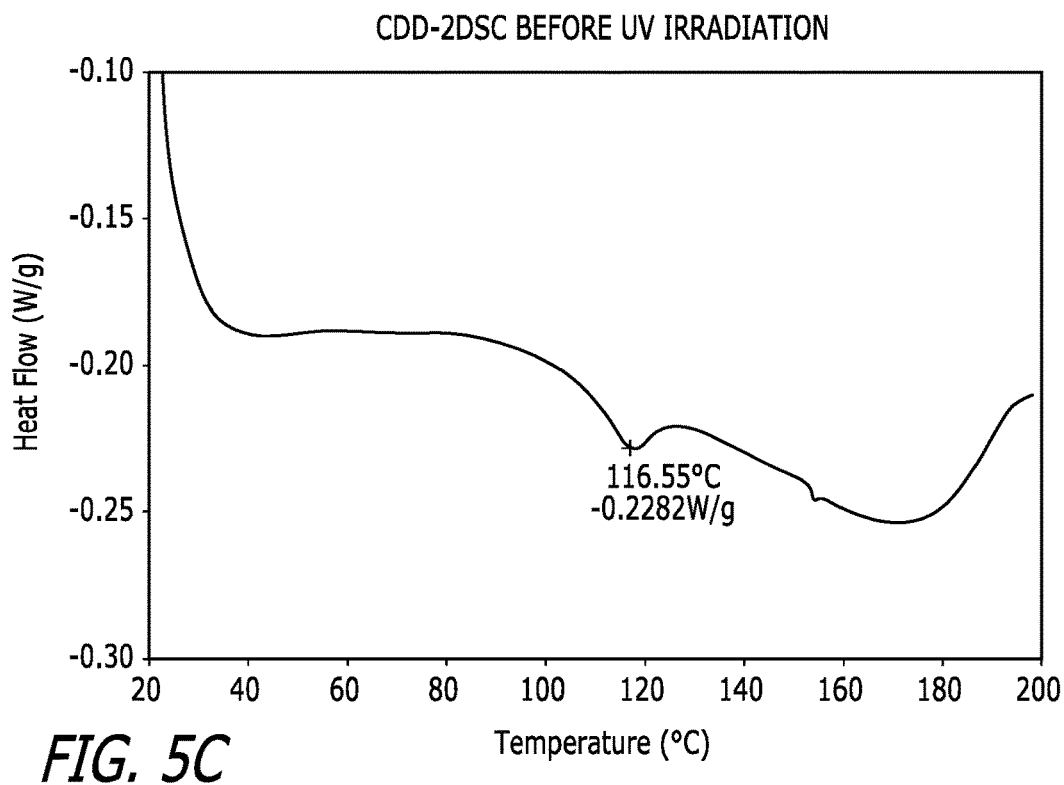
FIG. 5C is a Differential Scanning calorimetry plot for a comparative liquid crystal mixture representative of CDD-2 before ultraviolet irradiation.
Figure 5D:
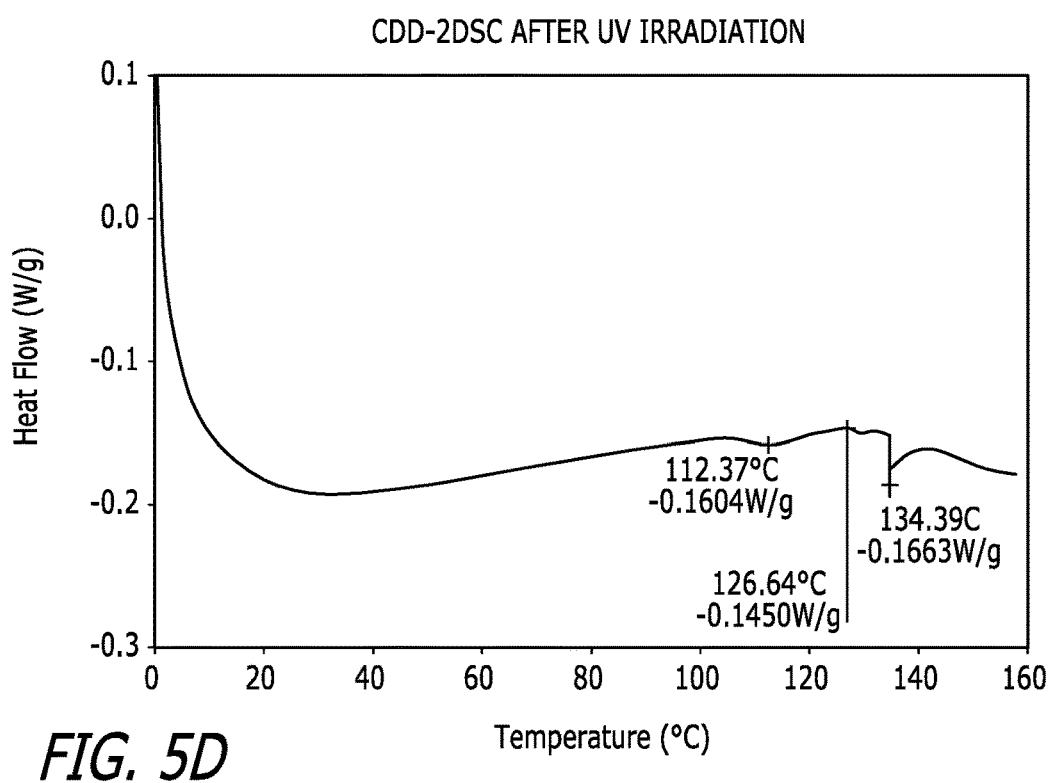
FIG. 5D is a Differential Scanning calorimetry plot for a comparative liquid crystal mixture representative of CDD-2 after ultraviolet irradiation for 140 hours; arrows show possible indication of degradation.

For the DSC measurements, the results are shown in FIG. 5A thru 5D. FIG. 5A were measurements of the DD-2 analogue before UV irradiation and FIG. 5B are measurements after UV irradiation. FIG. 5C were measurements of the CDD-2 analogue before UV irradiation and FIG. 5D are measurements after UV irradiation. The increased peaks present in the heat flow plot for the CDD-2 analogue as shown by the arrows in FIG. 5D indicate the presence of degraded products as compared to the heat flow plot of the DD-2 analogue shown in FIG. 5B. The DSC measurements corroborate the yellowness index measurements indicate further degradation of CLC-1 as compared to LC-2.

Example 4.3: Optical Measurements

In Example 4.3, the optical characteristics of the fabricated dimmable devices were characterized by measuring the light allowed to passing through each device, both with and without an electric field present. Light transmittance data for the samples were measured using a haze meter (HM-150; Murakami Color Research Laboratory, Tokyo, Japan) with each respective sample placed inside the device. The source was directly measured without any sample present to provide a baseline measurement of total light transmitted. Then, the samples were placed directly in the optical path, such that the emitted light passes through the samples. Then, for each sample, the sample was connected to a voltage source (3PN117C Variable Transformer; Superior Electric, Farmington, Conn., USA) via electrical wires, one wire connected to each terminal and to a respective ITO glass substrate on the device such that an electric field would be applied across the device when a voltage source was energized or a voltage applied, and then placed into the haze meter. Then, the emitted light transmitted through the samples was measured, at first with no voltage applied and then again at various magnitudes of voltage, ranging from 0 volts to an upper voltage of 30 volts; with haze measurements taken at the different voltage levels, every 2 volts.

Figure 6:
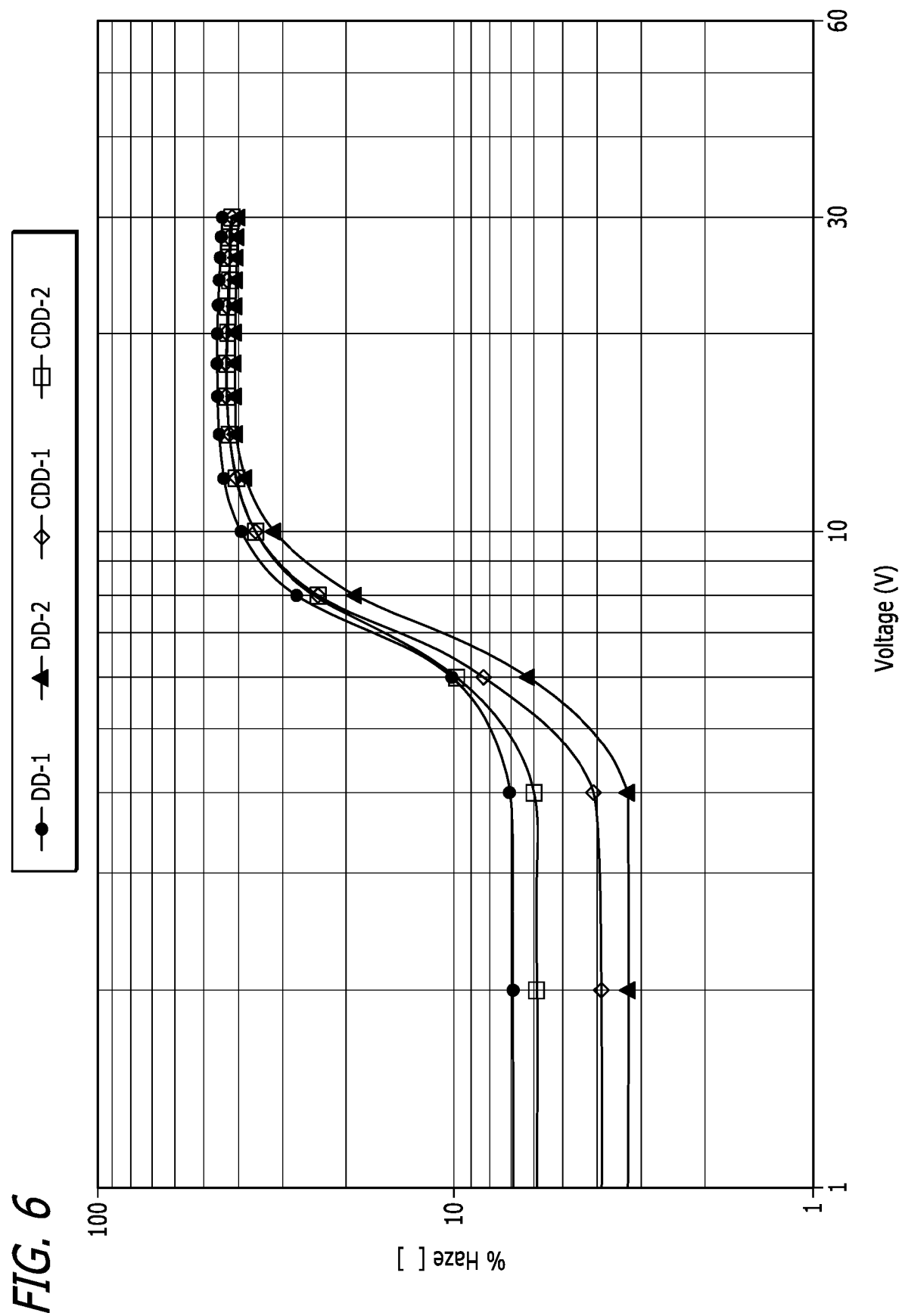
FIG. 6 plot showing the haze performance of various embodiments containing MLC-2132 as a function of input voltage.
Figure 7:
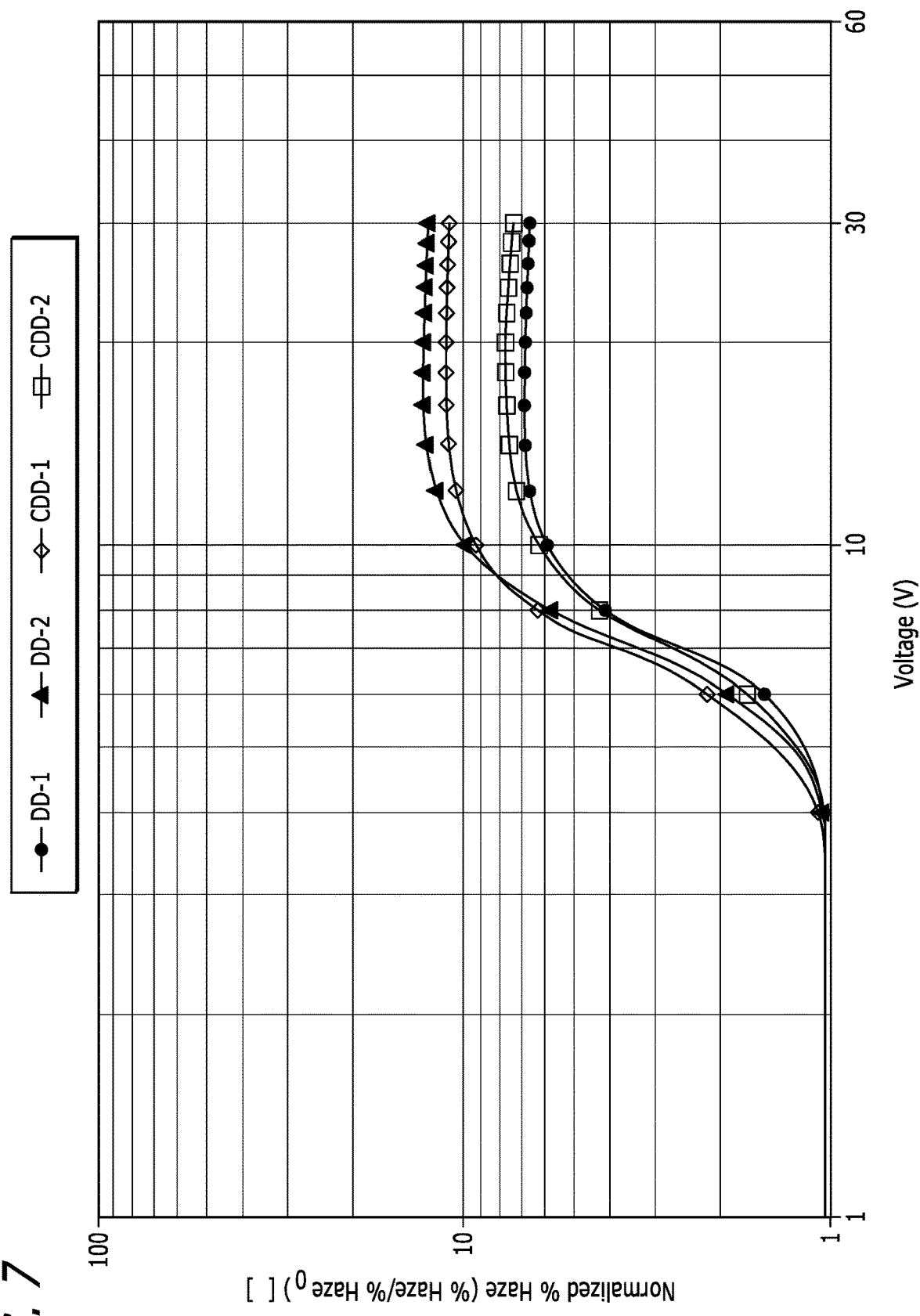
FIG. 7 plot showing the normalized haze performance of various embodiments containing MLC-2132 as a function of input voltage.
Figure 8:
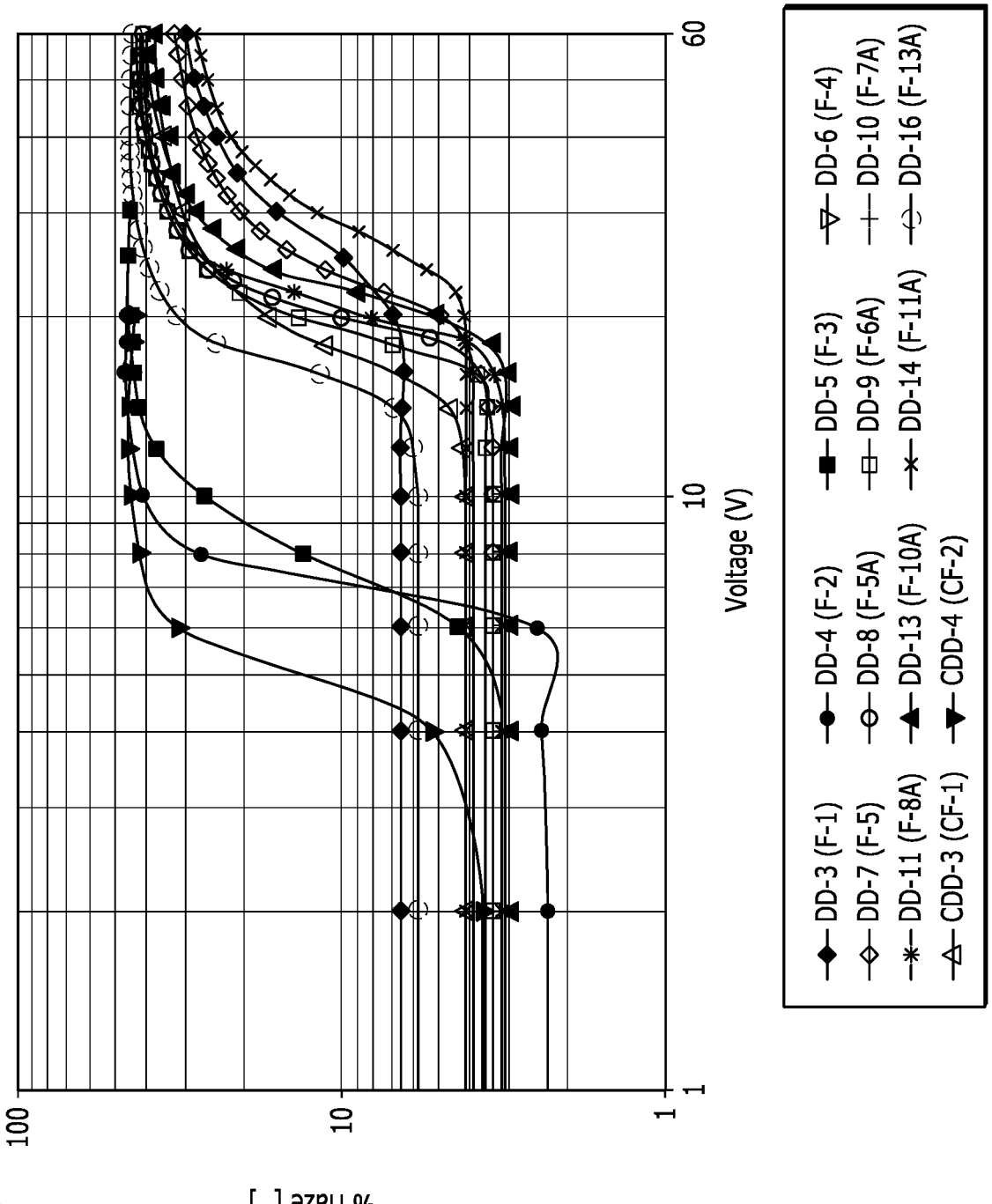
FIG. 8 plot showing the haze performance of various liquid crystal mixture embodiments as a function of input voltage.
Figure 9:
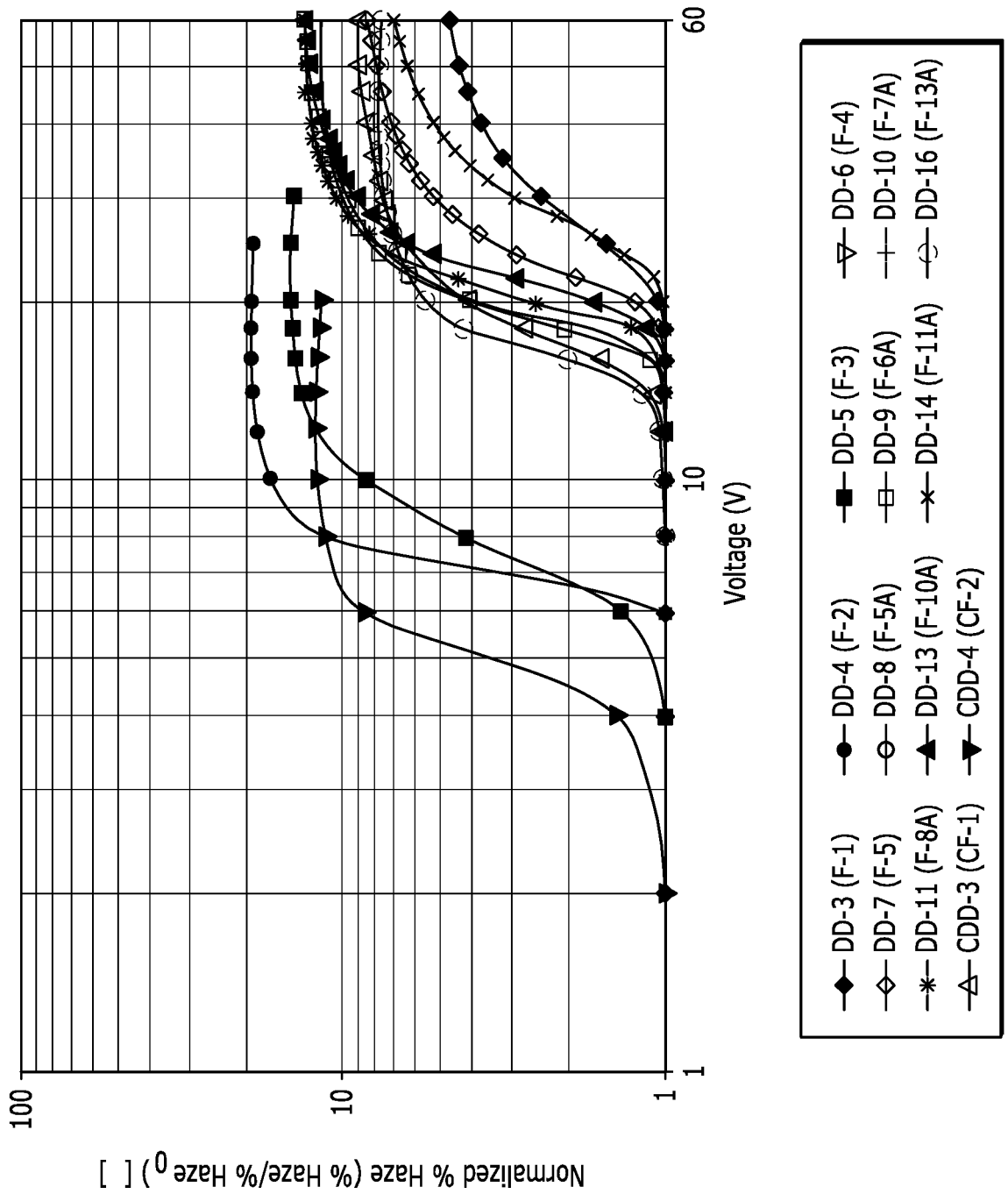
FIG. 9 plot showing the normalized haze performance of various liquid crystal mixture embodiments as a function of input voltage.
Figure 10:
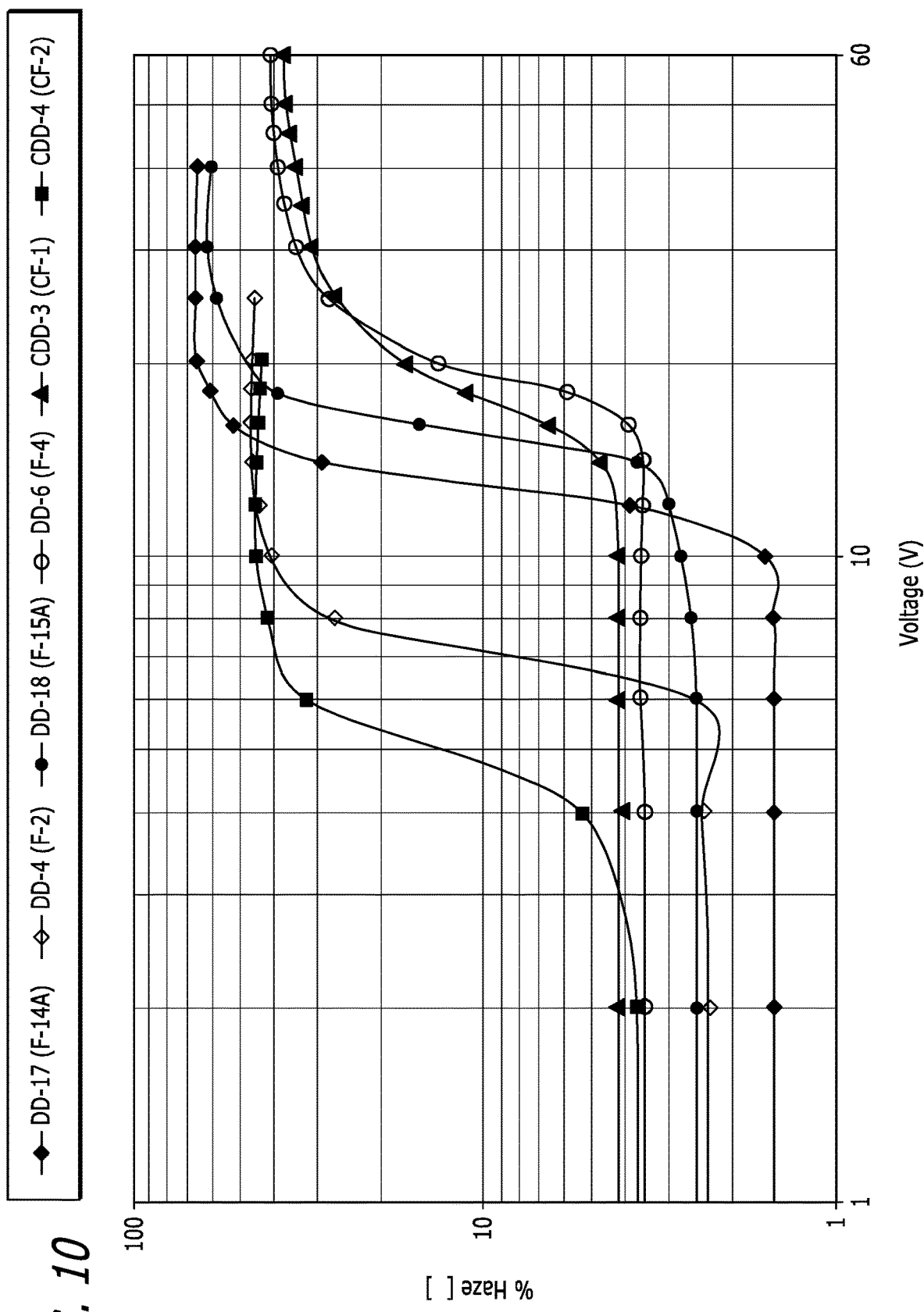
FIG. 10 plot showing the haze performance of various chiral-doped liquid crystal mixture embodiments as a function of input voltage.
Figure 11:
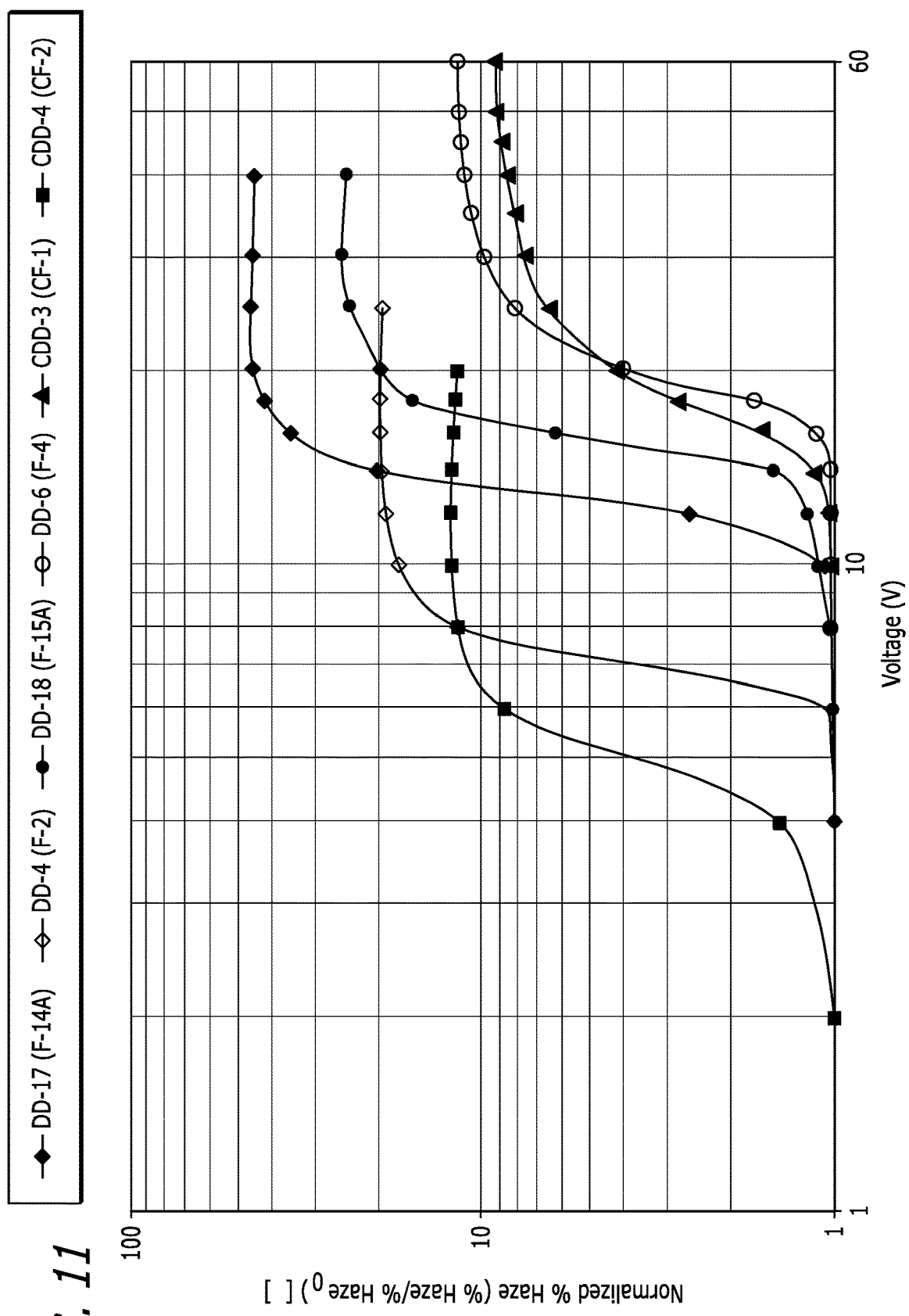
FIG. 11 plot showing the normalized haze performance of various chiral-doped liquid crystal mixture embodiments as a function of input voltage.
Figure 12:
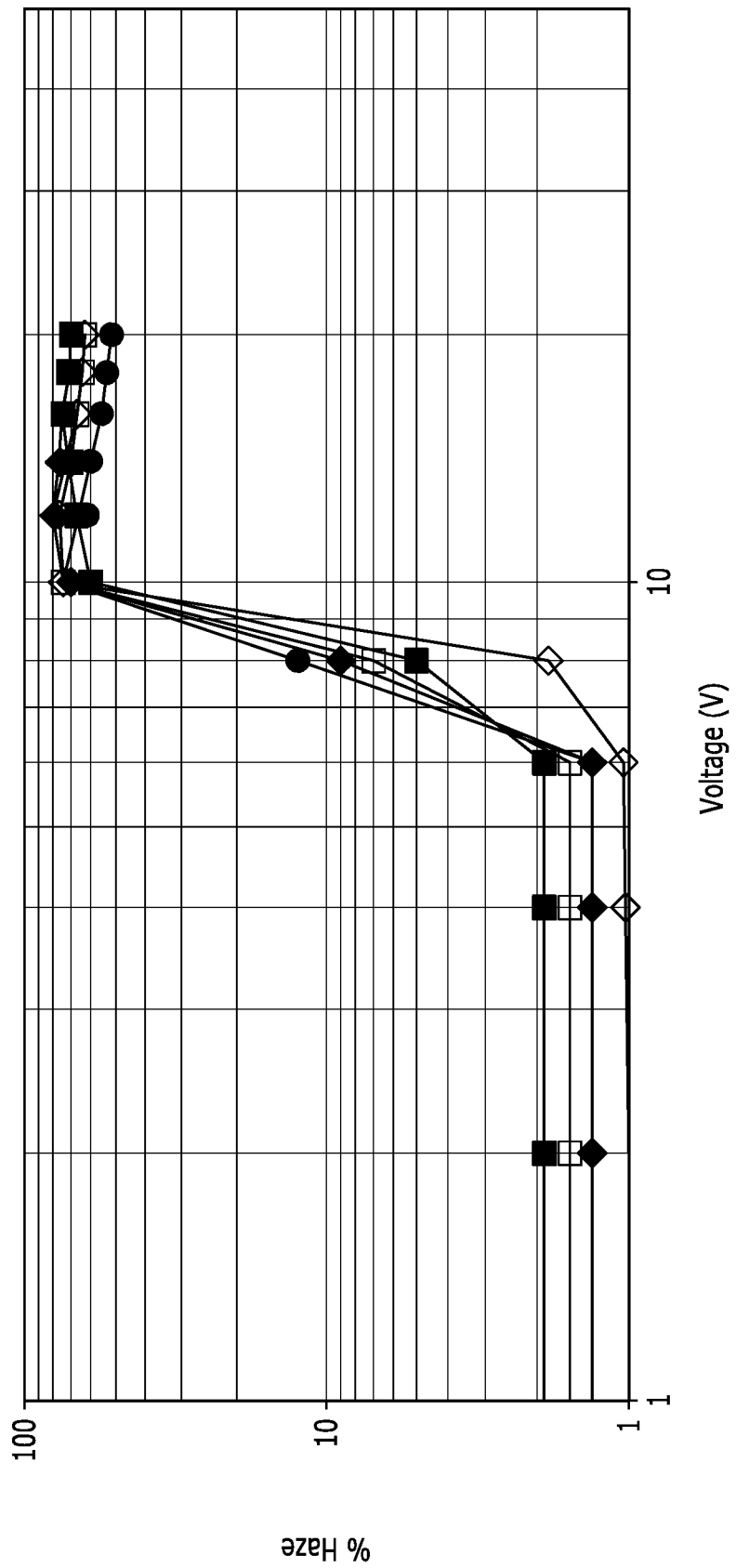
FIG. 12 plot showing the haze performance of various chiral-doped liquid crystal mixture embodiments as a function of input voltage.
Figure 13:
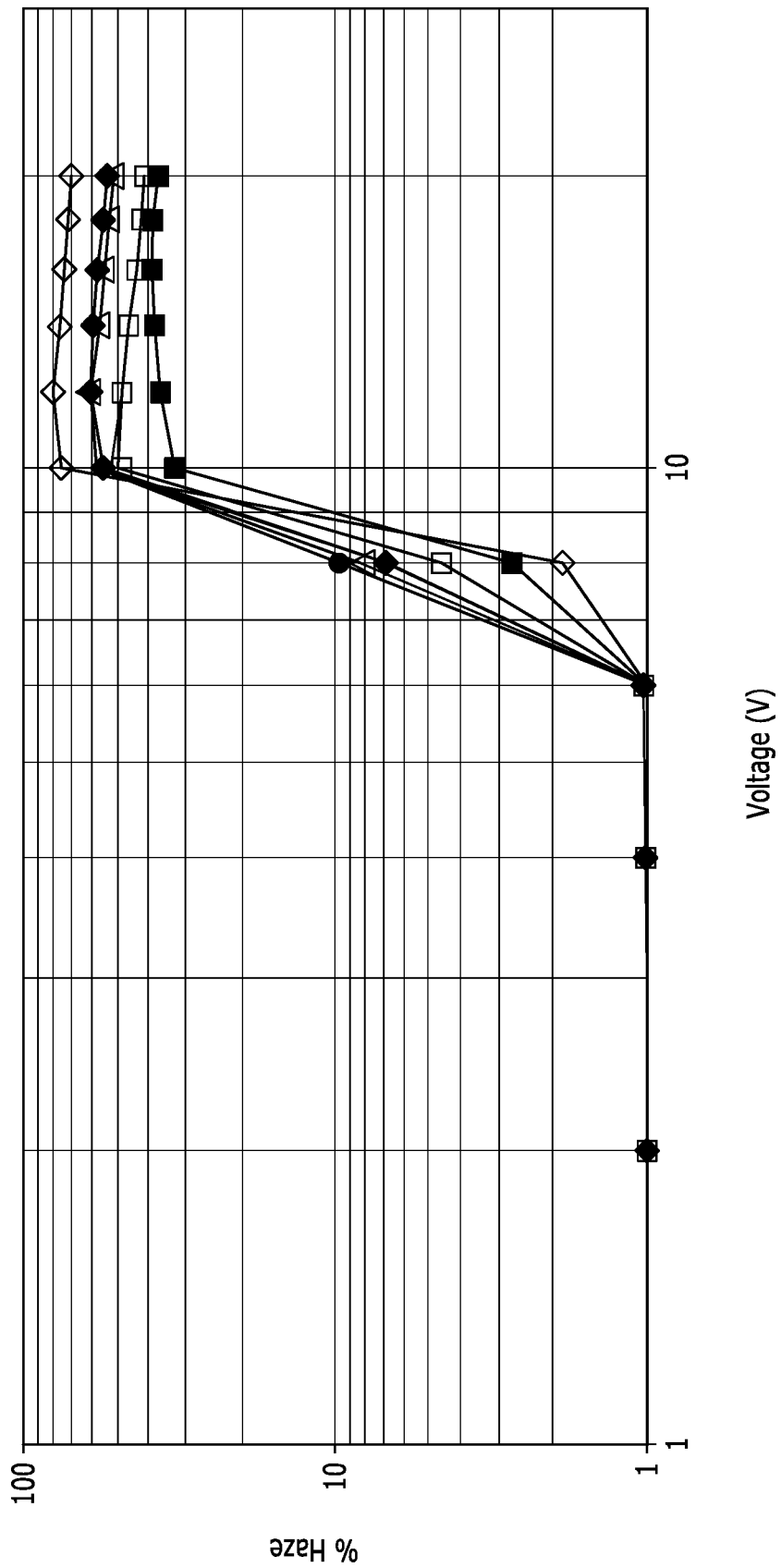
FIG. 13 plot showing the normalized haze performance of various chiral-doped liquid crystal mixture embodiments as a function of input voltage.

The results are shown in FIGS. 6 thru 11. For the devices with MLC-2132 as a mother liquid crystal, FIG. 6 depicts the relative haze measurements, normalized in FIG. 7. The normalized haze was calculated by taking the measured haze and dividing by the haze of the device at the application of a zero voltage. Examining the data, it was apparent that while DD-1, based on LC-1, switched faster than the comparative examples, DD-2, based on LC-2, achieved a higher normalized haze differential. For the mixtures, the haze data is broken into two groups, mixtures without chiral doping and mixtures with chiral doping. For the group without chiral doping, the data is presented in FIG. 8, normalized data is presented in FIG. 9. Initially while appears that is one of the comparative examples, CDD-4, based on CF-2, performs faster, when the normalized data was examined, it appeared that there was a larger percentage of haze differential from DD-4, based on F-2, and DD-5, based on F-3. In fact, most of the devices achieved a normalized haze percentage differential of at least 10. The second group of devices, those involved adding a chiral dopant, were examined to determine the effect of the chiral dopant on haze performance. The results are shown in FIG. 10, with normalized data in FIG. 11. The chiral devices, DD-17 and DD-18, were compared to their non-chiral counterparts, DD-4 and DD-6 respectively, as well as the comparative mixture devices, CDD-3 and CDD-4. For both families of devices, adding a chiral dopant increased the percentage haze as well as the haze differential. An interesting observation is that, with the addition of the chiral dopant, the onset voltage appeared to increase for the devices based on mixture F-2/LC-2 but decreased for the devices based on mixture F-4/LC-1. It is believed that the difference in haze performance between the two families of device can be attributed to the structural difference in the liquid crystal compounds, e.g., DD-17/F-14A/LC-2 contains a longer terminal alkyl chain as compared to DD-18/F-15A/LC-1. A similar tendency may be explained when observing the general differences between the un-doped devices, e.g., DD-4 and DD-6.

Example 4.4: Electrical Stability Measurements

In Example 4.4, the devices were tested to determine the stability of the LC compounds. There were two tests conducted. The first test was a continuous driving test and the other test was a cycle test.

In the continuous driving test the devices were placed in the same measurement assembly as described in Example 4.3. The haze of the samples was measured at zero volts to provide an initial condition. Then, the samples were then driven continuously at 30 volts for sixty-four hours. After sixty-four hours, the voltage was then lowered to 0 volts and the haze was measured.

In the cycle test, the devices were placed in the same measurement assembly as described in Example 4.3, with the exception that a time delay relay (MLS2, Crouzet Control, Valence, France) was placed in the electrical circuit between the device being measured and the voltage source such that the time delay relay could control the voltage going to the device. Before the testing was started the haze was measured with a zero voltage. Then, the relays were then set to 10 seconds on at 20 V and then 10 seconds off at 0 V repeating for 10,000 cycles. At key times in the cycles and after the cycles were completed the haze of the samples was then measured with zero voltage and a voltage of 20 V to determine any degradation in haze performance. The results, as shown below in Table 6, show the unexpected result that LC-1 has remarkably less degradation than the other liquid crystals.

strued in light of the number of reported significant digits and by applying ordinary rounding techniques.

The terms "a," "an," "the" and similar referents used in the context of describing the embodiments (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present disclosure and does not pose a limitation on the scope of any claim. No language in the specification should be construed as indicating any non-claimed element essential to the practice of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known for carrying out the embodiments. Of course, variations on these described embodiments will become apparent to those of ordinary skill in the art upon reading the foregoing description. It is expected that skilled artisans can employ such variations as appropriate, and it is intended that the present disclosure may be practiced oth-

TABLE 6

Stability Measurements for Selected Embodiments.

| | | Continuous | | | Cycling | | |
|---|---|---|---|---|---|---|---|
| Element | Liquid Crystal Components | Initial Off Haze [%] | Final Off Haze [%] | Haze change [%] | Initial Off Haze [%] | Final Off Haze [%] | Haze Change [%] |
| DD-1 | LC-1 (4.41 wt %) MLC-2132 (88.21 wt %) | 7.6 | 12.0 | 4.4 | 7.7 | 11.1 | 3.4 |
| DD-2 | LC-2 (4.74 wt %) MLC-2132 (89.92 wt %) | 3.3 | 10.8 | 7.5 | 3.5 | 8.8 | 5.3 |
| DD-17A | F17A(91%) + R811(3%) | 1.0 | 3.02 | 2.0 | 1.46 | 6.20 | 4.7 |
| DD-18A | F18A(91%) + R811(3%) | 1.41 | 9.66 | 8.2 | 0.86 | 23.85 | 23.0 |
| DD-19A | F19A(91%) + R811(3%) | 1.56 | 14.19 | 12.6 | 1.51 | 9.53 | 8.0 |
| DD-22A | F22A(91%) + R811(3%) | 1.26 | 10.58 | 9.3 | 1.05 | 6.20 | 5.2 |
| DD-28A | F28A(91%) + R811(3%) | 0.95 | 9.66 | 8.7 | 1.02 | 9.07 | 8.1 |
| CDD-1 | MLC-2132 (94.83 wt %) | 4.1 | 16.5 | 12.4 | 3.5 | 9.5 | 6.0 |
| CDD-2 | CLC-1 (5.07 wt %) MLC-2132 (89.36 wt %) | 5.2 | 11.1 | 5.9 | 5.5 | 14.3 | 8.8 |

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be conerwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to precise embodiments shown and described.

What is claimed is:
1. A liquid-crystalline composition comprising:
(1) a polymer created by polymerization of a monomer of a formula:

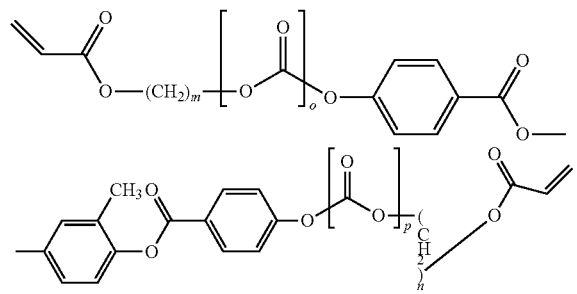

wherein m and n are independently 1, 2, 3, 4, 5, or 6, and o and p are independently 0 or 1; and
(2) a liquid crystalline mixture comprising a first liquid crystalline (LC) compound of a formula:

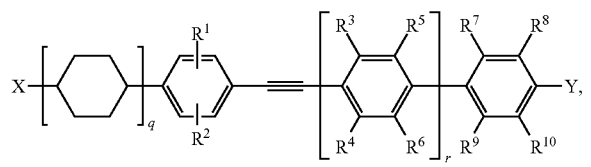

wherein $R^1$ is H or $CH_3$; $R^2$, $R^3$, $R^4$, $R^5$, $R^6$, $R^2$, $R^8$, $R^9$, and $R^{10}$ are independently H, $CH_3$, or F, wherein at least one of $R^1$ and $R^3$ is $CH_3$; X is $C_{2-8}$ alkyl or $C_{3-7}$ —O-alkyl; Y is F or CN; and
q and r are independently 0 or 1;
wherein the liquid crystalline mixture is dispersed within the polymer.

2. The liquid-crystalline composition of claim 1, wherein the first liquid crystalline compound is further represented by the formula:

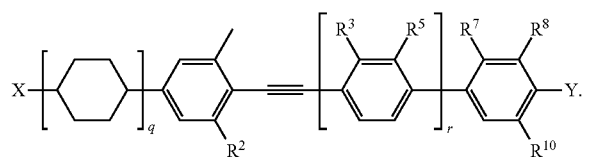

3. The liquid-crystalline composition of claim 2, wherein X is:

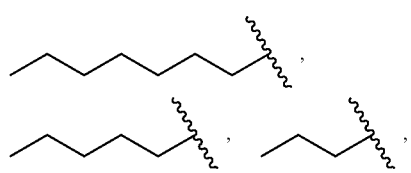

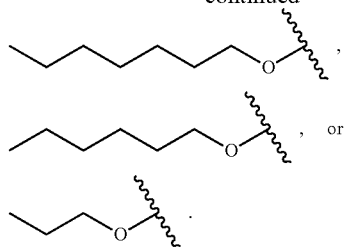

4. The liquid-crystalline composition of claim 1, wherein the first liquid crystalline compound is:

LC-1
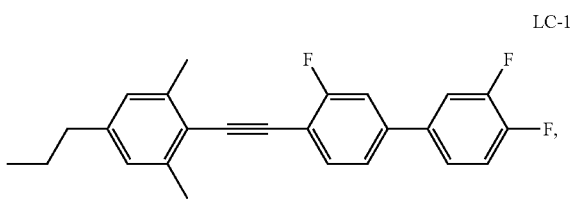

LC-2
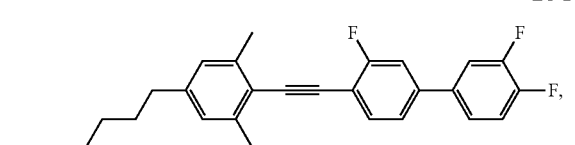

LC-3
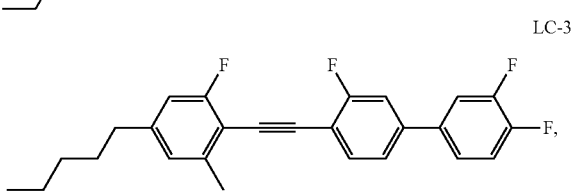

LC-4
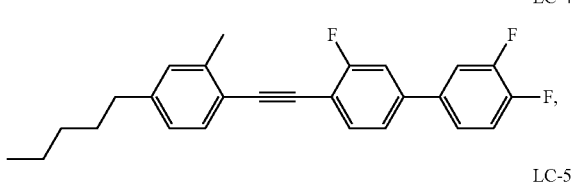

LC-5
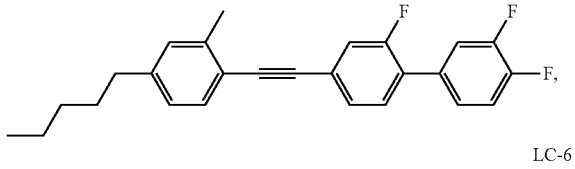

LC-6
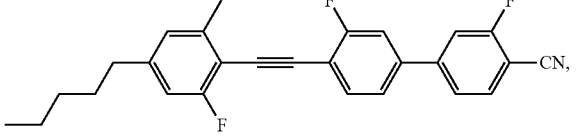

LC-7
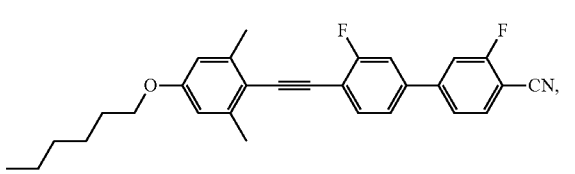

-continued

LC-8
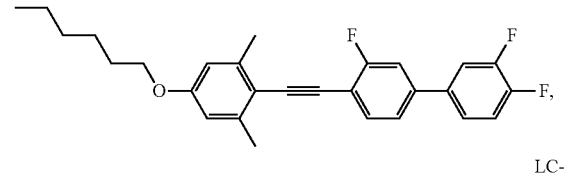

LC-9
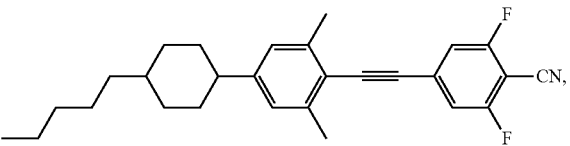

LC-10
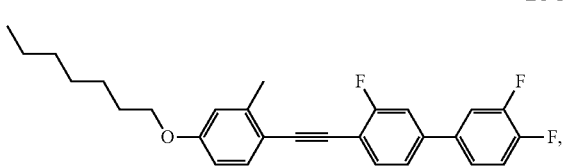

LC-11
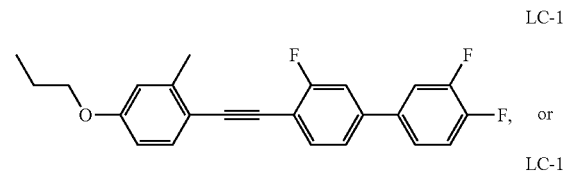

LC-12
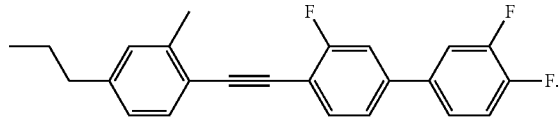

5. The liquid-crystalline composition of claim 1, wherein the liquid crystal mixture further comprises at least one second liquid crystalline compound of the formula:

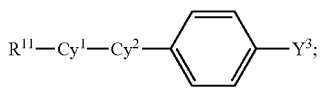

wherein $R^{11}$ is $C_{3-9}$ alkyl or $C_{3-9}$ —O-alkyl, $Cy^1$ is cyclohexyl or phenyl, $Cy^2$ is a single covalent bond or phenyl; and $Y^3$ is CN or —NCS.

6. The liquid-crystalline composition of claim 5, wherein the second liquid crystalline compound comprises:

(6CHBT)
(5CB)
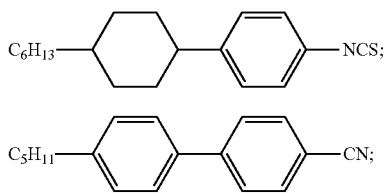

(7CB)
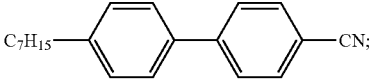

(8OCB)
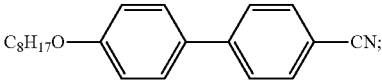

(5CCB)

(5CT)
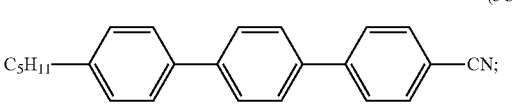

or a combination thereof;
wherein the combination of the first liquid crystalline compound and the second crystalline compound(s) forms a liquid crystal mixture.

7. The liquid-crystalline composition of claim 1, further comprising a chiral dopant.

8. The liquid-crystalline composition of claim 7 wherein the chiral dopant is R-octan-2-yl 4-((4-(hexyloxy)benzoyl)oxy)benzoate.

9. The liquid-crystalline composition of claim 1, further comprising an initiator.

10. A liquid crystal element comprising:
a transparency changing layer comprising the liquid-crystalline composition of claim 1, having a first surface and a second surface; and
a first alignment layer bounding the first surface and a second alignment layer bounding the second surface.

11. A dimmable device comprising:
the liquid crystal element of claim 10 disposed between a first conductive substrate and a second conductive substrate; and
a voltage source; wherein:
the liquid crystal element, the first conductive substrate, the second conductive substrate, and the voltage source are all in electrical communication such that when a voltage is applied by the voltage source an electric field is applied across the liquid crystal element.

12. The device of claim 11, wherein the device has a haze of at most 7% when there is no voltage applied across the device.

13. The device of claim 11, wherein the device has a haze of at least 28% when a voltage of at least 60 volts is applied across the device.

14. The device of claim 11, wherein the substrates are flexible so that the device forms a flexible sheet.

15. The device of claim 11, further comprising a sealant to protect the liquid crystal element from the environment.

16. The device of claim 11, further comprising a removable backing.

\* \* \* \* \*

UNITED STATES PATENT AND TRADEMARK OFFICE
CERTIFICATE OF CORRECTION

PATENT NO. : 10,934,486 B2
APPLICATION NO. : 16/373431
DATED : March 2, 2021
INVENTOR(S) : Sazzadur Rahman Khan, Hiep Luu and Ekambaram Sambandan Page 1 of 1

It is certified that error appears in the above-identified patent and that said Letters Patent is hereby corrected as shown below:

In the Claims

Column 71, Lines 10-15: Claim 1 - replace structure " 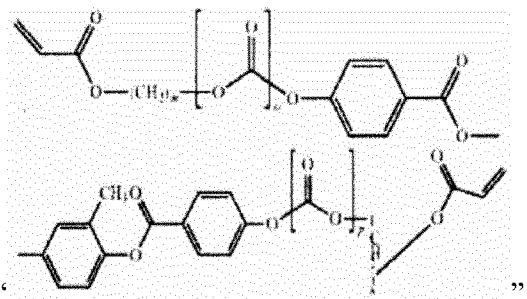 "
with -- 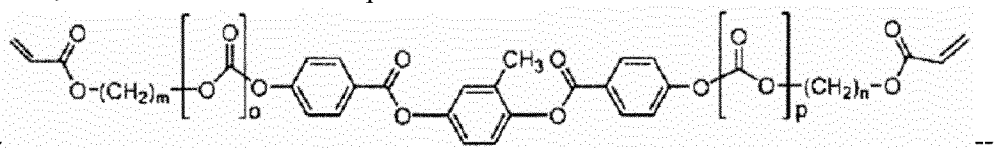 --

Column 71, Line 37: Claim 1 - after R6, replace "$R^2$," with -- $R^7$, --

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*